(12) United States Patent
Sakamoto et al.

(10) Patent No.: US 11,832,683 B2
(45) Date of Patent: *Dec. 5, 2023

(54) SHOCK ABSORBER, SHOE SOLE AND SHOE

(71) Applicant: ASICS CORPORATION, Kobe (JP)

(72) Inventors: Masanori Sakamoto, Kobe (JP); Yutaro Iwasa, Kobe (JP); Norihiko Taniguchi, Kobe (JP); Koji Shimomura, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,119

(22) Filed: Jun. 23, 2020

(65) Prior Publication Data

US 2021/0195995 A1  Jul. 1, 2021

(30) Foreign Application Priority Data

Dec. 27, 2019  (JP) .................................. 2019-237764
Dec. 27, 2019  (JP) .................................. 2019-237765
(Continued)

(51) Int. Cl.
*A43B 13/02*  (2022.01)
*A43B 13/04*  (2006.01)
(Continued)

(52) U.S. Cl.
CPC .............. *A43B 13/023* (2013.01); *A43B 7/32* (2013.01); *A43B 13/04* (2013.01); *A43B 13/125* (2013.01);
(Continued)

(58) Field of Classification Search
CPC ... A43B 13/023; A43B 13/125; A43B 13/181; A43B 1/0009; A43B 7/32; A43B 21/26;
(Continued)

(56) References Cited

U.S. PATENT DOCUMENTS 2,432,533 A   12/1947  Meyer
35,449,142    12/1970  Tilton
(Continued)

FOREIGN PATENT DOCUMENTS

CN   105768352 A   7/2016
CN   106796392 A   5/2017
(Continued)

OTHER PUBLICATIONS

The extended European search report issued by the European Patent Office dated Nov. 27, 2020, which corresponds to European Patent Application No. 20181493.6-1011 and is related to U.S. Appl. No. 16/909,119.
(Continued)

*Primary Examiner* — Khoa D Huynh
*Assistant Examiner* — Haley A Smith
(74) *Attorney, Agent, or Firm* — Studebaker & Brackett PC

(57) ABSTRACT

A shock absorber includes a three-dimensional structure composed of a unit structure repeatedly, regularly and continuously arranged in at least one direction, the unit structure being a three-dimensional shape formed by a wall having an external shape defined by a pair of parallel planes or curved surfaces. When the unit structure occupies a cuboidal space representing a unit space and defined by mutually orthogonal three sides having a first side extending in an axial direction in which the shock absorber exhibits a shock absorbing function as the shock absorber receives a load and second and third sides each extending from one end of the first side in a direction orthogonal to the axial direction, and the first side has a length L1 and a longer one of the second and third sides has a length L2, the shock absorber satisfies 1.1≤L1/L2≤4.0.

7 Claims, 37 Drawing Sheets

(30) Foreign Application Priority Data

Jun. 1, 2020 (JP) .................................. 2020-095628
Jun. 1, 2020 (JP) .................................. 2020-095629

(51) Int. Cl.
*A43B 13/14* (2006.01)
*A43B 7/32* (2006.01)
*A43B 13/12* (2006.01)
*A43B 13/18* (2006.01)
*A43B 21/26* (2006.01)
*B32B 3/12* (2006.01)
*F16F 7/12* (2006.01)

(52) U.S. Cl.
CPC .......... *A43B 13/141* (2013.01); *A43B 13/181* (2013.01); *A43B 13/187* (2013.01); *A43B 21/26* (2013.01); *B32B 3/12* (2013.01); *F16F 7/121* (2013.01); *B32B 2437/02* (2013.01)

(58) Field of Classification Search
CPC .. A43D 2200/60; B32B 3/12; B32B 2437/02; F16F 7/121
See application file for complete search history.

(56) References Cited

U.S. PATENT DOCUMENTS

| | | | | |
|---|---|---|---|---|
| 4,292,375 | A * | 9/1981 | Ko ....................... | B21D 26/055 |
| | | | | 428/593 |
| 10,881,167 | B2 | 1/2021 | Jeng et al. | |
| 11,071,348 | B2 | 7/2021 | Caldwell et al. | |
| 2012/0315456 | A1 * | 12/2012 | Scarpa .................... | F16F 7/121 |
| | | | | 428/221 |
| 2016/0160077 | A1 | 6/2016 | Rolland et al. | |
| 2018/0049514 | A1 | 2/2018 | Guyan et al. | |
| 2018/0228401 | A1 | 8/2018 | Schwartz et al. | |
| 2018/0264719 | A1 | 9/2018 | Rolland et al. | |
| 2018/0317600 | A1 * | 11/2018 | Campos ............... | A43B 13/125 |
| 2019/0231018 | A1 * | 8/2019 | Boutin .................. | A42B 3/124 |
| 2019/0357621 | A1 | 11/2019 | Nauman et al. | |
| 2020/0068988 | A1 | 3/2020 | Hsiao | |
| 2020/0093221 | A1 * | 3/2020 | Caldwell ............... | A43B 1/0009 |
| 2020/0229538 | A1 * | 7/2020 | Yoshinaga ............ | B29D 35/122 |
| 2020/0268098 | A1 * | 8/2020 | Jeng ..................... | A43B 13/181 |
| 2021/0186152 | A1 * | 6/2021 | Kumar ................. | A43B 13/125 |
| 2022/0275845 | A1 * | 9/2022 | Kabaria ................. | B29C 64/35 |

FOREIGN PATENT DOCUMENTS

| | | |
|---|---|---|
| CN | 109312802 A | 2/2019 |
| CN | 110505816 A | 11/2019 |
| EP | 3 467 335 A1 | 4/2019 |
| JP | S49-009527 B1 | 3/1974 |
| JP | 2001-208120 A | 8/2001 |
| JP | 2012-100616 A | 5/2012 |
| JP | 2017527637 A | 9/2017 |
| JP | 2019-205686 A | 12/2019 |
| WO | 2015/200201 A1 | 12/2015 |
| WO | 2017/208979 A1 | 12/2017 |

OTHER PUBLICATIONS

The extended European search report issued by the European Patent Office dated Nov. 26, 2020, which corresponds to European Patent Application No. 20181503.2-1011 and is related to U.S. Appl. No. 16/909,119.

An Office Action mailed by the Japanese Patent Office dated Sep. 28, 2021, which corresponds to Japanese Patent Application No. 2020-095628 and is related to U.S. Appl. No. 16/909,119; with English language translation.

An Office Action mailed by the Japanese Patent Office dated Sep. 28, 2021, which corresponds to Japanese Patent Application No. 2020-095629 and is related to U.S. Appl. No. 16/909,119; with English language translation.

An Office Action mailed by China National Intellectual Property Administration dated Dec. 24, 2021, which corresponds to Chinese Patent Application No. 202010571269.0 and is related to U.S. Appl. No. 16/909,119; with English language translation.

An Office Action issued by the United States Patent and Trademark Office dated Dec. 29, 2021, which corresponds to U.S. Appl. No. 16/909,212 and is related to U.S. Appl. No. 16/909,119.

An Office Action; "Notice of Reasons for Refusal," mailed by the Japanese Patent Office dated Sep. 12, 2023, which corresponds to Japanese Patent Application No. 2019-237765 and is related to U.S. Appl. No. 16/909,119; with English language translation.

An Office Action; "Notice of Reasons for Refusal," mailed by the Japanese Patent Office dated Sep. 19, 2023, which corresponds to Japanese Patent Application No. 2019-2377634 and is related to U.S. Appl. No. 16/909,119; with English language translation.

* cited by examiner

1A1

1A2

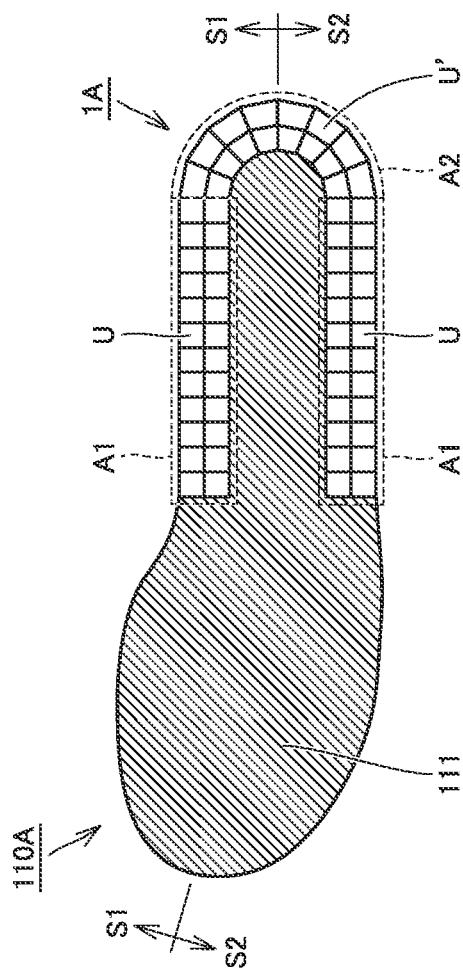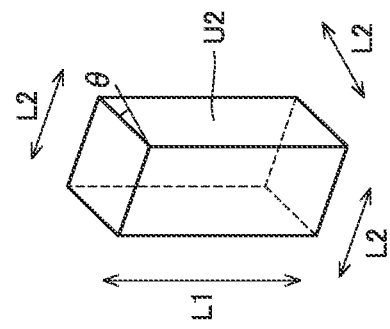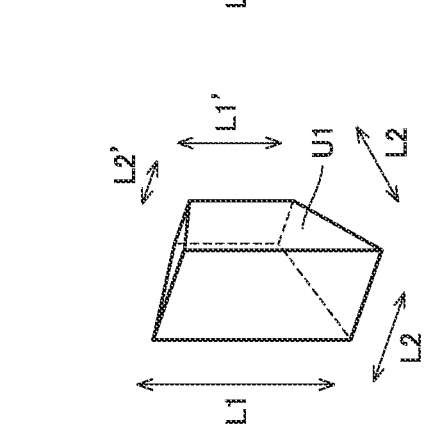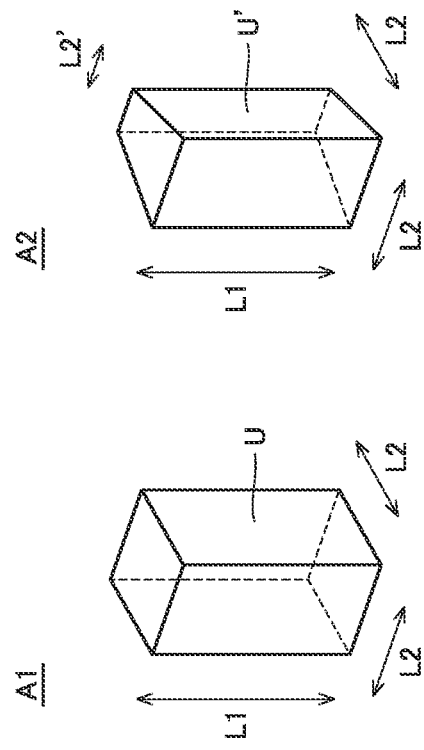

SHOCK ABSORBER, SHOE SOLE AND SHOE

CROSS REFERENCE TO RELATED APPLICATIONS

This nonprovisional application is based on Japanese Patent Application Nos. 2019-237764 and 2019-237765 filed on Dec. 27, 2019 and Nos. 2020-095628 and 2020-095629 filed on Jun. 1, 2020 with the Japan Patent Office, the entire contents of which are hereby incorporated by reference.

BACKGROUND OF THE INVENTION

Field of the Invention

The present invention relates to a shock absorber for absorbing shock, a shoe sole comprising the shock absorber, and a shoe comprising the shoe sole.

Description of the Background Art

Conventionally, various types of shock absorbers for absorbing shock have been known, and these various types of shock absorbers have been used depending on the application. For example, a shoe may have a shoe sole provided with a shock absorber in order to absorb shock caused upon landing. The shock absorber provided to the shoe sole is typically composed of a member made of resin or rubber.

In recent years, there have also been developed shoes having a shoe sole provided with a part having a lattice structure, a web structure or the like so that not only a material but also a structure provides an enhanced shock absorbing function. A shoe comprising a shoe sole provided with a part having a lattice structure is disclosed for example in U.S. Patent Publication No. 2018/0049514.

Japanese National Patent Publication No. 2017-527637 describes that a three-dimensional object which is manufactured in a three-dimensional additive manufacturing method can be manufactured by adding thickness to a geometrical surface structure, such as a polyhedron having a cavity therein or a triply periodic minimal surface, and discloses that composing the three-dimensional object of an elastic material allows the object to be applied for example to a shoe sole.

SUMMARY OF THE INVENTION

Herein, the shock absorber having a structure in which a thickness is added to a geometrical surface structure has a structural feature, that is, it achieves large compressive stiffness more easily than a shock absorber including a part having a lattice structure or a web structure.

However, when it is attempted to obtain large compressive stiffness in a shock absorber having such a structure, there is a problem, that is, an increased wall thickness results in an increased volume ratio and the shock absorber's weight is significantly increased. In particular, when it is desired to locally increase the compressive stiffness of only a portion of the shock absorber, and that portion's wall thickness is increased, that portion's weight is significantly increased, and the shock absorber inevitably has an increased overall weight, which is a significant obstacle to weight reduction.

Accordingly, it is an object of the present invention to provide a shock absorber which is lightweight and has an excellent shock absorbing function, and can be used in various applications, a shoe sole comprising the shock absorber, and a shoe comprising the shoe sole.

A shock absorber in a first aspect of the present invention includes a three-dimensional structure composed of a unit structure repeatedly, regularly and continuously arranged in at least one direction, the unit structure being a three-dimensional shape formed by a wall having an external shape defined by a pair of parallel planes or curved surfaces. When the shock absorber in the first aspect of the present invention is such that each unit structure occupies a cuboidal space representing a unit space and defined by mutually orthogonal three sides having a first side extending in an axial direction in which the shock absorber exhibits a shock absorbing function as the shock absorber receives a load and second and third sides each extending from one end of the first side in a direction orthogonal to the axial direction, and the first side has a length L1 and a longer one of the second and third sides has a length L2, the shock absorber in the first aspect of the present invention satisfies $1.1 \leq L1/L2 \leq 4.0$.

A shoe sole according to the first aspect of the present invention comprises the shock absorber according to the first aspect of the present invention described above.

A shoe according to the first aspect of the present invention includes the shoe sole according to the first aspect of the present invention described above, and an upper provided above the shoe sole.

A shock absorber according to a second aspect of the present invention includes a three-dimensional structure composed of a unit structure repeatedly, regularly and continuously arranged in at least one direction, the unit structure being a three-dimensional shape formed by a wall having an external shape defined by a pair of parallel planes or curved surfaces. In the shock absorber according to the second aspect of the present invention, when such unit structures each occupy a hexahedral space representing a unit space, the three-dimensional structure includes, as the unit structure, unit structures each occupying a unit space having an external shape with a different dimension.

A shoe sole according to the second aspect of the present invention comprises the shock absorber according to the second aspect of the present invention described above.

A shoe according to the second aspect of the present invention includes the shoe sole according to the second aspect of the present invention described above, and an upper provided above the shoe sole.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A to 13E schematically show an example of how the shock absorber is arranged in the shoe sole shown in FIG. 11.

DESCRIPTION OF THE PREFERRED EMBODIMENTS

Hereinafter, embodiments of the present invention will be described in detail with reference to the accompanying drawings. In the following embodiments, identical or common portions are identically denoted in the figures, and will not be 165 described repeatedly.

First Embodiment

Figure 1:
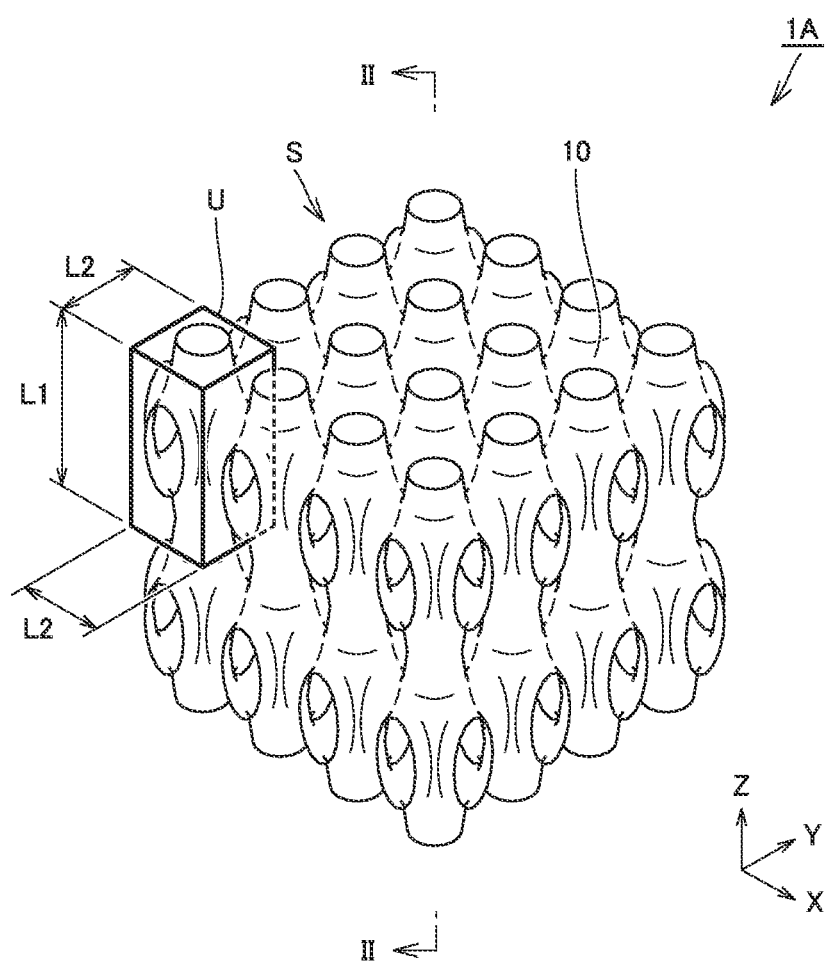
FIG. 1 is a partially cutaway perspective view of a shock absorber according to a first embodiment.
Figure 2:
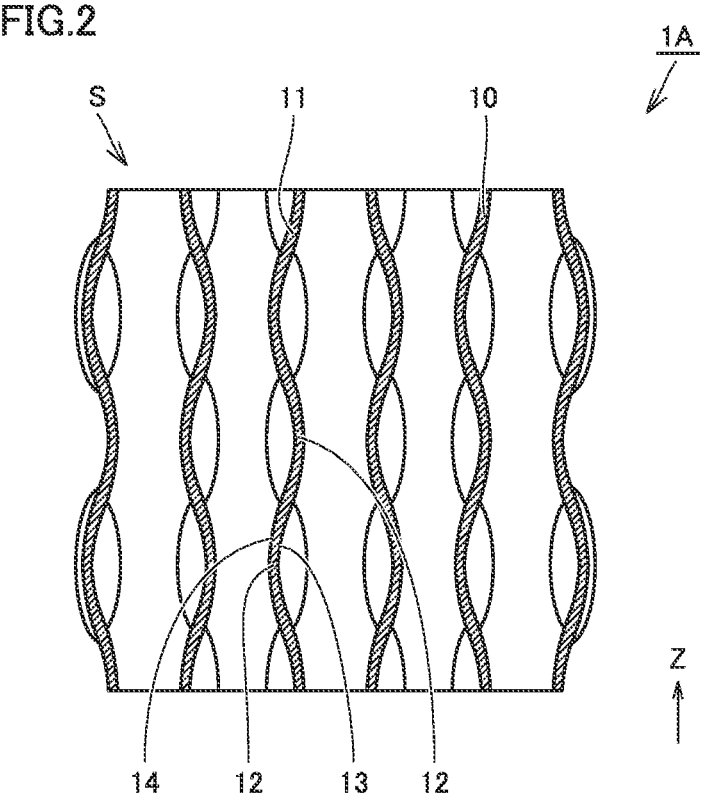
FIG. 2 is a cross section of the shock absorber shown in FIG. 1.

FIG. 1 is a partially cutaway perspective view of a shock absorber according to a first embodiment. FIG. 2 is a cross section of the shock absorber taken along a line II-II shown in FIG. 1. A shock absorber 1A according to the present embodiment will be described below with reference to FIGS. 1 and 2.

As shown in FIGS. 1 to 2, shock absorber 1A includes a three-dimensional structure S having a plurality of unit structures U (see FIG. 1, in particular). The plurality of unit structures U each have a three-dimensional shape formed by wall 10 having an external shape defined by a pair of parallel curved surfaces.

Herein, in FIG. 1, in order to facilitate understanding, reference character U does not denote the unit structure in a strict sense; rather, it denotes a cuboidal unit space occupied by the unit structure.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIGS. 1 and 2 extract and show four unit structures U adjacent to one another in each of the widthwise and depthwise directions and two unit structures U adjacent to each other in the heightwise direction.

While in the present embodiment, shock absorber 1A composed of a large number of unit structures U provided in each of the widthwise, depthwise and heightwise directions will be indicated as an example for the sake of illustration, how many unit structures U are repeated in the widthwise, depthwise and heightwise directions is not particularly limited, and two or more unit structures arranged in at least one of the three directions suffice.

Shock absorber 1A according to the present embodiment is intended to exhibit a shock absorbing function in the heightwise direction (the Z direction shown in the figure). Accordingly, when shock absorber 1A receives a load, shock absorber 1A exhibits the shock absorbing function in an axial direction, which will match the heightwise direction described above.

The plurality of unit structures U each have a three-dimensional shape formed by wall 10, as has been set forth above. Therefore, as the plurality of unit structures U are continuously connected to one another, three-dimensional structure S is also composed of a set of walls 10.

Herein, three-dimensional structure S included in shock absorber 1A has a 200 structure in which a thickness is added to a geometrical surface structure. In shock absorber 1A according to the present embodiment, the surface structure is a Schwarz' P structure, which is a type of mathematically defined triply periodic minimal surface. Note that a minimal surface is defined as a curved surface of those having a given closed curve as a boundary that is minimal in area.

As shown in FIG. 2, three-dimensional structure S that is a Schwarz' P structure with a thickness added thereto has a meandering portion 11 which is a portion presenting a cross-sectional shape extending in a meandering manner when three-dimensional structure S is cut along a specific plane. In the present embodiment, the specific plane is a plane orthogonal to the plane of the sheet of FIG. 1 and parallel to the line II-II.

While there will be three types of meandering portions 11 in total in terms of the structure of three-dimensional structure S: one extending in the widthwise direction; one extending in the depthwise direction; and one extending in the heightwise direction, herein, meandering portion 11 which appears in the cross section shown in FIG. 2, that 215 is, extends in the heightwise direction (i.e., the Z direction), is noted.

Meandering portion 11 extending in the heightwise direction has a plurality of turning points 12 located in the heightwise direction, and turning point 12 is provided with an internal corner portion 13 and an external corner portion 14. Of these portions, internal corner portion 13 is a portion which appears in the above cross-sectional shape to have a concave shape on a surface of wall 10, and external corner portion 14 is a portion which appears in the above cross-sectional shape to have a convex shape on a surface of wall 10. Herein, a distance between meandering portion 11 extending in the heightwise direction and meandering portion 11 adjacent thereto varies depending on the location in the heightwise direction, and the distance periodically increases and decreases in the heightwise direction.

As shown in FIG. 1, in shock absorber 1A according to the present embodiment, unit structure U has a shape elongate in the height direction. More specifically, unit structure U is configured such that when each unit structure U occupies a cuboidal space representing a unit space and defined by mutually orthogonal three sides having a first side extending in the heightwise direction (that is, the Z direction), a second side extending in the widthwise direction (that is, the X direction) and a third side extending the depthwise direction (that is, the Y direction), the first side is the longest side. The longest or first side is a side extending in the aforementioned axial direction in which the shock absorbing function is intended to be exhibited.

Herein, in the present embodiment, the second side and the third side are adjusted to be equal in length. Therefore, as shown in the figure, when the first side has a length L1 and the second and third sides have a length L2, shock absorber 1A of the present embodiment satisfies $1.1 \leq L1/L2 \leq 4.0$.

This configuration allows the shock absorber to be lightweight and have an excellent shock absorbing function, which will more specifically be described hereinafter. When the second side and the third side are different in length, the length of the longer one of the second and third sides may be represented as L2, and the above relational expression may be satisfied.

Herein, while shock absorber 1A may be manufactured in any method, it can be additively manufactured using a three dimensional additive manufacturing apparatus for example.

While shock absorber 1A may basically be formed of any material having a large elastic force, it is preferably formed of a resin material or a rubber material. More specifically, when shock absorber 1A is formed of resin, shock absorber 1A can be formed for example of thermoplastic resin such as ethylene-vinyl acetate copolymer (EVA) or can be formed for example of thermosetting resin such as polyurethane (PU). When shock absorber 1A is formed of rubber, it can be formed for example of butadiene rubber.

Shock absorber 1A can be composed of a polymer composition. In that case, an example of a polymer to be contained in the polymer composition includes olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate 265 copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, and polyamide 610.

The polymer may be an ester-based polymer such as an ester-based elastomer and an ester-based resin. Examples of the ester-based polymer include polyethylene terephthalate and polybutylene terephthalate.

The polymer may be a urethane-based polymer such as a urethane-based elastomer and a urethane-based resin. Examples of the urethane-based polymer include polyester-based polyurethane and polyether-based polyurethane.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, polyvinyl chloride-based resins, silicone-based elastomers, butadiene rubber (BR), isoprene rubber (IR), chloroprene (CR), natural rubber (NR), styrene-butadiene rubber (SBR), acrylonitrile-butadiene rubber (NBR), butyl rubber (IIR), and the like.

As has been described above, shock absorber 1A according to the present embodiment will be lightweight and have an excellent shock absorbing function. This is significantly attributed to a structural feature (a feature in shape) of shock absorber 1A. Hereinafter, this point will be described in detail based on a result of a first verification test conducted by the present inventor.

Figure 3:
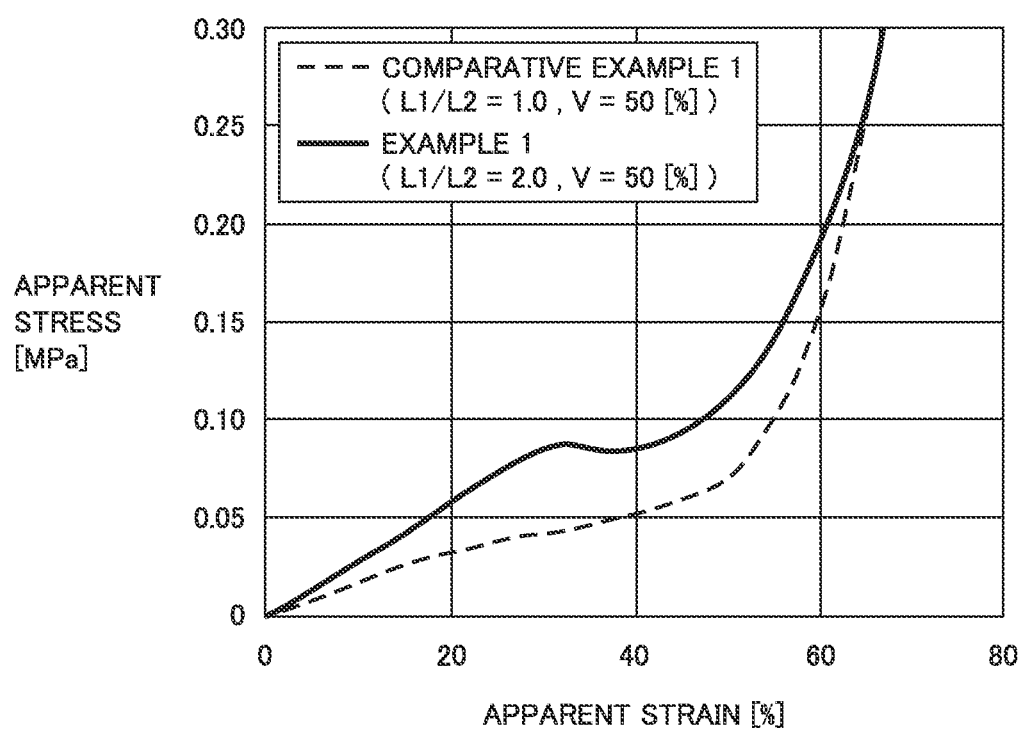
FIG. 3 is a graph showing a result of simulating the shock absorbing functions of shock absorbers according to Comparative Example 1 and Example 1.

FIG. 3 is a graph showing a result of simulating the shock absorbing functions of shock absorbers according to Comparative Example 1 and Example 1.

In the first verification test, models for the shock absorbers according to Comparative Example 1 and Example 1 were specifically designed and a case in which these models received an external force in a prescribed direction was assumed, and how the models would behave in that case was simulated and their behaviors were individually analyzed. More specifically, a so-called stress-strain curve was obtained for each of these models.

Herein, the shock absorber according to Example 1 is exactly shock absorber 1A according to the present embodiment, and satisfies $1.1 \le L1/L2 \le 4.0$. While the shock absorber according to Comparative example 1 is approximate in configuration to shock absorber 1A according to the present embodiment, it does not satisfy $1.1 \le L1/L2 \le 4.0$.

More specifically, the shock absorber according to Comparative Example 1 includes unit structure U having widthwise, depthwise and heightwise dimensions each of 10 mm and L1/L2 is 1.0. Wall 10 has a thickness of 2.36 mm, in which case a volume ratio V of about 50% is provided.

In contrast, the shock absorber according to Example 1 includes unit structure U having widthwise and depthwise dimensions each of 5 mm and a heightwise dimension of 10 mm and L1/L2 is 2.0. Wall 10 has a thickness of 1.36 mm, in which case a volume ratio V of about 50% is provided.

Further, the shock absorbers according to Comparative Example 1 and Example 1 both received external force in the axial direction described above or the heightwise direction. It was assumed that the shock absorbers according to Comparative Example 1 and Example 1 were both formed of a urethane-based acrylic polymer having an elastic modulus of 0.5 MPa.

To increase compressive stiffness to provide an enhanced shock absorbing function, unit structure U may typically have wall 10 increased in thickness. However, when wall 10 is increased in thickness, volume ratio V will also increase accordingly, so that the larger wall 10 is in thickness, the larger volume ratio V is, resulting in the shock absorber being heavier. That is, there is a so-called trade-off relationship between ensuring compressive stiffness and reducing weight.

However, as shown in FIG. 3, despite having the same volume ratio as that of the shock absorber according to Comparative Example 1, the shock absorber according to Example 1 has a larger compressive stiffness than the shock absorber according to Comparative Example 1. It is believed that this is because unit structure U is reduced in length in the widthwise direction, and accordingly, wall 10 acts more like a partition and thus contributes to enhancing compressive stiffness.

Therefore, according to the result of the first verification test, it can be seen that the shock absorber according to Example 1 can obtain large compressive stiffness with a smaller volume ratio (that is, without increasing wall 10 in thickness), and as a result can be lightweight and have an excellent shock absorbing function.

Shock absorber 1A according to the present embodiment described above can thus be a shock absorber which is lightweight and has an excellent shock absorbing function, and can be used for various applications.

(First and Second Variations)

Figure 4A:
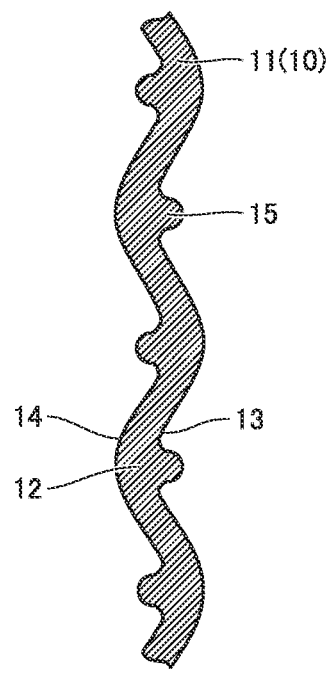
FIGS. 4A and 4B are schematic cross sections showing the shapes of main portions of shock absorbers according to first and second variations.
Figure 4B:
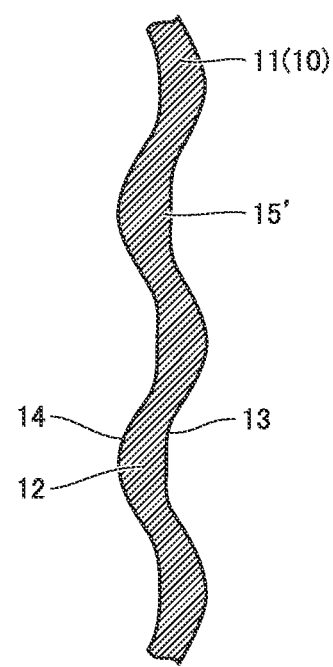

FIGS. 4A and 4B are schematic cross sections showing the shapes of main portions of shock absorbers according to first and second variations. Hereinafter, shock absorbers 1A1 and 1A2 according to the first and second variations based on the first embodiment will be described with reference to FIGS. 4A and 4B.

As shown in FIG. 4A, shock absorber 1A1 according to the first variation is provided with a plurality of additional thickness portions 15 at prescribed positions on wall 10. The plurality of additional thickness portions 15 are each provided in the form of a protrusion at internal corner portion 13 of a turning point 12 of meandering portion 11. The plurality of additional thickness portions 15 also each extend across internal corner portion 13.

Additional thickness portion 15 is provided to allow turning point 12 to be larger in thickness than another portion, and functions as a reinforcement portion that reinforces turning point 12 at which stress easily concentrates as shock absorber 1A1 significantly deforms when an external force is applied thereto. When additional thickness portion 15 is provided, larger compressive stiffness can be ensured, and when an external force is applied, and once turning point 12 has been deformed thereby to some extent, additional thickness portion 15 will physically prevent further deformation of turning point 12, and can thus suppress stress concentration caused at turning point 12.

As shown in FIG. 4B, shock absorber 1A2 according to the second variation is provided with a plurality of additional thickness portions 15' at prescribed positions on wall 10. The plurality of additional thickness portions 15' are each different from additional thickness portion 15 that shock absorber 1A1 has, as described above, that is, each not in the form of a protrusion, and instead provided to fill internal corner portion 13 of turning point 12 of meandering portion 11. The plurality of additional thickness portions 15' also each extend across internal corner portion 13.

Additional thickness portion 15' is provided to allow turning point 12 to be larger in thickness than another portion, and functions as a reinforcement portion that reinforces turning point 12 at which stress easily concentrates as shock absorber 1A1 significantly deforms when an external force is applied thereto. When additional thickness portion 15' is provided, larger compressive stiffness can be ensured, and when an external force is applied, and once turning point 12 has been deformed thereby to some extent, additional thickness portion 15' will physically prevent further deformation of turning point 12, and can thus suppress stress concentration caused at turning point 12.

Although not described specifically, shock absorbers 1A1 and 1A2 according to the first and second variations also satisfy $1.1 \leq L1/L2 \leq 4.0$.

Thus shock absorbers 1A1 and 1A2 according to the first and second variations provides the effect of shock absorber 1A according to the first embodiment, and in addition, will be able to suppress local stress concentration, and can thus be enhanced in durability and further enhanced in compressive stiffness.

Second Embodiment

Figure 5:
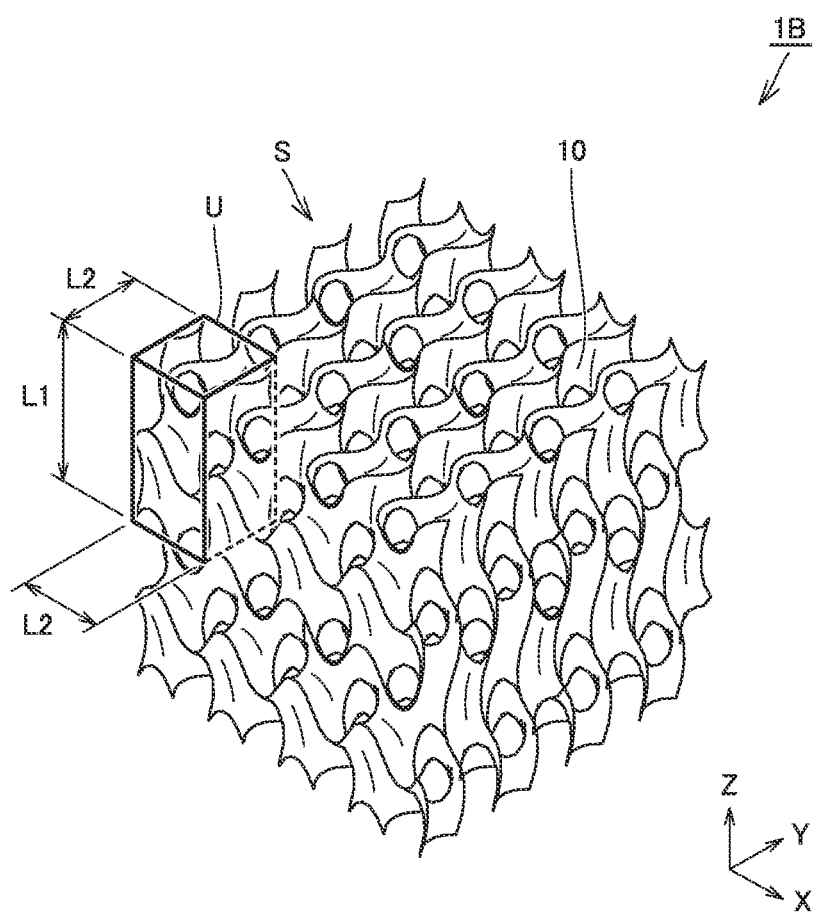
FIG. 5 is a partially cutaway perspective view of a shock absorber according to a second embodiment.

FIG. 5 is a partially cutaway perspective view of a shock absorber according to a second embodiment. A shock absorber 1B according to the present embodiment will be described below with reference to FIG. 5.

As shown in FIG. 5, shock absorber 1B includes three-dimensional structure S having a plurality of unit structures U. The plurality of unit structures U each have a three-dimensional shape formed by wall 10 having an external shape defined by a pair of parallel curved surfaces.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 5 extracts and shows four unit structures U adjacent to one another in each of the widthwise and depthwise directions and two unit structures U adjacent to each other in the heightwise direction.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1B has a structure in which a thickness is added to a geometrical surface structure. In shock absorber 1B according to the present embodiment, the surface structure is a gyroid structure, which is a type of triply periodic minimal surface mathematically defined.

While shock absorber 1B according to the present embodiment includes unit structures U each occupying a cuboidal space representing a unit space and defined by first to third sides having lengths L1 and L2 (in the present embodiment as well, the second and third sides are equal in length), the shock absorber of the present embodiment, as well as the first embodiment, satisfies $1.1 \leq L1/L2 \leq 4.0$.

Thus shock absorber 1B of the present embodiment, as well as the first embodiment, can be lightweight and have an excellent shock absorbing function, and can be used in various applications.

Third Embodiment

Figure 6:
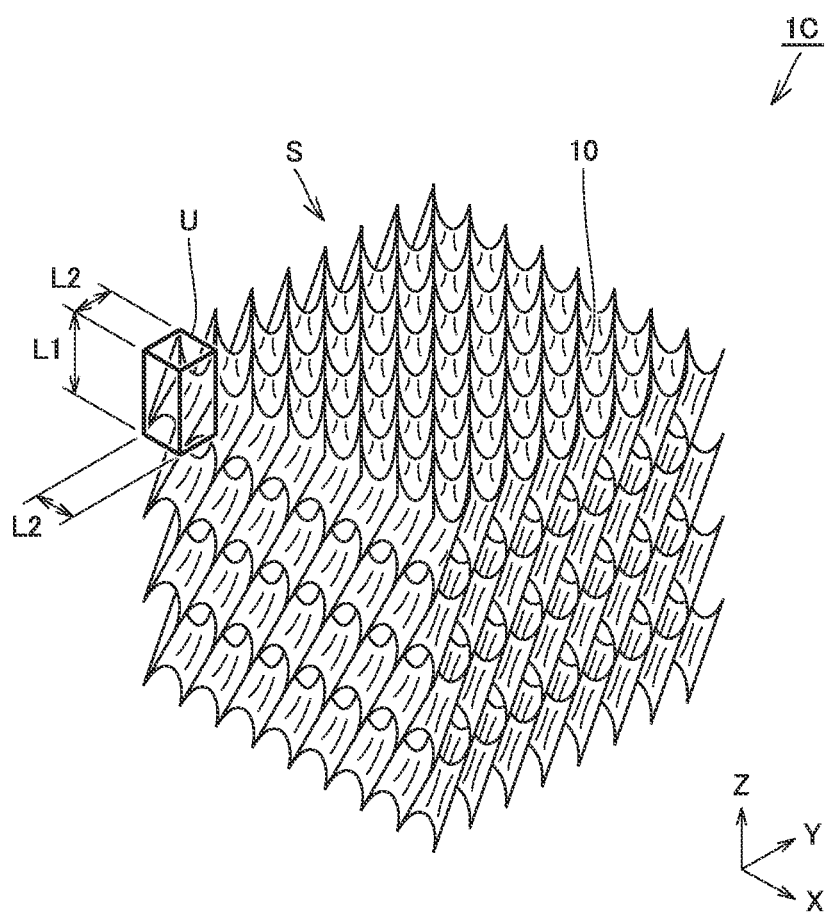
FIG. 6 is a partially cutaway perspective view of a shock absorber according to a third embodiment.

FIG. 6 is a partially cutaway perspective view of a shock absorber according to a third embodiment. A shock absorber 1C according to the present embodiment will be described below with reference to FIG. 6.

As shown in FIG. 6, shock absorber 1C includes three-dimensional structure S having a plurality of unit structures U. The plurality of unit structures U each have a three-dimensional shape formed by wall 10 having an external shape defined by a pair of parallel curved surfaces.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 6 extracts and shows eight unit structures U adjacent to one another in each of the widthwise and depthwise directions and four unit structures U adjacent to one another in the heightwise direction.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1C has a structure in which a thickness is added to a geometrical surface structure. In shock absorber 1C according to the present embodiment, the surface structure is a Schwarz' D structure, which is a type of mathematically defined triply periodic minimal surface.

While shock absorber 1C according to the present embodiment includes unit structures U each occupying a cuboidal space representing a unit space and defined by first to third sides having lengths L1 and L2 (in the present embodiment as well, the second and third sides are equal in length), the shock absorber of the present embodiment, as well as the first embodiment, satisfies $1.1 \leq L1/L2 \leq 4.0$.

Thus shock absorber 1C of the present embodiment, as well as the first embodiment, can be lightweight and have an excellent shock absorbing function, and can be used in various applications.

Fourth Embodiment

Figure 7:
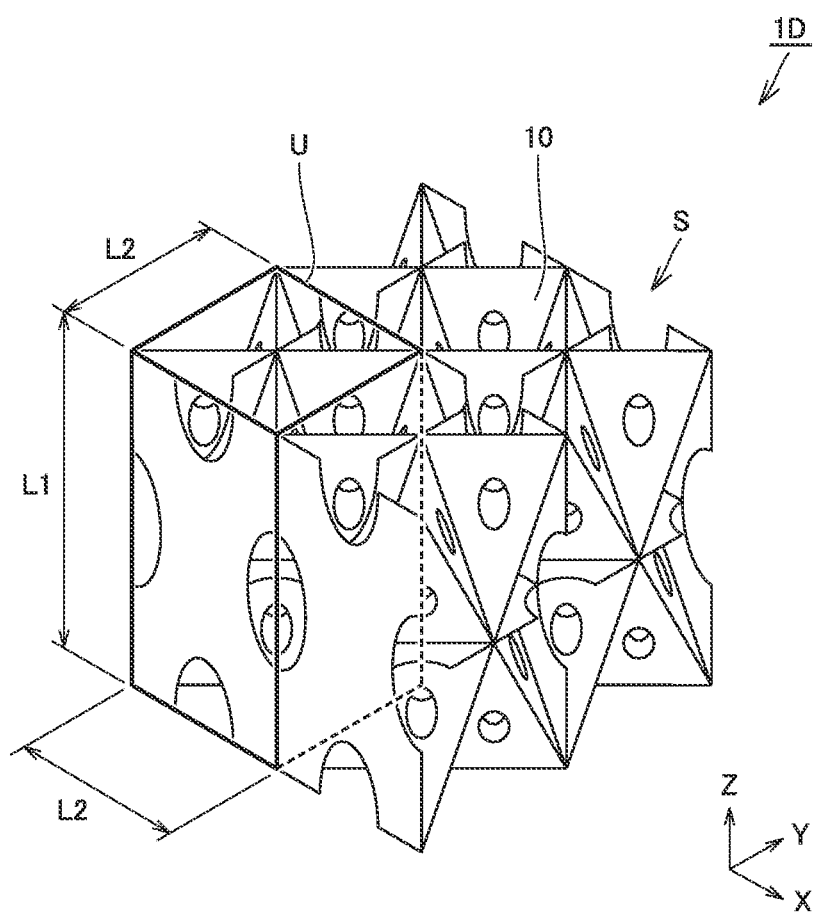
FIG. 7 is a partially cutaway perspective view of a shock absorber according to a fourth embodiment.

FIG. 7 is a partially cutaway perspective view of a shock absorber according to a fourth embodiment. A shock absorber 1D according to the present embodiment will be described below with reference to FIG. 7.

As shown in FIG. 7, shock absorber 1D includes three-dimensional structure S having a plurality of unit structures U. The plurality of unit structures U each have a three-dimensional shape formed by wall 10 having an external shape defined by a pair of parallel planes.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 7 extracts and shows only two unit structures U adjacent to each other in each of the widthwise and depthwise directions.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1D has a structure in which a thickness is added to a geometrical surface structure. In shock absorber 1D according to the present embodiment, the surface structure is a cubic octet structure formed of a plurality of planes disposed to intersect with one another to have a cavity therein.

While shock absorber 1D according to the present embodiment includes unit structures U each occupying a cuboidal space representing a unit space and defined by first to third sides having lengths L1 and L2 (in the present embodiment as well, the second and third sides are equal in length), the shock absorber of the present embodiment, as well as the first embodiment, satisfies 1.1≤L1/L2≤4.0.

Figure 8:
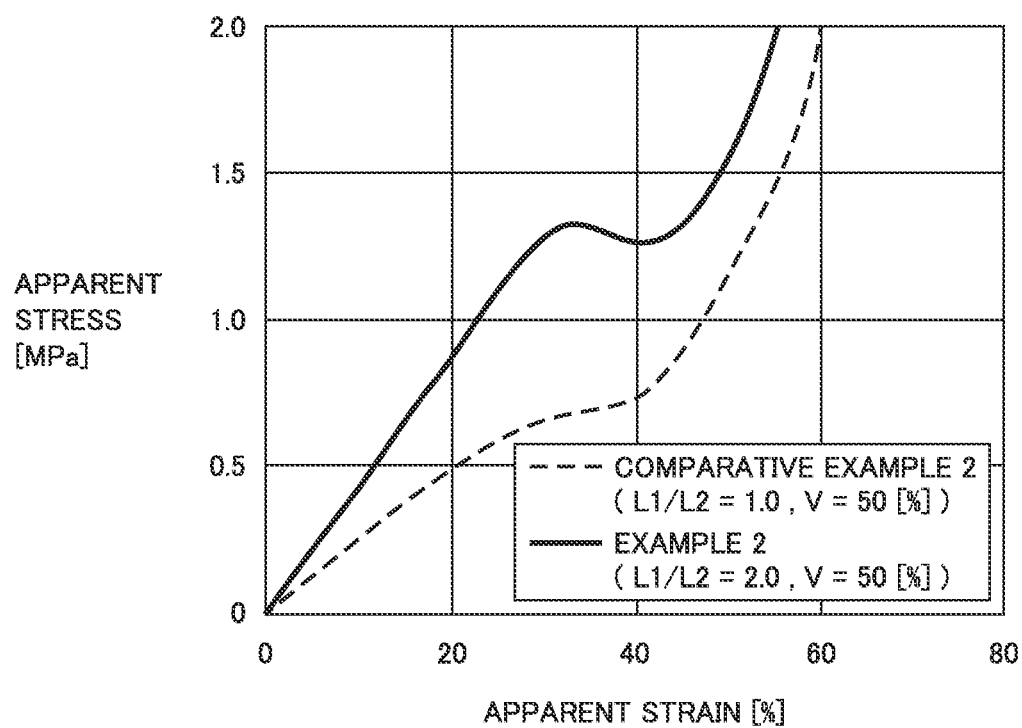
FIG. 8 is a graph showing a result of simulating the shock absorbing functions of shock absorbers according to Comparative Example 2 and Example 2.

FIG. 8 is a graph showing a result of simulating the shock absorbing functions of shock absorbers according to Comparative Example 2 and Example 2. Hereinafter, with reference to FIG. 8, a second verification test conducted to verify an effect 485 obtained when shock absorber 1D according to the present embodiment is used will be described.

In the second verification test, models for the shock absorbers according to Comparative Example 2 and Example 2 were specifically designed and a case in which these models received an external force in a prescribed direction was assumed, and how the models would behave in that case was simulated and their behaviors were individually analyzed. More specifically, a so-called stress-strain curve was obtained for each of these models.

Herein, the shock absorber according to Example 2 is exactly shock absorber 1D according to the present embodiment, and satisfies 1.1≤L1/L2≤4.0. While the shock absorber according to Comparative Example 2 is approximate in configuration to shock absorber 1A according to the present embodiment, it does not satisfy 1.1≤L1/L2≤4.0.

More specifically, the shock absorber according to comparative example 2 includes unit structure U having widthwise, depthwise and heightwise dimensions each of 20 mm and L1/L2 is 1.0. Wall 10 has a thickness of 1.6 mm, in which case a volume ratio V of about 50% is provided.

In contrast, the shock absorber according to example 2 includes unit structure U having widthwise and depthwise dimensions each of 10 mm and L1/L2 is 2.0. Wall 10 has a thickness of 0.8 mm, in which case a volume ratio V of about 50% is provided.

Further, the shock absorbers according to Comparative Example 2 and Example 2 both received external force in the axial direction described above or the heightwise direction. It was assumed that the shock absorbers according to Comparative Example 2 and Example 2 were both formed of a urethane-based acrylic polymer having an elastic modulus of 9 MPa.

As shown in FIG. 8, despite having the same volume ratio as that of the shock absorber according to Comparative Example 2, the shock absorber according to Example 2 has a larger compressive stiffness than the shock absorber according to Comparative Example 2. It is believed that this is because, as well as in verification test 1, unit structure U is reduced in length in the widthwise direction, and accordingly, wall 10 acts more like a partition and thus contributes to enhancing compressive stiffness.

Shock absorber 1D according to the present embodiment described above can thus be a shock absorber which is lightweight and has an excellent shock absorbing function, and can be used for various applications.

Fifth Embodiment

Figure 9:
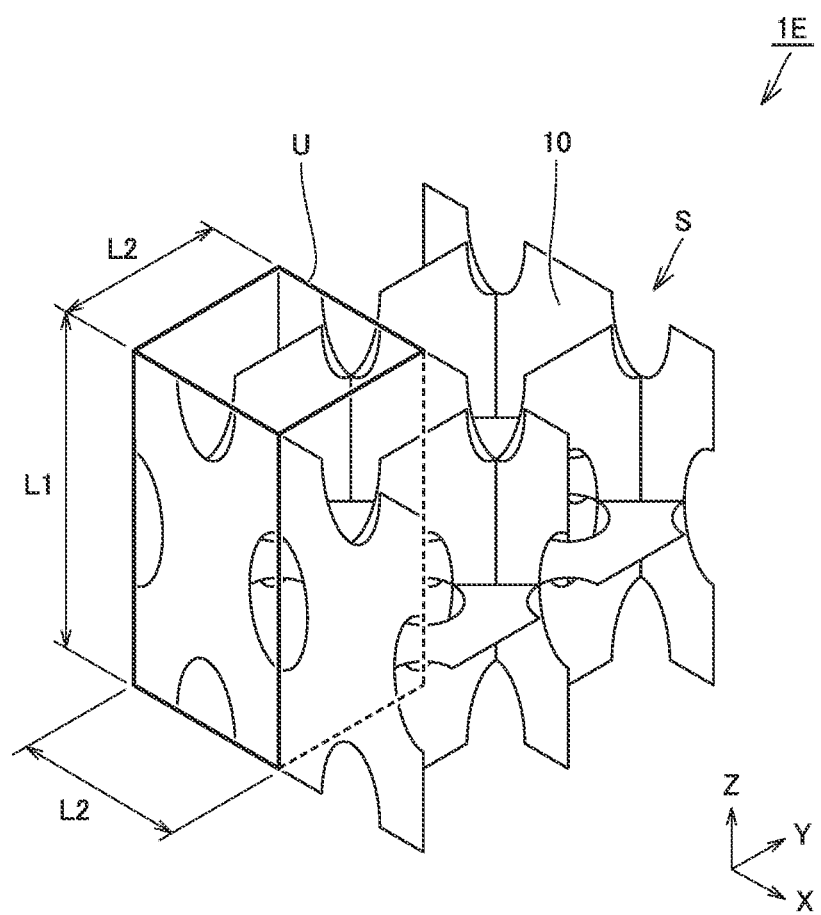
FIG. 9 is a partially cutaway perspective view of a shock absorber according to a fifth embodiment.

FIG. 9 is a partially cutaway perspective view of a shock absorber according to a fifth embodiment. A shock absorber 1E according to the present embodiment will be described below with reference to FIG. 9.

As shown in FIG. 9, shock absorber 1E includes three-dimensional structure S having a plurality of unit structures U. The plurality of unit structures U each have a three-dimensional shape formed by wall 10 having an external shape defined by a pair of parallel planes.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 9 extracts and shows only two unit structures U adjacent to each other in each of the widthwise and depthwise directions.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1E has a structure in which a thickness is added to a geometrical surface structure. In shock absorber 1E according to the present embodiment, the surface structure is a cubic structure formed of a plurality of planes disposed to intersect with one another to have a cavity therein.

While shock absorber 1E according to the present embodiment includes unit structures U each occupying a cuboidal space representing a unit space and defined by first to third sides having lengths L1 and L2 (in the present embodiment as well, the second and third sides are equal in length), the shock absorber of the present embodiment, as well as the first embodiment, satisfies 1.1≤L1/L2≤4.0.

Thus shock absorber 1E of the present embodiment, as well as the first embodiment, can be lightweight and have an excellent shock absorbing function, and can be used in various applications.

Sixth Embodiment

Figure 10:
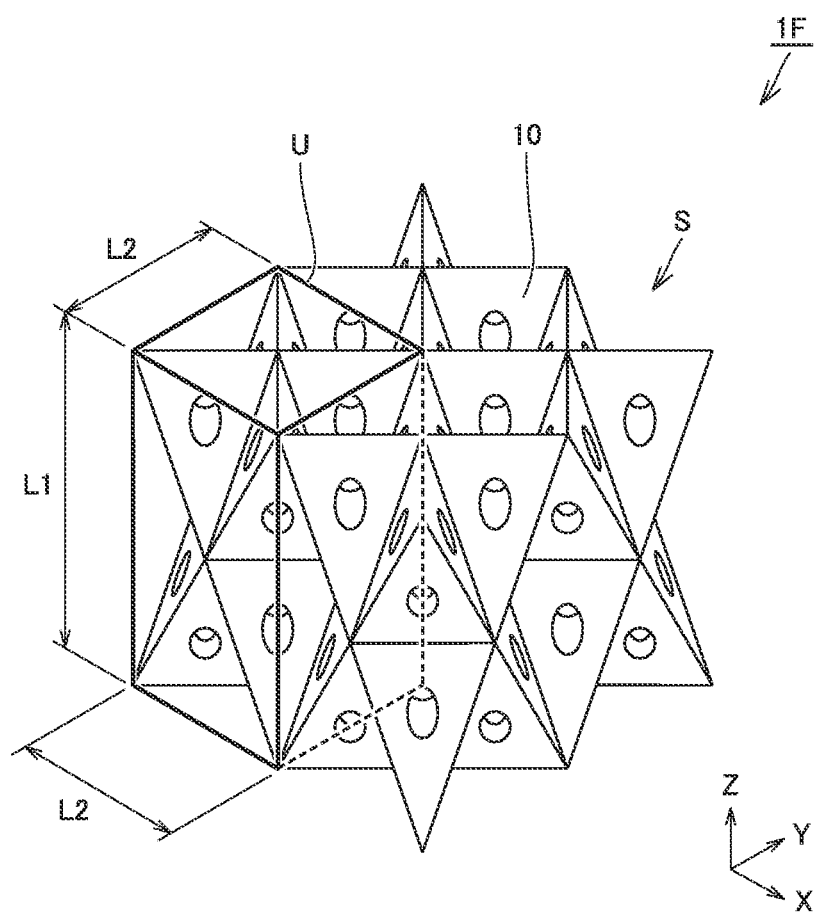
FIG. 10 is a partially cutaway perspective view of a shock absorber according to a sixth embodiment.

FIG. 10 is a partially cutaway perspective view of a shock absorber according to a sixth embodiment. A shock absorber 1F according to the present embodiment will be described below with reference to FIG. 10.

As shown in FIG. 10, shock absorber 1F includes three-dimensional structure S having a plurality of unit structures U. The plurality of unit structures U each have a three-dimensional shape formed by wall 10 having an external shape defined by a pair of parallel planes.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 10 extracts and shows only two unit structures U adjacent to each other in each of the widthwise and depthwise directions.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1F has a structure in which a thickness is added to a geometrical surface structure. In shock absorber 1F according to the present embodiment, the surface structure is an octet structure formed of a plurality of planes disposed to intersect with one another to have a cavity therein.

While shock absorber 1F according to the present embodiment includes unit structures U each occupying a cuboidal space representing a unit space and defined by first to third sides having lengths L1 and L2 (in the present embodiment as well, the second and third sides are equal in length), the shock absorber of the present embodiment, as well as the first embodiment, satisfies $1.1 \leq L1/L2 \leq 4.0$.

Thus shock absorber 1F of the present embodiment, as well as the first embodiment, can be lightweight and have an excellent shock absorbing function, and can be used in various applications.

Seventh Embodiment

Figure 11:
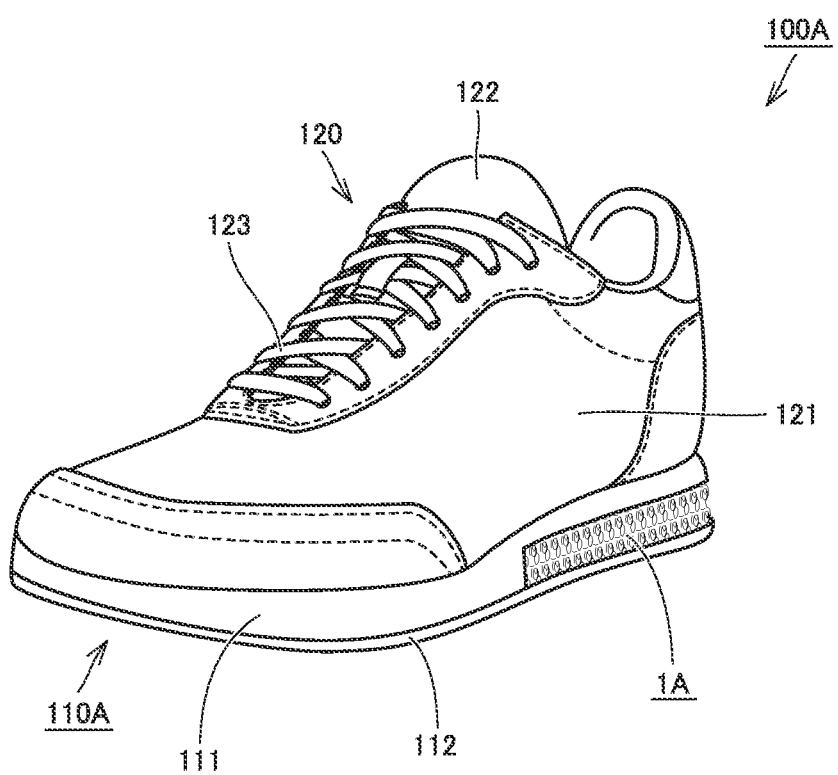
FIG. 11 is a perspective view of a shoe sole and a shoe comprising the shoe sole according to a seventh embodiment.
Figure 12:
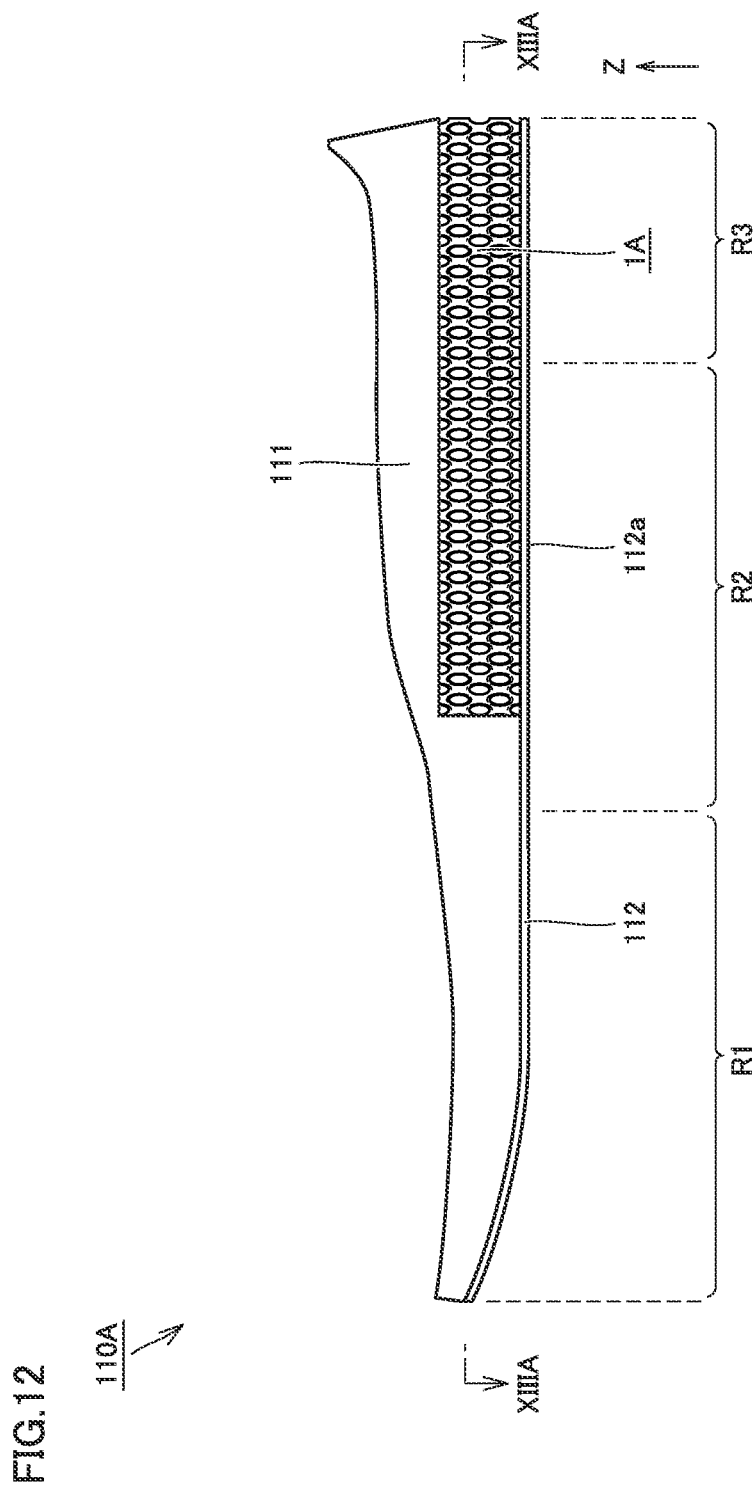
FIG. 12 is a side view of the shoe sole shown in FIG. 11.

FIG. 11 is a perspective view of a shoe sole and a shoe comprising the shoe sole according to a seventh embodiment, and FIG. 12 is a side view of the shoe sole shown in FIG. 11. FIGS. 13A to 13E schematically show an example of how a shock absorber is arranged in the shoe sole shown in FIG. 11. Herein, FIG. 13A is a schematic cross section of the shoe sole taken along a line XIIIA-XIIIA shown in FIG. 12. Hereinafter, a shoe sole 110A and a shoe 100A including shoe sole 110A according to the present embodiment will be described with reference to FIGS. 11, 12, and 13A to 13E. Shoe sole 110A according to the present embodiment includes shock absorber 1A according to the first embodiment.

As shown in FIG. 11, shoe 100A includes shoe sole 110A and an upper 120. Shoe sole 110A is a member that covers the sole of a foot and has a generally flat shape. Upper 120 has a shape that at least covers the entirety of a portion on a side of the bridge of a foot inserted in the shoe, and is located above shoe sole 110A.

Upper 120 includes upper body 121, tongue 122, and shoelace 123. Of these, tongue 122 and shoelace 123 are both fixed to or attached to upper body 121.

Upper body 121 has an upper portion provided with an upper opening for exposing an upper portion of an ankle and a portion of the bridge of a foot. Upper body 121 has a lower portion provided with a lower opening covered with shoe sole 110A as an example and has a lower end French-seamed or the like to form a bottom portion as another example.

Tongue 122 is fixed to upper body 121 by sewing, welding, bonding, or a combination thereof so as to cover a portion of the upper opening provided in upper body 121 that exposes a portion of the bridge of a foot. For upper body 121 and tongue 122, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

Shoelace 123 is composed of a member in the form of a string for drawing portions of a peripheral edge of the upper opening provided to upper body 121 and exposing a portion of the bridge of a foot together in the direction of the width of the foot, and shoelace 123 is passed through a plurality of hole provided through the peripheral edge of the upper opening. When a foot is inserted in upper body 121 and shoelace 123 is tightened, upper body 121 can be brought into close contact with the foot.

As shown in FIGS. 11 to 13, shoe sole 110A has a midsole 111, an outsole 112, and shock absorber 1A. Midsole 111 is located on top of shoe sole 110A and joined to upper 120. Outsole 112 has a lower surface with a tread 112a (see FIG. 12), and is located at a lower portion of shoe sole 110A. Shock absorber 1A is interposed at a prescribed position between midsole 111 and outsole 112.

Midsole 111 preferably has an appropriate strength and also excellently absorbs shock, and from this viewpoint, midsole 111 can for example be a foam material made of resin or rubber, and particularly suitably a foam material made of a thermoplastic resin such as ethylene-vinyl acetate copolymer (EVA), a thermosetting resin such as polyurethane (PU), butadiene rubber, or the like.

Outsole 112 preferably provides excellent wear resistance and excellent grip, and from this viewpoint, outsole 112 can be made of rubber, for example. A tread pattern may be provided on the lower surface of outsole 112, or tread 112a, from the viewpoint of providing enhanced grip.

As shown in FIG. 12, in a fore-aft direction representing a longitudinal direction in a plan view (a lateral direction in the figure), shoe sole 110A is divided into a front foot portion R1 supporting the toes and ball of a foot, a middle foot portion R2 supporting the arch of the foot, and a rear foot portion R3 supporting the heel of the foot. Further, as shown in FIG. 13A, in the direction of the width of the foot, which is a direction intersecting with the longitudinal direction in the plan view, shoe sole 110A is divided into a portion on a medial foot side representing a medial side of the foot in anatomical position (that is, a side closer to the median) (i.e., a portion on side S1 in the figure) and a portion on a lateral foot side representing a lateral side of the foot in anatomical position (that is, a side farther from the median) (i.e., a portion on side S2 in the figure).

Herein, shoe 100A according to the present embodiment has midsole 111 with a notch having a prescribed shape, and shock absorber 1A is accommodated in the notch and thus sandwiched and thus fixed between midsole 111 and outsole 112 in the direction of the thickness of shoe sole 110A.

More specifically, as shown in FIGS. 12 and 13A, midsole 111 is provided with a notch generally in the form of the letter U in a plan view across middle foot portion R2 and rear foot portion R3 along a peripheral edge of shoe sole 110A, and shock absorber 1A formed generally in the form of the letter U in a plan view is disposed to fill the notch. More specifically, shock absorber 1A is disposed along an edge of middle foot portion R2 on the medial foot side, an edge of rear foot portion R3 on the medial foot side, a rear edge of rear foot portion R3, an edge of rear foot portion R3 on the lateral foot side, and an edge of middle foot portion R2 on the lateral foot side.

While shock absorber 1A is not limited to any particular material, as has been described in the first embodiment, it can be formed for example of a resin material or a rubber material, and particularly suitably composed of a thermoplastic resin such as ethylene-vinyl acetate copolymer (EVA), a thermosetting resin such as polyurethane (PU), butadiene rubber or the like. It can also be a polymer composition such as an olefin-based polymer, an amide-based polymer, an ester-based polymer, a urethane-based polymer, a styrene-based polymer, an acrylic polymer or the like.

Herein, as shown in FIG. 12, shock absorber 1A is disposed such that the axial direction, or its heightwise direction (the Z direction indicated in the figure) is orthogonal to tread 112a of shoe sole 110A. With this configuration, a load exerted to shoe sole 110A from the sole of a foot and the ground when landing will be absorbed as shock absorber 1A deforms with large deformability, and a load exerted from shoe sole 110A to the sole of the foot is reduced and a high shock absorbing function can thus be obtained.

Although not specifically described herein, shock absorber 1A satisfies $1.1 \leq L1/L2 \leq 4.0$ and thus has large compressive stiffness, and is thus lightweight and has an excellent shock absorbing function.

Shoe sole 110A and shoe 100A comprising shoe sole 110A according to the present embodiment can thus be lightweight and have an excellent shock absorbing function.

While shock absorber 1A may have a plurality of mutually independent members combined together and mutually bonded together or the like to be generally formed generally in the form of the letter U in a plan view as has been described above, more preferably, it has its entirety configured as a one-piece member to be formed generally in the form of the letter U in a plan view as has been described above. When the latter configuration is adopted, in particular, it is important how shock absorber 1A including a plurality of cuboidal unit structures U is laid out for a non-cuboidal notch while eliminating an unnecessary imbalance of a shock absorbing function in each portion.

Hereinafter, with reference to FIGS. 13A to 13E, a specific designing method will be described which allows a shock absorber comprising a plurality of unit structures U each occupying a cuboidal unit space (in the present embodiment, an elongate, cuboidal unit space with the second and third sides having the same length L2 and the first side having length L1 larger than L2) to be laid out in a non-cuboidal region while eliminating an unnecessary imbalance of a shock absorbing function in each portion simply by changing some or all of the plurality of unit structures U slightly, rather than significantly, in shape.

Initially, as shown in FIG. 13A, a region in which the shock absorber is disposed is divided into an area A1 in which unit structures U can be disposed as they are as they are increased/decreased in number in at least one of the widthwise, depthwise and heightwise directions while they are adjusted in size, and an area A2 in which it is difficult to do so. Specifically, in the present embodiment, of a region in which shock absorber 1A is disposed, an area extending linearly along a peripheral edge of shoe sole 110A on the medial and lateral foot sides corresponds to area A1, and an area extending in a curve along a peripheral edge of shoe sole 110A on the side of the rear end corresponds to area A2.

Herein, in area A1, a plurality of unit structures U each occupying a unit space in the form of a cuboid having a first side adjusted to have length L1 and second and third sides adjusted to have length L2, as shown in FIG. 13B, are disposed to be adjacent to one another, for the sake of illustration. Thus, area A1 has a plurality of unit structures U adjusted in size laid therein without a gap therebetween.

In area A2, a plurality of unit structures U' are disposed to be adjacent to one another, each unit structure U' being configured to occupy a unit space changed in shape to have three pairs of opposite surfaces with a specific one pair having its surfaces non-parallel to each other, as shown in FIG. 13C, for the sake of illustration. Herein, unit structure U' is for example what has been changed in shape to occupy a unit space adjusted so that for example those four sides of the unit space which extend in the widthwise direction (i.e., the second side) have a pair of adjacent sides with a length L2' slightly shorter than length L2 of the other sides. Such a slight change in shape does not significantly change the unit structure's shock absorbing function.

Unit structures U' thus shaped can be individually adjusted in size and orientation and disposed side by side to be laid substantially without a gap along area A2 that extends in a curve as described above. Thus simply by such a slight change in shape, area A2 also comes to exhibit a shock absorbing function equivalent to that of area A1 described above.

Thus such a designing method can be adopted to allow a shock absorber comprising a plurality of unit structures U each occupying a cuboidal unit space to be laid out in a non-cuboidal region while eliminating an unnecessary imbalance of a shock absorbing function in each portion simply by changing some or all of the plurality of unit structures U slightly, rather than significantly, in shape.

Therefore, when this designing method is employed to design a shock absorber, and based thereon, three dimensional additive manufacturing apparatus is employed to manufacture the shock absorber, the shock absorber can be easily obtained as a one-piece member with a variable external shape.

In the designing method described above, when a shock absorber is laid in a more complicated curved area, a plurality of unit structures U1 may be disposed to be adjacent to one another, unit structure U1 being configured to occupy a unit space changed in shape to have three pairs of opposite surfaces with two specific pairs thereof each having its surfaces non-parallel to each other, as shown in FIG. 13D.

Herein, unit structure U1 is for example what has been changed in shape to occupy a unit space adjusted for example so that those four sides of the unit space which extend in the widthwise direction (i.e., the second side) have a pair of adjacent sides with length L2' slightly shorter than length L2 of the other sides and, together therewith, furthermore, for example so that those four sides of the unit space which extend in the heightwise direction (i.e., the first side) have a pair of adjacent sides with a length L1' slightly shorter than length L1 of the other sides. Such a slight change in shape does not significantly change the unit structure's shock absorbing function.

Unit structures U1 thus shaped can be individually adjusted in size and orientation and disposed side by side to be laid substantially without a gap along the complicated curved area. Thus simply by such a slight change in shape, the area also comes to exhibit a shock absorbing function equivalent to that of area A1 described above.

Further, in the designing method described above, when a shock absorber is laid in a linearly extending area, then, in place of unit structure U as shown in FIG. 13B, a plurality of unit structures U2 each as shown in FIG. 13E may be disposed to be adjacent to one another. Herein, unit structure U2 is for example what has been changed in shape to occupy a unit space adjusted to have three pairs of opposite surfaces parallel to each other, with a specific one pair having its surfaces each in the form of a parallelogram.

Note that unit structure U2 as shown for example has a pair of surfaces that is located in the heightwise direction inclined in the widthwise direction by an angle θ to be in the form of a parallelogram. Such a slight change in shape does not significantly change the unit structure's shock absorbing function. Thus, unit structures U2 can also be laid to allow a shock absorber to be laid out without a gap while eliminating an unnecessary imbalance of the shock absorbing function for each portion.

Summary of Disclosure in Embodiments

The first to seventh embodiments and their variations disclose characteristic configurations, as summarized below:

A shock absorber according to an aspect of the present disclosure includes a three-dimensional structure composed of a unit structure repeatedly, regularly and continuously arranged in at least one direction, the unit structure being a three-dimensional shape formed by a wall having an external shape defined by a pair of parallel planes or curved surfaces. When each unit structure occupies a cuboidal space representing a unit space and defined by mutually orthogonal three sides having a first side extending in an axial direction in which the shock absorber exhibits a shock absorbing function as the shock absorber receives a load and second and third sides each extending from one end of the first side in a direction orthogonal to the axial direction, and the first side has a length L1 and a longer one of the second and third sides has a length L2, the shock absorber according to an aspect of the present disclosure satisfies $1.1 \leq L1/L2 \leq 4.0$.

In the shock absorber according to an aspect of the present disclosure, such unit spaces aligned in the axial direction may each have an equal L1/L2.

In the shock absorber according to an aspect of the present disclosure, the three-dimensional structure may be configured by a triply periodic minimal surface with a thickness added thereto.

In the shock absorber according to an aspect of the present disclosure, the three-dimensional structure may have a Schwarz' P structure, a gyroid structure, or a Schwarz' D structure.

In the shock absorber according to an aspect of the present disclosure, the three-dimensional structure may have a meandering portion which is a portion presenting a cross-sectional shape extending in a meandering manner when the three-dimensional structure is cut along at least a specific plane, and in that case, the meandering portion may have a reinforcement portion to reinforce a turning point of the meandering portion. In that case, the reinforcement portion may be configured by an additional thickness portion provided at an internal corner portion of the turning point to make the turning point larger in thickness than another portion.

In the shock absorber according to an aspect of the present disclosure, the three-dimensional structure may be composed of a plurality of planes disposed to intersect with one another with a thickness added thereto so that the three-dimensional structure has a cavity therein.

In the shock absorber according to an aspect of the present disclosure, the three-dimensional structure may have a cubic structure, an octet structure, or a cubic octet structure.

The shock absorber according to an aspect of the present disclosure may be formed of either a resin material or a rubber material.

The shock absorber according to an aspect of the present disclosure may be composed of a polymer composition containing at least one selected from the group consisting of an olefin-based polymer, an amide-based polymer, an ester-based polymer, a urethane-based polymer, a styrene-based polymer, an acrylic polymer, and a methacrylic polymer.

A shoe sole according to an aspect of the present disclosure comprises the shock absorber according to an aspect of the present disclosure as described above.

In the shoe sole according to an aspect of the present disclosure, the shock absorber may be disposed such that the axial direction is orthogonal to a tread.

A shoe according to an aspect of the present disclosure comprises the shoe sole according to an aspect of the present disclosure described above, and an upper provided above the shoe sole.

The configuration as above can provide a shock absorber which is lightweight and has an excellent shock absorbing function, and can be used in various applications, a shoe sole comprising the shock absorber, and a shoe comprising the shoe sole.

Other Embodiments

Further, while in the seventh embodiment the shock absorber according to the first embodiment is applied to a shoe sole and a shoe comprising the shoe sole by way of example, alternatively, the shock absorbers according to the second to sixth embodiments or the shock absorbers according to the first and second variations based on the first embodiment may be applied to a shoe sole and a shoe comprising the shoe sole.

Furthermore, while in the seventh embodiment a shock absorber is disposed along a peripheral edge of a shoe sole at a middle foot portion and a rear side portion by way of example, where the shock absorber is provided is not limited thereto and is variable as appropriate. For example, the shock absorber may be provided on the entire surface of the shoe sole, or a plurality of shock absorbers independent of one another may be provided separately at prescribed positions in the shoe sole. Furthermore, depending on the type the competition in which the shoe is used, how it is used, and the like, the shock absorber may be applied to a portion of the shoe sole on either one of the medial or lateral side. Furthermore, the shock absorber may be provided between the midsole and the upper. When the shock absorber is provided on the entire surface of the shoe sole, then, in place of the midsole, its entirety may be replaced with the shock absorber.

In addition, the shock absorber may have a wall varied in thickness depending on where the shock absorber is disposed with respect to the shoe sole, or may have a surface structure varied depending on where the shock absorber is disposed with respect to the shoe sole. For example, a shock absorber having a surface structure of a Schwarz' P structure may be disposed at a portion of the shoe sole, and a shock absorber having a surface structure of a gyroid structure may be disposed at another portion of the shoe sole.

Further, while in the seventh embodiment, a shock absorber according to the present invention is applied to a shoe sole of a shoe by way of example, the shock absorber according to the present invention is applicable to other shock absorbing applications. For example, the shock absorber according to the present invention can be used in various applications such as packaging materials, floor materials for buildings (for example, houses), surface materials for paving paths, surface materials for sofas and chairs, tires, and the like.

The characteristic configurations disclosed in the first to seventh embodiments and their variations can be combined with one another in a range that does not depart from the gist of the present invention.

Eighth Embodiment

Figure 14:
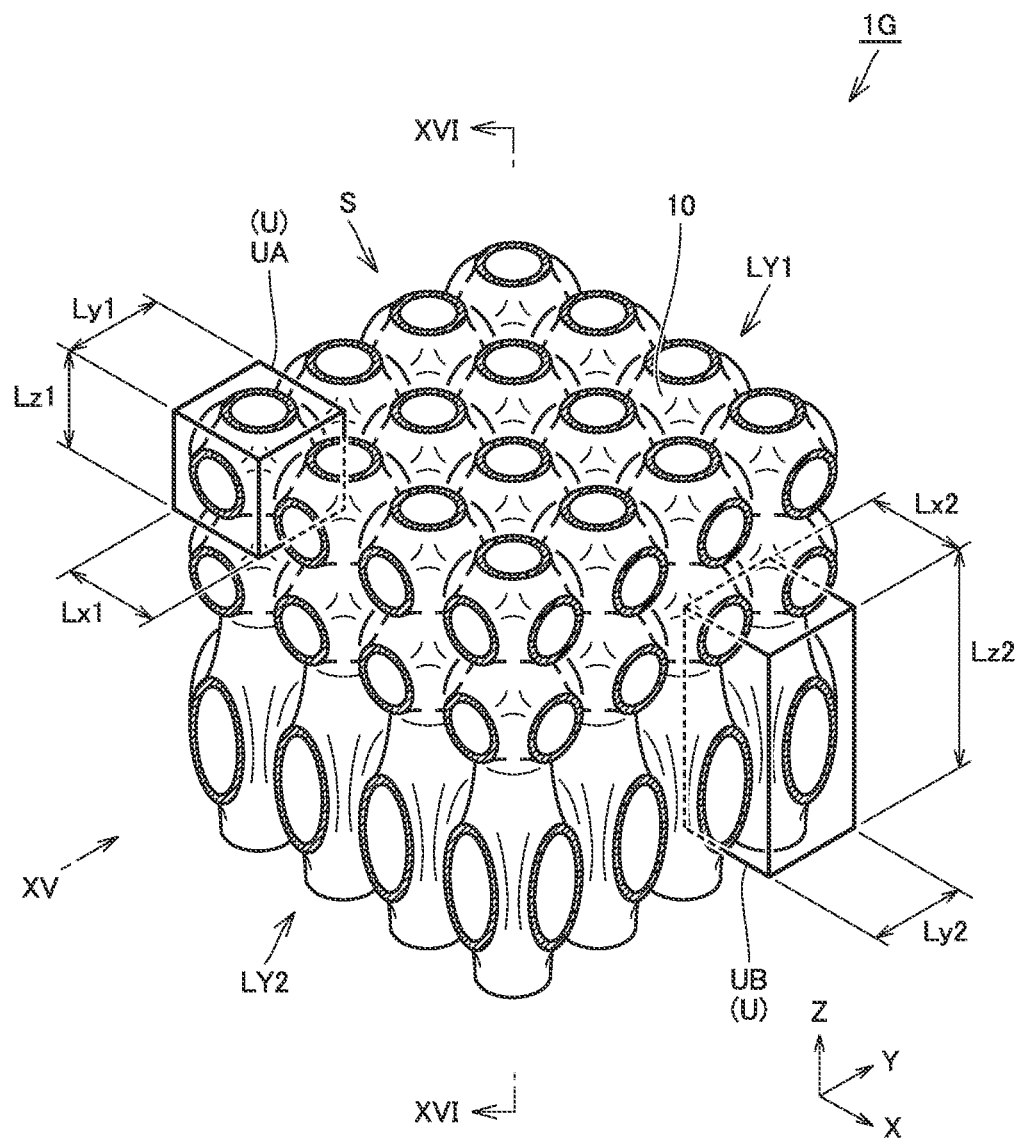
FIG. 14 is a partially cutaway perspective view of a shock absorber according to an eighth embodiment.
Figure 15:
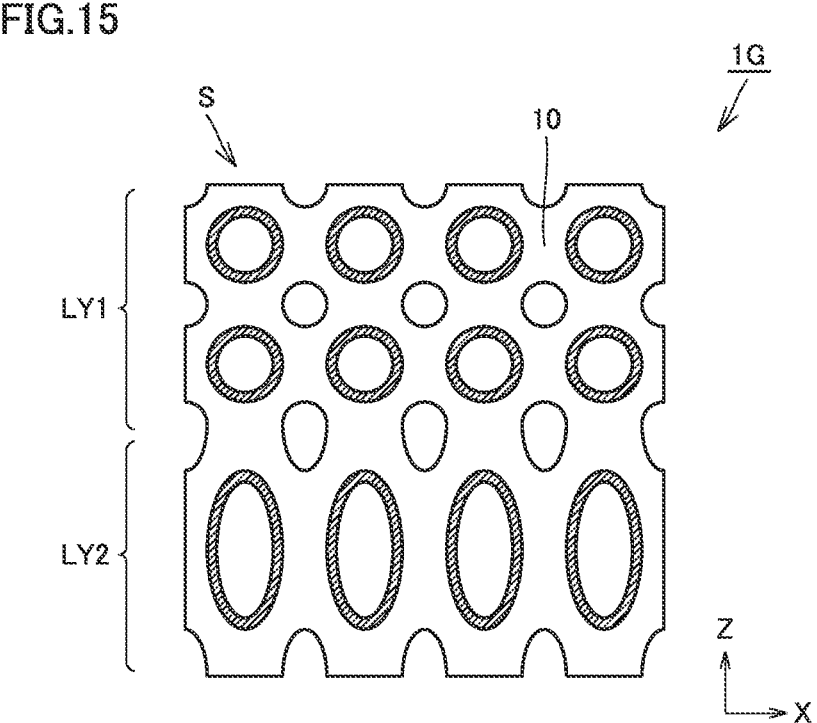
FIG. 15 is a front view of the shock absorber shown in FIG. 14.
Figure 16:
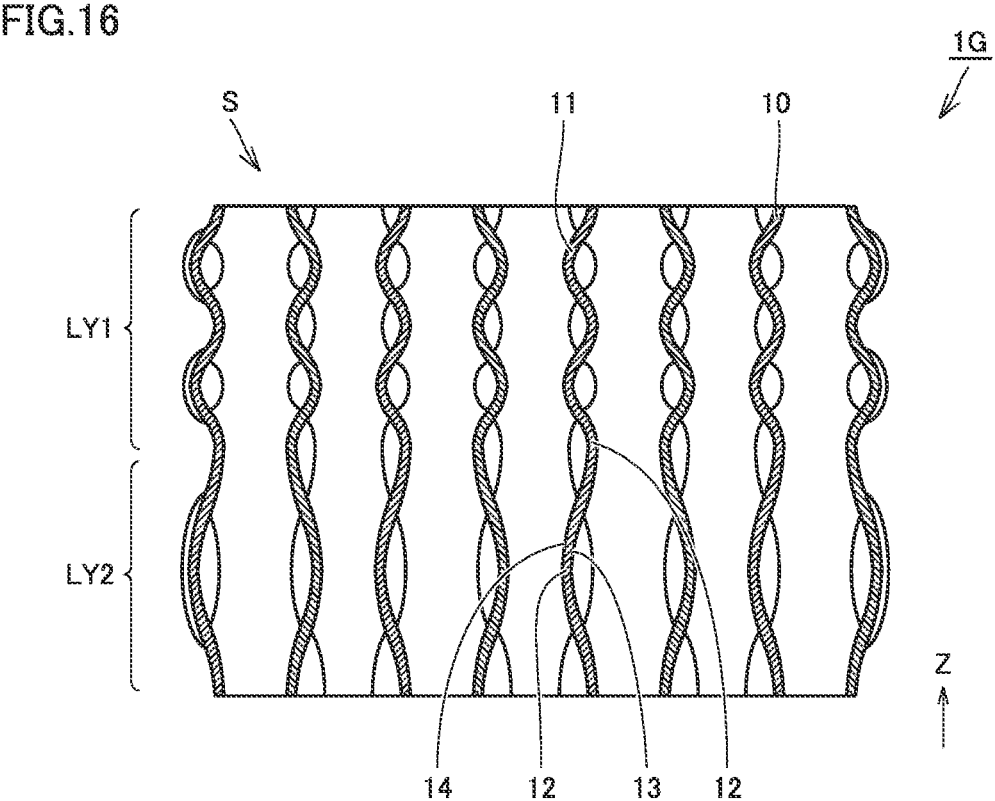
FIG. 16 is a cross section of the shock absorber shown in FIG. 14.

FIG. 14 is a partially cutaway perspective view of a shock absorber according to an eighth embodiment. FIG. 15 is a front view of the shock absorber seen in a direction indicated by an arrow XV shown in FIG. 14. FIG. 16 is a cross section of the shock absorber taken along a line XVI-XVI shown in FIG. 14. Hereinafter, a shock absorber 1G according to the present embodiment will be described with reference to FIGS. 14 to 16.

As shown in FIGS. 14 to 16, shock absorber 1G includes three-dimensional structure S having a plurality of unit structures U (see FIG. 14, in particular). The plurality of unit structures U each have a three-dimensional shape formed by wall 10 having an external shape defined by a pair of parallel curved surfaces.

Herein, in FIG. 14, in order to facilitate understanding, reference character U does not denote the unit structure in a strict sense; rather, it denotes a hexahedral (cuboidal, in particular, in the present embodiment) unit space occupied by the unit structure.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIGS. 14 to 16 extract and show four unit structures U adjacent to one another in each of the widthwise and depthwise directions and three unit structures U adjacent to one another in the heightwise direction.

While in the present embodiment, shock absorber 1G composed of a large number of unit structures U provided in each of the widthwise, depthwise and heightwise directions will be indicated as an example for the sake of illustration, how many unit structures U are repeated in the widthwise, depthwise and heightwise directions is not particularly limited, and two or more unit structures arranged in at least one of the three directions suffice.

Shock absorber 1G according to the present embodiment is intended to exhibit a shock absorbing function in the heightwise direction (the Z direction shown in the figure). Accordingly, when shock absorber 1G receives a load, shock absorber 1G exhibits the shock absorbing function in an axial direction, which will match the heightwise direction described above.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1G has a structure in which a thickness is added to a geometrical surface structure. In shock absorber 1G according to the present embodiment, the surface structure is a Schwarz' P structure, which is a type of mathematically defined triply periodic minimal surface. Note that a minimal surface is defined as a curved surface of those having a given closed curve as a boundary that is minimal in area.

As shown in FIG. 16, three-dimensional structure S that is a Schwarz' P structure with a thickness added thereto has meandering portion 11 which is a portion presenting a cross-sectional shape extending in a meandering manner when three-dimensional structure S is cut along a specific plane. In the present embodiment, the specific plane is a plane orthogonal to the plane of the sheet of FIG. 14 and parallel to the line XVI-XVI.

While there will be three types of meandering portions 11 in total in terms of the structure of three-dimensional structure S: one extending in the widthwise direction; one extending in the depthwise direction; and one extending in the heightwise direction, herein, meandering portion 11 which appears in the cross section shown in FIG. 16, that is, extends in the heightwise direction (i.e., the Z direction), is noted.

Meandering portion 11 extending in the heightwise direction has a plurality of turning points 12 located in the heightwise direction, and turning point 12 is provided with internal corner portion 13 and external corner portion 14. Of these portions, internal corner portion 13 is a portion which appears in the above cross-sectional shape to have a concave shape on a surface of wall 10, and external corner portion 14 is a portion which appears in the above cross-sectional shape to have a convex shape on a surface of wall 10. Herein, a distance between meandering portion 11 extending in the heightwise direction and meandering portion 11 adjacent thereto varies depending on the location in the heightwise direction, and the distance periodically increases and decreases in the heightwise direction.

As shown in FIGS. 14 to 16, shock absorber 1G according to the present embodiment includes as unit structure U two types of unit structures UA and UB having different external shapes. Unit structure UA occupies a unit space in the form of a regular hexahedron and unit structure UB occupies a unit space in the form of a hexahedron elongate in the heightwise direction.

When the unit space occupied by unit structure UA is defined by mutually orthogonal three sides having a first side extending in the heightwise direction (that is, the Z direction), a second side extending in the widthwise direction (that is, the X direction) and a third side extending the depthwise direction (that is, the Y direction), unit structure UA is configured such that the first to third sides are all equal in length. That is, with reference to FIG. 14, when unit structure UA has a widthwise dimension Lx1, a depthwise dimension Ly1 and a heightwise dimension Lz1, then, Lx1=Ly1=Lz1 is satisfied. Note that, in FIG. 14, unit structure UA is disposed in two layers on the upper side of three-dimensional structure S (that is, a layer in a range represented by a reference character LY1).

When the unit space occupied by unit structure UB is defined by mutually orthogonal three sides having a first side extending in the heightwise direction (that is, the Z direction), a second side extending in the widthwise direction (that is, the X direction) and a third side extending the depthwise direction (that is, the Y direction), unit structure UB is configured such that the second and third sides are equal in length and the first side is twice in length the second and third sides. That is, with reference to FIG. 14, when unit structure UB has a widthwise dimension Lx2, a depthwise dimension Ly2 and a heightwise dimension Lz2, then, Lx2=Ly2=Lz2/2 is satisfied. Note that, in FIG. 14, unit structure UB is disposed in a single layer on the lower side of three-dimensional structure S (that is, a layer in a range represented by a reference character LY2).

Thus, in shock absorber 1G according to the present embodiment, unit structures U with their respective unit spaces having external shapes with different dimensions (that is, the two types of unit structures UA and UB having different external shapes described above) will be disposed in the axial direction (that is, the height direction) in which shock absorber 1G exhibits a shock absorbing function as the shock absorber receives a load.

Three-dimensional structure S including as unit structure U unit structures each occupying a unit space having an external shape with a different dimension thus allows a shock absorber to be lightweight and have an excellent shock absorbing function, which will more specifically be described hereinafter.

Note that when, of unit structure U's dimensions described above, a dimension in the heightwise direction or the axial direction in which a shock absorbing function is intended to be exhibited is represented as L1 and the longer one of the remaining, widthwise and depthwise dimensions is represented as L2, and at least one of unit structures UA and UB satisfies the condition of $1.1 \leq L1/L2 \leq 4.0$, then a portion which satisfies that condition can obtain large compressive stiffness. In contrast, when at least one of unit structures UA and UB satisfies the condition of $0.1 \leq L1/L2 \leq 0.9$, then, a portion which satisfies that condition is reduced in compressive stiffness and can thus obtain high deformability. Note, however, that unit structures UA and UB do not necessarily satisfy the condition, and whether the condition is satisfied is arbitrary.

While shock absorber 1G may be manufactured in any method, it can be additively manufactured using a three dimensional additive manufacturing apparatus for example.

While shock absorber 1G may basically be formed of any material having a large elastic force, it is preferably formed of a resin material or a rubber material. More specifically, when shock absorber 1G is formed of resin, shock absorber 1G can be formed for example of thermoplastic resin such as ethylene-vinyl acetate copolymer (EVA) or can be formed for example of thermosetting resin such as polyurethane (PU). When shock absorber 1G is formed of rubber, it can be formed for example of butadiene rubber.

Shock absorber 1G can be composed of a polymer composition. In that case, an example of a polymer to be contained in the polymer composition includes olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and the like.

The polymer may be an amide-based polymer such as an amide-based elastomer and an amide-based resin. Examples of the amide-based polymer include polyamide 6, polyamide 11, polyamide 12, polyamide 66, and polyamide 610.

The polymer may be an ester-based polymer such as an ester-based elastomer and an ester-based resin. Examples of the ester-based polymer include polyethylene terephthalate and polybutylene terephthalate.

The polymer may be a urethane-based polymer such as a urethane-based elastomer and a urethane-based resin. Examples of the urethane-based polymer include polyester-based polyurethane and polyether-based polyurethane.

The polymer may be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), and acrylonitrile butadiene styrene resin (ABS).

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, epoxy-based methacrylic polymers, conjugated diene polymer-based methacrylic polymers and hydrogenated products thereof, polyvinyl chloride-based resins, silicone-based elastomers, butadiene rubber (BR), isoprene rubber (IR), chloroprene (CR), natural rubber (NR), styrene-butadiene rubber (SBR), acrylonitrile-butadiene rubber (NBR), butyl rubber (IIR), and the like.

As has been described above, shock absorber 1G according to the present embodiment will be lightweight and have an excellent shock absorbing function. This is significantly attributed to a structural feature (a feature in shape) of shock absorber 1G. Hereinafter, this point will be described in detail based on a result of a third verification test conducted by the present inventor.

Figure 17:
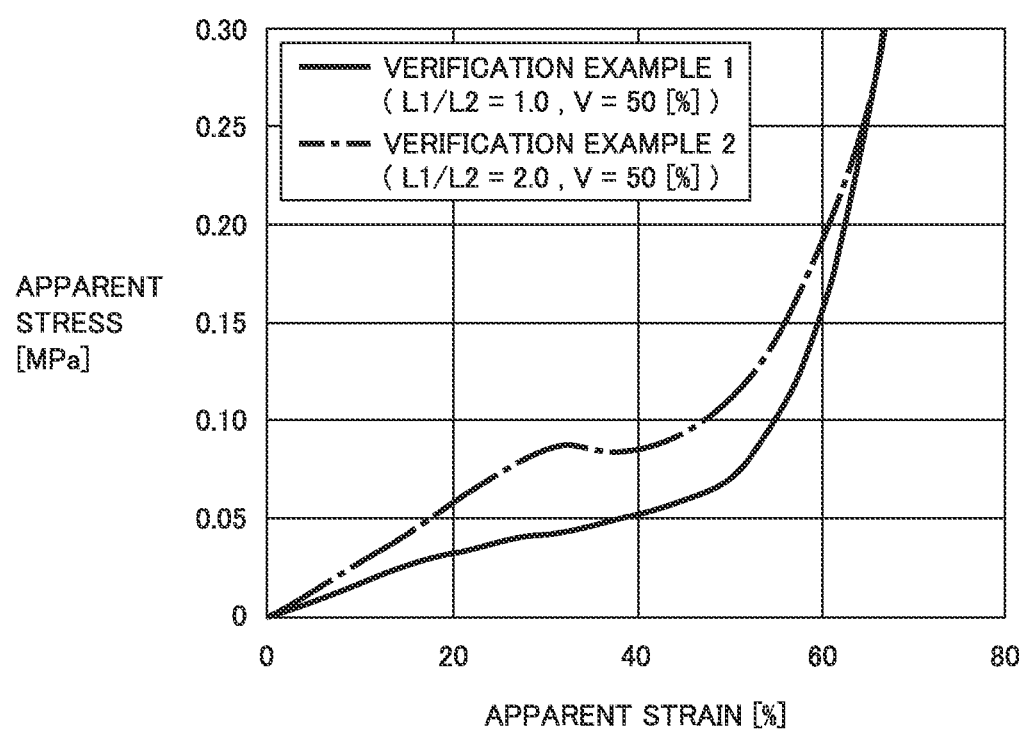
FIG. 17 is a graph showing a result of simulating the shock absorbing functions of the shock absorbers for verification examples 1 and 2.

FIG. 17 is a graph showing a result of simulating the shock absorbing functions of the shock absorbers for verification examples 1 and 2.

In the third verification test, models for shock absorbers for verification examples 1 and 2 were specifically designed and a case in which these models received an external force in a prescribed direction was assumed, and how the models would behave in that case was simulated and their behaviors were individually analyzed. More specifically, a so-called stress-strain curve was obtained for each of these models.

Herein, the shock absorber according to verification example 1 has its three-dimensional structure S entirely composed of unit structure UA described above. More specifically, the shock absorber according to verification example 1 includes unit structure UA having widthwise, depthwise and heightwise dimensions Lx1, Ly1 and Lz1 each of 10 mm, and an aspect ratio represented by L1 and L2 described above, or L1/L2, is 1.0. Wall 10 has a thickness of 2.36 mm, in which case a volume ratio V of about 50% is provided.

In contrast, the shock absorber according to verification example 2 has its three-dimensional structure S entirely composed of unit structure UB described above. More specifically, the shock absorber according to verification example 2 includes unit structure UB having widthwise and depthwise dimensions Lx2 and Ly2 each of 5 mm and a heightwise dimension Lz2 of 10 mm, and an aspect ratio represented by L1 and L2 described above, or L1/L2, is 2.0. Wall 10 has a thickness of 1.36 mm, in which case a volume ratio V of about 50% is provided.

Further, the shock absorbers according to verification examples 1 and 2 both received external force in the axial direction described above or the heightwise direction. It was assumed that the shock absorbers according to verification examples 1 and 2 were both formed of a urethane-based acrylic polymer having an elastic modulus of 0.5 MPa.

To increase compressive stiffness, unit structure U may typically have wall 10 increased in thickness. However, when wall 10 is increased in thickness, volume ratio V will also increase accordingly, so that the larger wall 10 is in thickness, the larger volume ratio V is, resulting in the shock absorber being heavier. That is, there is a so-called trade-off relationship between ensuring compressive stiffness and reducing weight.

However, as shown in FIG. 17, despite having the same volume ratio as that of the shock absorber according to verification example 1, the shock absorber according to verification example 2 has a larger compressive stiffness than the shock absorber according to verification example 1. It is believed that this is because the shock absorber according to verification example 2 has the unit structure reduced in length in the widthwise direction, and accordingly has wall 10 acting more like a partition and thus contributes to enhancing compressive stiffness.

Accordingly, based on the result of verification example 3, it can be seen that when compared with obtaining locally large compressive stiffness by increasing wall 10 of the portion of interest entirely in thickness, shock absorber 1G including a unit structure having an external shape with a different dimension, as described above, can significantly suppress an increase in weight of the shock absorber.

Shock absorber 1G according to the present embodiment described above can thus be a shock absorber which is lightweight and has an excellent shock absorbing function, and can be used for various applications.

Note that while in the present embodiment, as has been discussed above, of unit structures U, those each occupying a unit space having an external shape with a different dimension are disposed in the axial direction in which the shock absorber 1G exhibits a shock absorbing function as the shock absorber receives a load, the unit structures may be disposed in a direction intersecting with the axial direction in which the shock absorber exhibits the shock absorbing function as the shock absorber receives the load. Such a configuration also allows the shock absorber to be a lightweight and excellently shock absorbing shock absorber which can be used in various applications.

Note that, as a three-dimensional shape formed by a wall having an external shape defined by a pair of parallel curved surfaces, other than that in which a thickness is added to a Schwarz' P structure, as described above, there are also a three-dimensional shape in which a thickness is added to a gyroid structure, a three-dimensional shape in which a thickness is added to a Schwarz' D structure, and the like. The gyroid structure and the Schwarz' D structure are also a type of mathematically defined triply periodic minimal surface, as well as the Schwarz' P structure described above.

Figure 18:
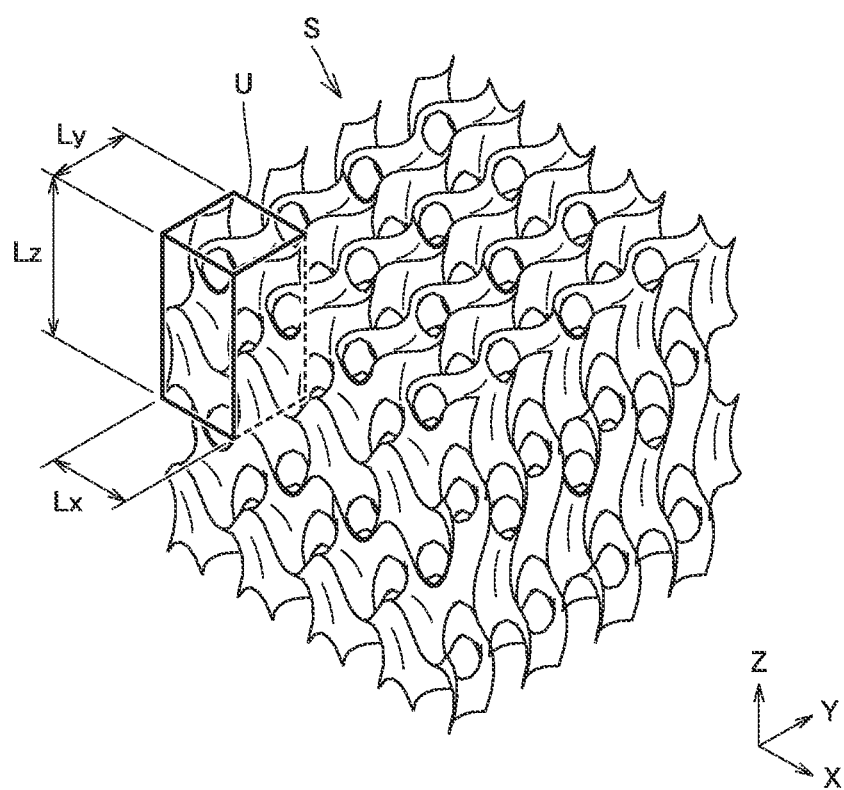
FIG. 18 is a partially cutaway perspective view showing a basic configuration of another example of a geometrical surface structure with a curved surface serving as a reference.

FIG. 18 is a partially cutaway perspective view showing a basic configuration of a gyroid structure. FIG. 18 extracts and shows four unit structures U adjacent to one another in each of the widthwise and depthwise directions and two unit structures U adjacent to each other in the heightwise direction. Note that unit structure U shown in FIG. 18 occupies a unit space in the form of a hexahedron elongate in the heightwise direction.

Figure 19:
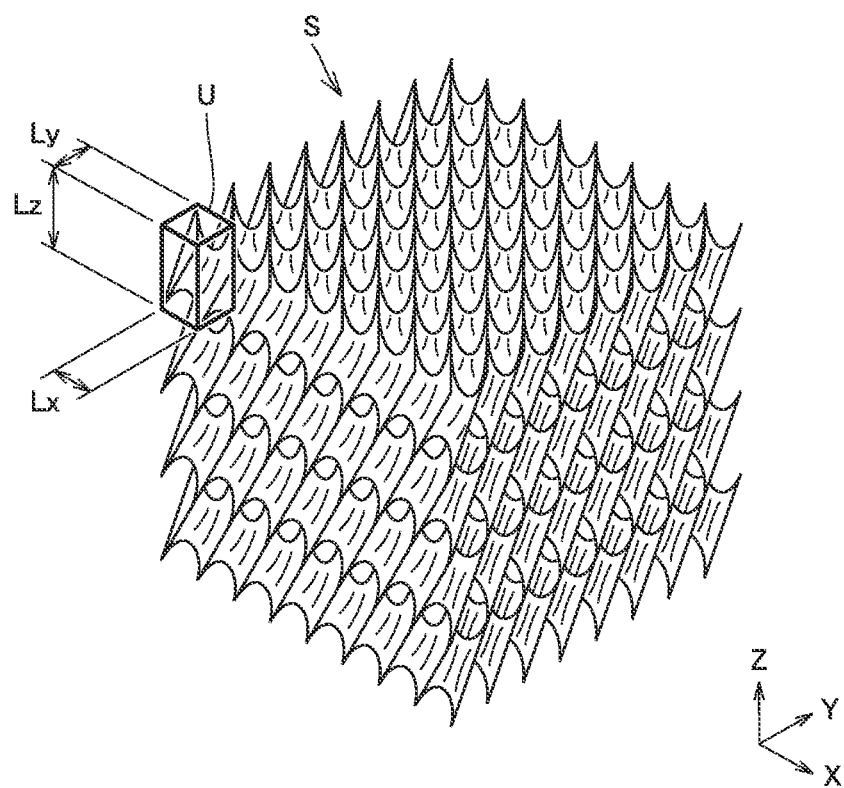
FIG. 19 is a partially cutaway perspective view showing a basic configuration of still another example of a geometrical surface structure with a curved surface serving as a reference.

FIG. 19 is a partially cutaway perspective view showing a basic configuration of a Schwarz' D structure. FIG. 19 extracts and shows eight unit structures U adjacent to one another in each of the widthwise and depthwise directions and four unit structures U adjacent to one another in the heightwise direction. Note that unit structure U shown in FIG. 19 occupies a unit space in the form of a hexahedron elongate in the heightwise direction.

Although not specifically shown herein, a shock absorber including as a shock absorbing region three-dimensional structure S in which a thickness is added to the gyroid structure, the Schwarz' D structure or the like may be configured such that, as has been discussed above, three-dimensional structure S includes as unit structure U unit structures each occupying a unit space having an external shape with a different dimension. Such a configuration also allows the shock absorber to be a lightweight and excellently shock absorbing shock absorber which can be used in various 1105 applications.

Ninth Embodiment

Figure 20:
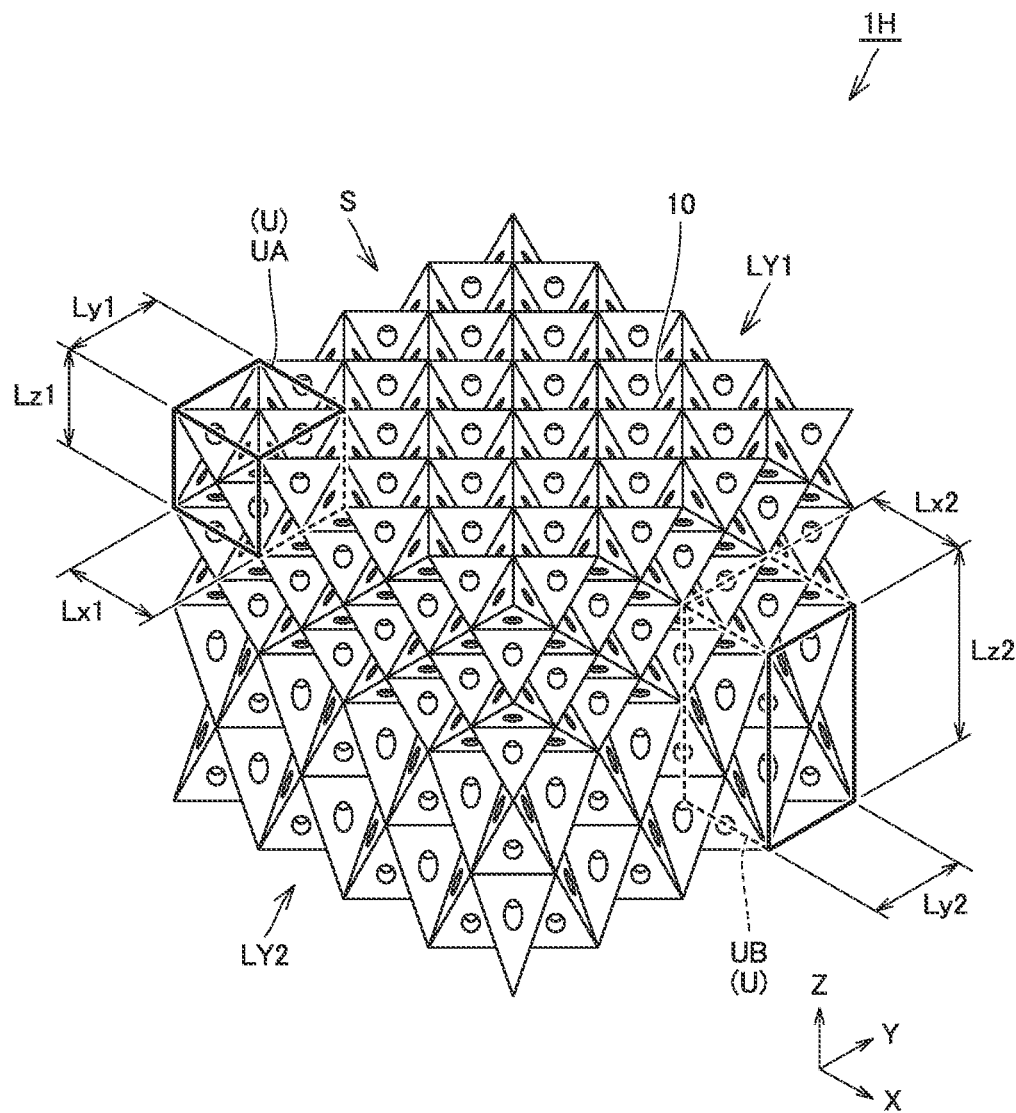
FIG. 20 is a partially cutaway perspective view of a shock absorber according to a ninth embodiment.

FIG. 20 is a partially cutaway perspective view of a shock absorber according to a ninth embodiment. A shock absorber 1H according to the present embodiment will be described below with reference to FIG. 20.

As shown in FIG. 20, shock absorber 1H includes three-dimensional structure S having a plurality of unit structures U. The plurality of unit structures U each have a three-dimensional shape formed by wall 10 having an external shape defined by a pair of parallel planes.

Herein, in FIG. 20, in order to facilitate understanding, reference character U does not denote the unit structure in a strict sense; rather, it denotes a hexahedral (cuboidal, in particular, in the present embodiment) unit space occupied by the unit structure.

The plurality of unit structures U are repeatedly, regularly and continuously arranged in each of the widthwise direction (the X direction indicated in the figure), the depthwise direction (the Y direction indicated in the figure), and the heightwise direction (the Z direction indicated in the figure). FIG. 20 extracts and shows four unit structures U adjacent to one another in each of the widthwise and depthwise directions and three unit structures U adjacent to one another in the heightwise direction.

As has been described above, the plurality of unit structures U each have a three-dimensional shape formed by wall 10. Therefore, as the plurality of unit structures U are continuously connected to one another, three-dimensional structure S is also composed of a set of walls 10.

Herein, three-dimensional structure S included in shock absorber 1H has a structure in which a thickness is added to a geometrical surface structure. In shock absorber 1H according to the present embodiment, the surface structure is an octet structure formed of a plurality of planes disposed to intersect with one another to have a cavity therein.

As shown in FIG. 20, shock absorber 1H according to the present embodiment includes as unit structure U two types of unit structures UA and UB having different external shapes. Unit structure UA occupies a unit space in the form of a regular hexahedron and unit structure UB occupies a unit space in the form of a hexahedron elongate in the heightwise direction.

Herein, unit structure UA is, as well as in the eighth embodiment, configured such that the first to third sides that define a unit space are all equal in length. That is, when unit structure UA has widthwise dimension $Lx1$, depthwise dimension $Ly1$ and heightwise dimension $Lz1$, then, $Lx1=Ly1=Lz1$ is satisfied. Note that, in FIG. 20, unit structure UA is disposed in two layers on the upper side of three-dimensional structure S (that is, a layer in a range represented by reference character LY1).

In contrast, unit structure UB is, as well as in the eighth embodiment, configured such that the first to third sides that define a unit space have the second and third sides equal in length and the first side twice in length the second and third sides. That is, when unit structure UB has widthwise dimension $Lx2$, depthwise dimension $Ly2$ and heightwise dimension $Lz2$, then, $Lx2=Ly2=Lz2/2$ is satisfied. Note that, in FIG. 20, unit structure UB is disposed in a single layer on the lower side of 1150 three-dimensional structure S (that is, a layer in a range represented by reference character LY2).

Thus, in shock absorber 1H according to the present embodiment as well, unit structures U each occupying a unit space having an external shape with a different dimension (that is, the two types of unit structures UA and UB having different external shapes described above) will be disposed in the axial direction (that is, the height direction) in which shock absorber 1H exhibits a shock absorbing function as the shock absorber receives a load.

Note that when, of unit structure U's dimensions described above, a dimension in the heightwise direction or the axial direction in which a shock absorbing function is intended to be exhibited is represented as L1 and the longer one of the remaining, widthwise and depthwise dimensions is represented as L2, and at least one of unit structures UA and UB satisfies the condition of $1.1 \leq L1/L2 \leq 4.0$, then a portion which satisfies that condition can obtain large compressive stiffness. In contrast, when at least one of unit structures UA and UB satisfies the condition of $0.1 \leq L1/L2 \leq 0.9$, then, a portion which satisfies that condition is reduced in compressive stiffness and can thus obtain high deformability. Note, however, that unit structures UA and UB do not necessarily satisfy the condition, and whether the condition is satisfied is arbitrary.

Figure 21:
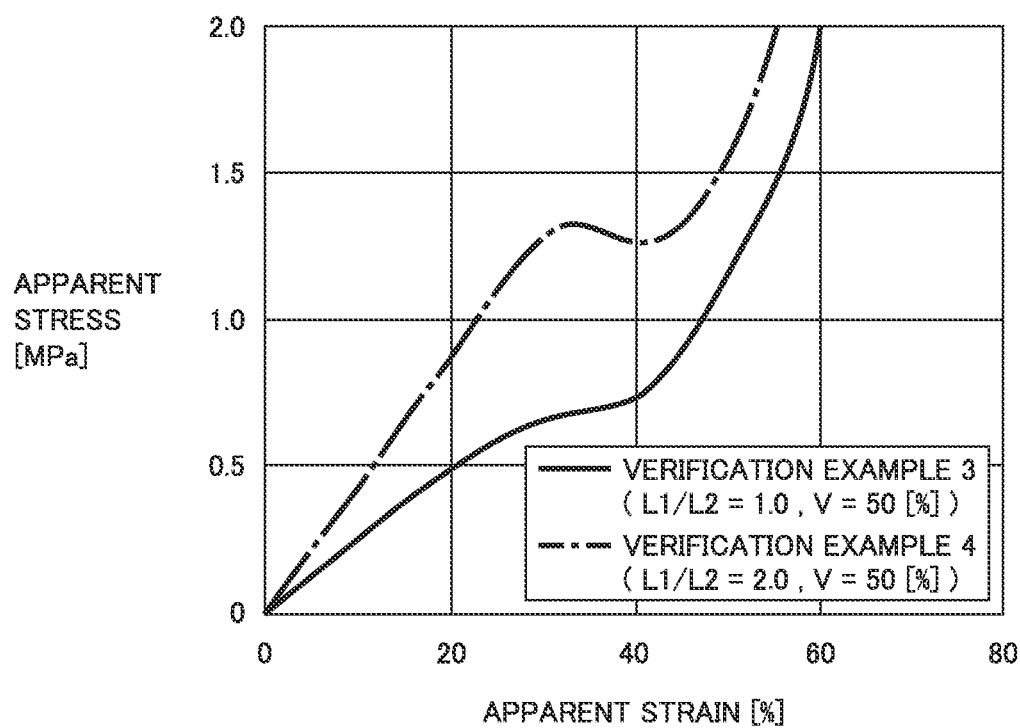
FIG. 21 is a graph showing a result of simulating the shock absorbing functions of the shock absorbers for verification examples 3 and 4.

FIG. 21 is a graph showing a result of simulating the shock absorbing functions of the shock absorbers for verification examples 3 and 4. Hereinafter, with reference to FIG. 21, a fourth verification test conducted to verify an effect obtained when shock absorber 1H according to the present embodiment is used will be described.

In the fourth verification test, models for shock absorbers for verification examples 3 and 4 were specifically designed and a case in which these models received an external force in a prescribed direction was assumed, and how the models would behave in that case was simulated and their behaviors were individually analyzed. More specifically, a so-called stress-strain curve was obtained for each of these models.

Herein, the shock absorber according to verification example 3 has its three-dimensional structure S entirely composed of unit structure UA described above. More specifically, the shock absorber according to verification example 3 includes unit 1180 structure UA having widthwise, depthwise and heightwise dimensions Lx1, Ly1 and Lz1 each of 20 mm, and an aspect ratio represented by L1 and L2 described above, or L1/L2, is 1.0. Wall 10 has a thickness of 1.6 mm, in which case a volume ratio V of about 50% is provided.

In contrast, the shock absorber according to verification example 4 has its three-dimensional structure S entirely composed of unit structure UB described above. More specifically, the shock absorber according to verification example 4 includes unit structure UB having widthwise and depthwise dimensions Lx2 and Ly2 each of 10 mm and a heightwise dimension Lz2 of 20 mm, and an aspect ratio represented by L1 and L2 described above, or L1/L2, is 2.0. Wall 10 has a thickness of 0.8 mm, in which case a volume ratio V of about 50% is provided.

Further, the shock absorbers according to the verification examples 3 and 4 both received external force in the axial direction described above or the heightwise direction. It was assumed that the shock absorbers according to verification examples 3 and 4 were both formed of a urethane-based acrylic polymer having an elastic modulus of 9 MPa.

As shown in FIG. 21, despite having the same volume ratio as that of the shock absorber according to verification example 3, the shock absorber according to verification example 4 has a larger compressive stiffness than the shock absorber according to verification example 3. It is believed that this is because the shock absorber according to verification example 4 has a unit structure reduced in length in the widthwise direction, and accordingly, wall 10 acts more like a partition and thus contributes to enhancing compressive stiffness.

Accordingly, based on the result of verification example 4, it can be seen that when compared with obtaining locally large compressive stiffness by increasing wall 10 of the portion of interest entirely in thickness, shock absorber 1H including unit structures each occupying a unit space having an external shape with a different dimension, as described above, can significantly suppress an increase in weight of the shock absorber.

Shock absorber 1H according to the present embodiment described above can thus be a shock absorber which is lightweight and has an excellent shock absorbing function, and can be used for various applications.

Note that, as a three-dimensional shape formed by a wall having an external shape defined by a pair of parallel planes, other than that in which a thickness is added to an octet structure, as described above, there are also a three-dimensional shape in which a thickness is added to a cubic structure, a three-dimensional shape in which a thickness is added to a cubic octet structure, and the like. The cubic and cubic octet structures, as well as the octet structure described above, are formed of a plurality of planes disposed to intersect with one another to have a cavity therein.

Figure 22:
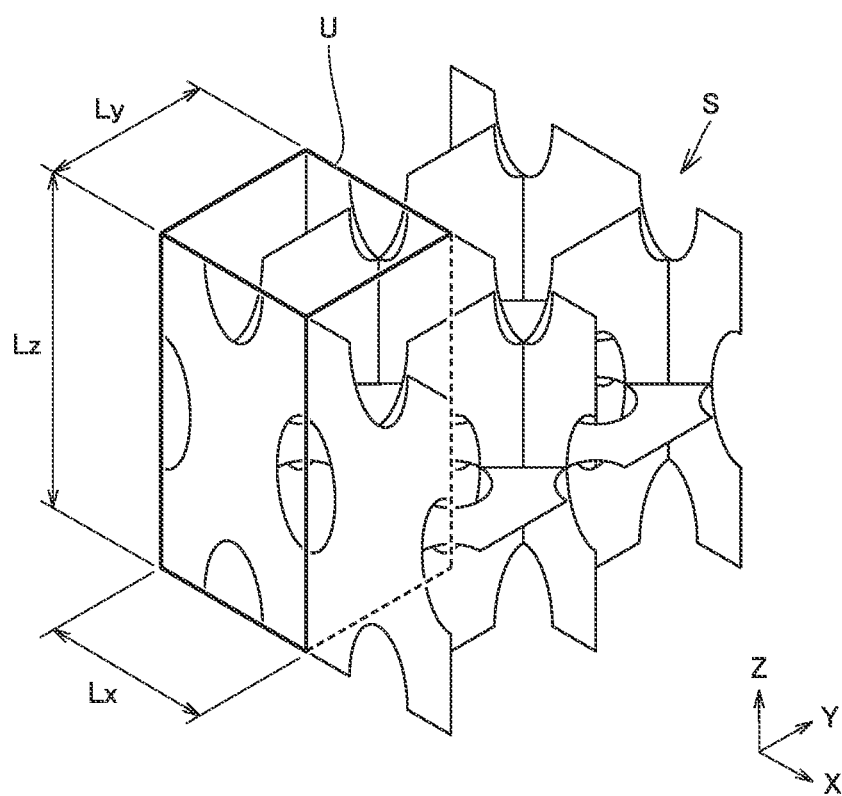
FIG. 22 is a partially cutaway perspective view showing a basic configuration of another example of a geometrical surface structure with a plane serving as a reference.

FIG. 22 is a partially cutaway perspective view showing a basic configuration of a cubic surface. FIG. 22 extracts and shows only two unit structures U adjacent to each other in each of the widthwise and depthwise directions. Note that unit structure U shown in FIG. 22 occupies a unit space in the form of a hexahedron elongate in the heightwise direction.

Figure 23:
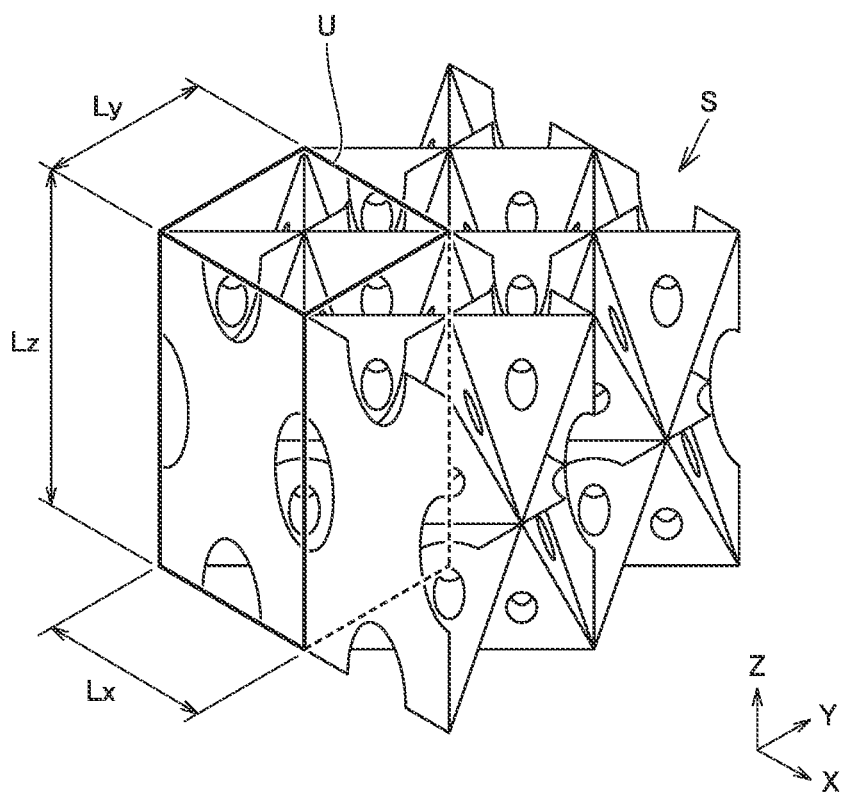
FIG. 23 is a partially cutaway perspective view showing a basic configuration of still another example of a geometrical surface structure with a plane serving as a reference.

FIG. 23 is a partially cutaway perspective view showing a basic configuration of a cubic octet surface. FIG. 23 extracts and shows only two unit structures U adjacent to each other in each of the widthwise and depthwise directions. Note that unit structure U shown in FIG. 23 occupies a unit space in the form of a hexahedron elongate in the heightwise direction.

Although not specifically shown herein, a shock absorber including as a shock absorbing region three-dimensional structure S in which a thickness is added to the cubic structure, the cubic octet structure or the like may be configured such that, as has been discussed above, three-dimensional structure S includes as unit structure U unit structures each occupying a unit space having an external shape with a different dimension. Such a configuration also allows the shock absorber to be a lightweight and excellently shock absorbing shock absorber which can be used in various applications.

Tenth Embodiment

Figure 24:
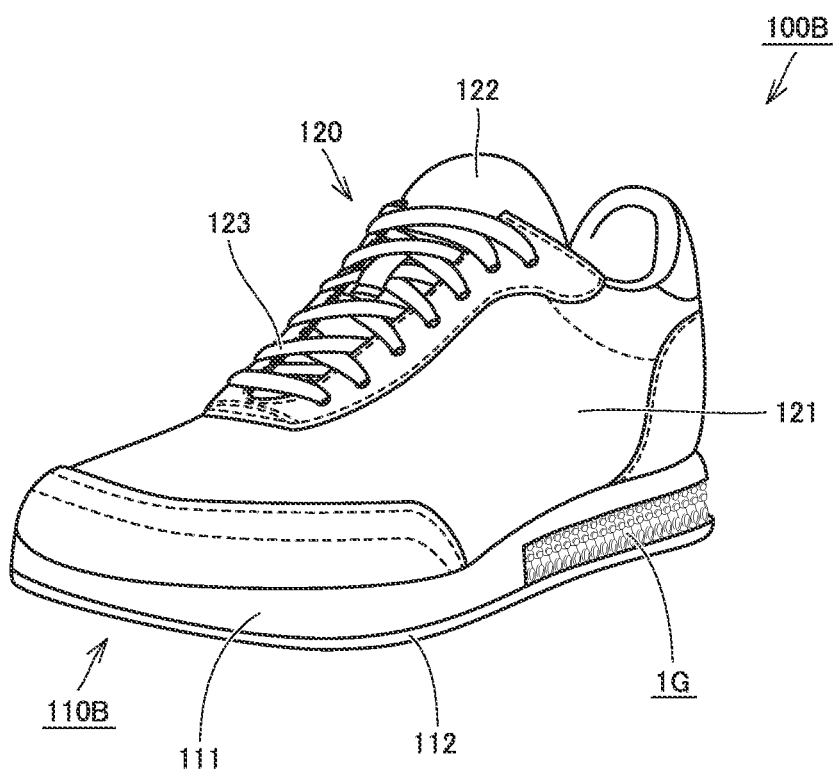
FIG. 24 is a perspective view of a shoe sole and a shoe comprising the shoe sole according to a tenth embodiment.
Figure 25:
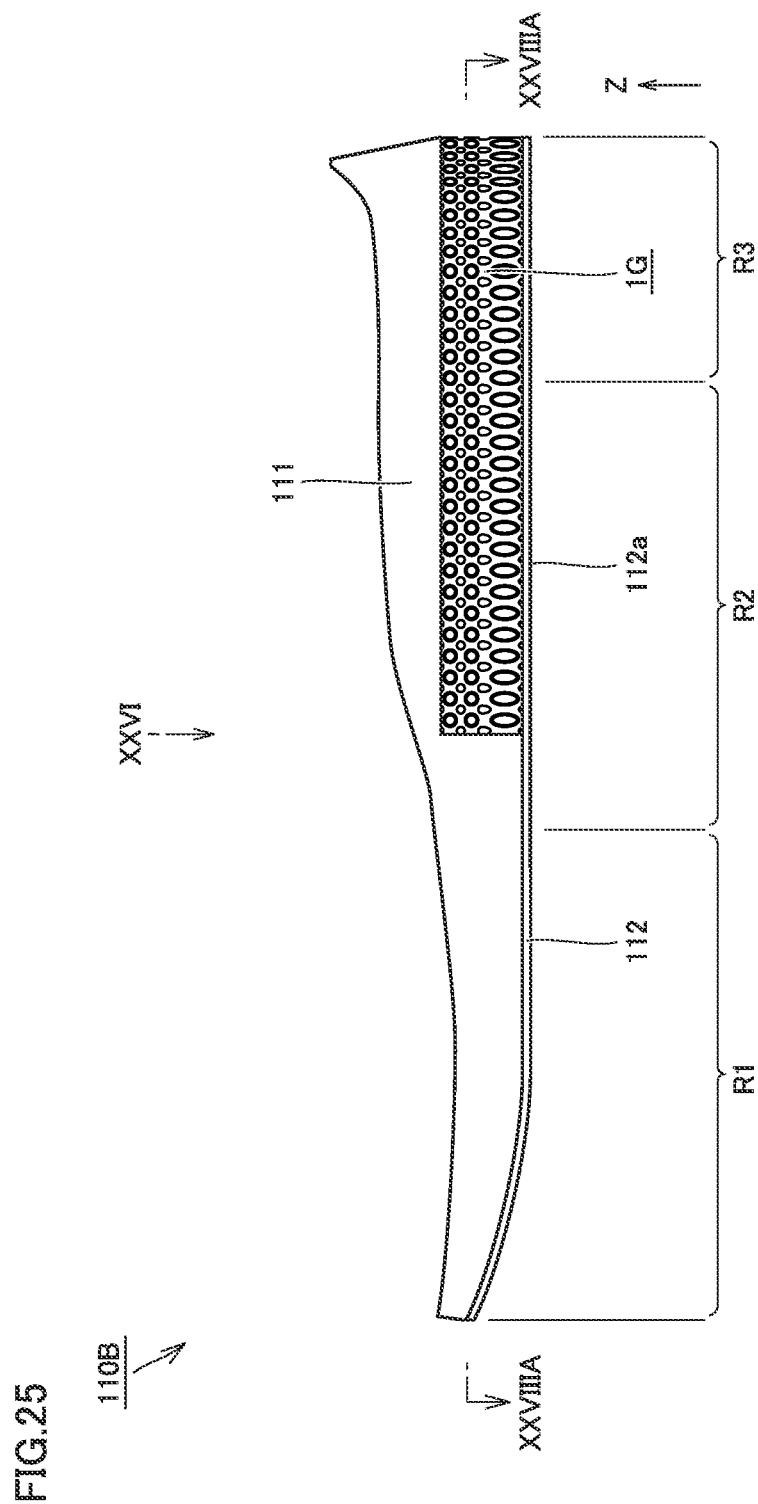
FIG. 25 is a side view of the shoe sole shown in FIG. 24.
Figure 26:
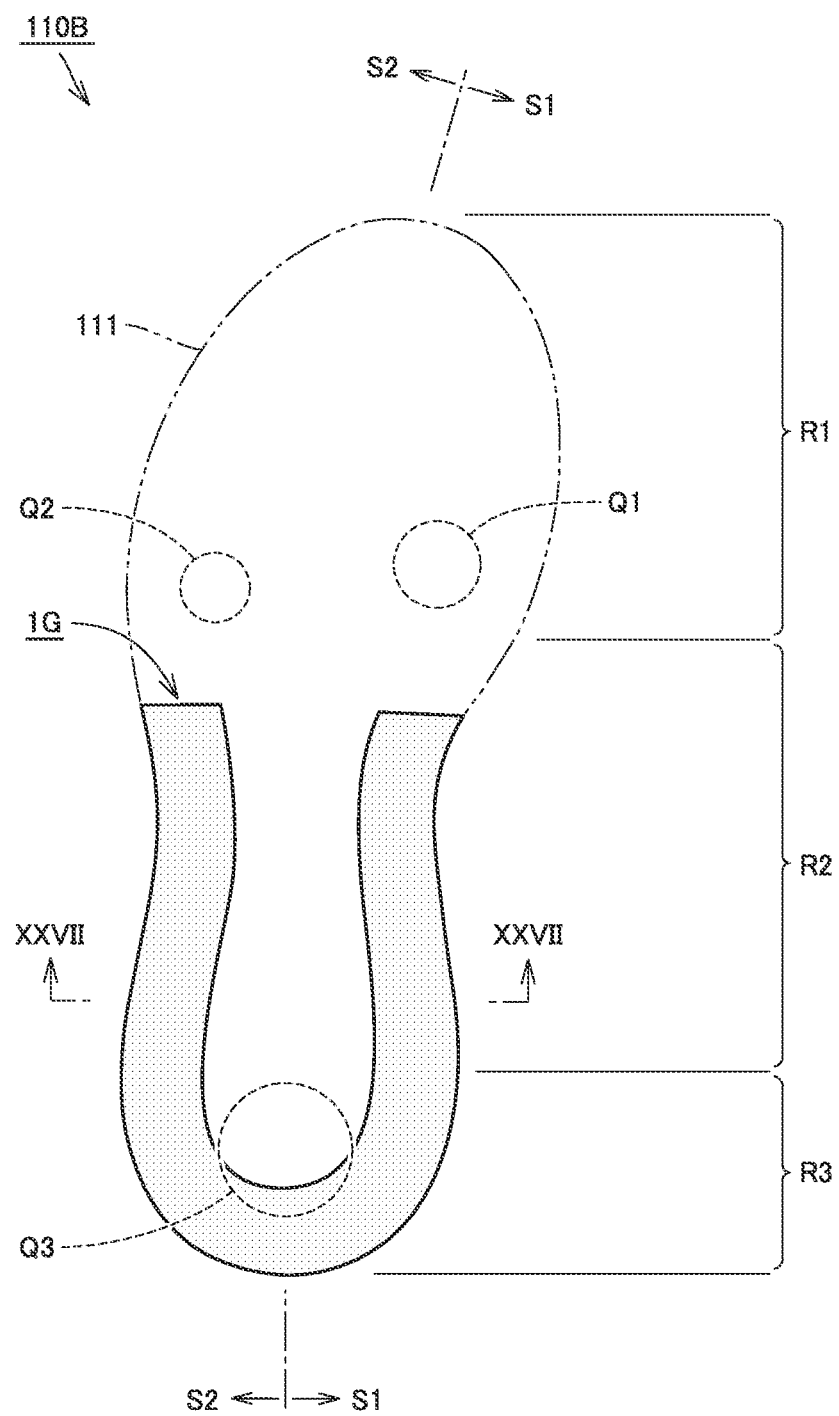
FIG. 26 is a schematic plan view of a configuration of the shoe sole shown in FIG. 24.
Figure 27:
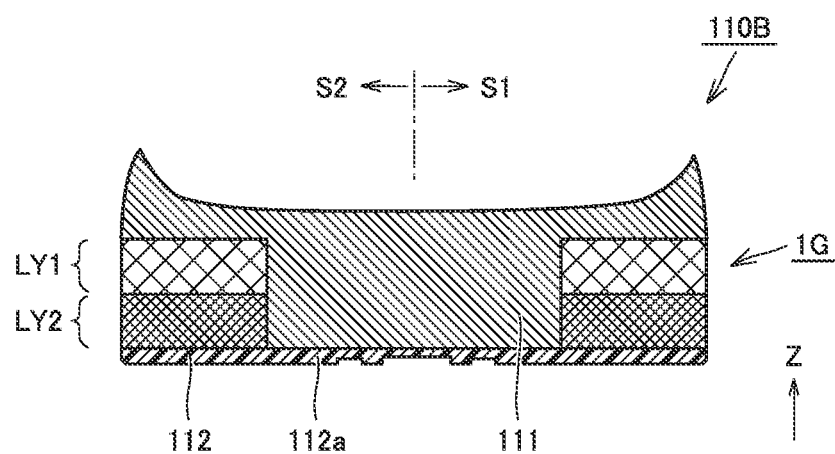
FIG. 27 is a cross section of the shoe sole shown in FIG. 24.
Figure 28A:
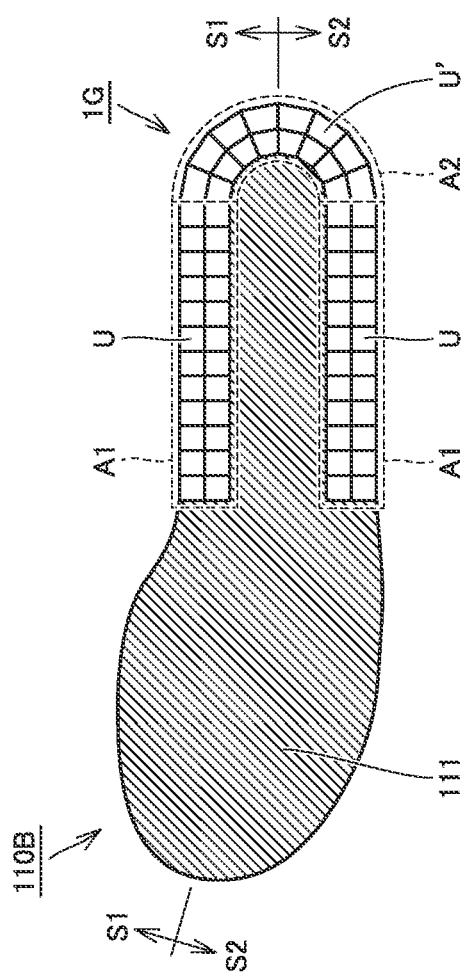
FIGS. 28A to 28E each schematically show an example of arrangement of a unit structure of a shock absorber in the shoe sole shown in FIG. 24.

FIG. 24 is a perspective view of a shoe sole and a shoe comprising the shoe sole according to a tenth embodiment. FIG. 25 is a side view of the shoe sole shown in FIG. 24. FIG. 26 schematically shows a configuration of the shoe sole shown in FIG. 24, as seen in a direction indicated by an arrow XXVI indicated in FIG. 25. FIG. 27 is a cross section of the shock absorber taken along a line XXVII-XXVII shown in FIG. 26. FIGS. 28A to 28E schematically show examples of arrangements of the unit structure of the shock absorber in the shoe sole shown in FIG. 36. Herein, FIG. 28A is a schematic cross section of the shoe sole taken along a line XXVIIIA-XXVIIIA shown in FIG. 25. Hereinafter, a shoe sole 110B and a shoe 100B including shoe sole 110E according to the present embodiment will be described with reference to FIGS. 24 to 27 and 28A to 28E. Shoe sole 110B according to the present embodiment includes shock absorber 1G according to the eighth embodiment.

As shown in FIG. 24, shoe 100B includes shoe sole 110B and upper 120. Shoe sole 110B is a member that covers the sole of a foot and has a generally flat shape. Upper 120 has a shape that at least covers the entirety of a portion on the side of the bridge of a foot inserted in the shoe, and is located above shoe sole 110B.

Upper 120 includes upper body 121, tongue 122, and shoelace 123. Of these, tongue 122 and shoelace 123 are both fixed to or attached to upper body 121.

Upper body 121 has an upper portion provided with an upper opening for exposing an upper portion of an ankle and a portion of the bridge of a foot. Upper body 121 has a lower portion provided with a lower opening covered with shoe sole 110B as an example and has a lower end French-seamed or the like to form a bottom portion as another example.

Tongue 122 is fixed to upper body 121 by sewing, welding, bonding, or a combination thereof so as to cover a portion of the upper opening provided in upper body 121 that exposes a portion of the bridge of a foot. For upper body 121 and tongue 122, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

Shoelace 123 is composed of a member in the form of a string for drawing portions of a peripheral edge of the upper opening provided to upper body 121 and exposing a portion of the bridge of a foot together in the direction of the width of the foot, and shoelace 123 is passed through a plurality of hole provided through the peripheral edge of the upper opening. When a foot is inserted in upper body 121 and shoelace 123 is tightened, upper body 121 can be brought into close contact with the foot.

As shown in FIGS. 24 to 27, shoe sole 110B includes a midsole 111, an outsole 112, and shock absorber 1G. Midsole 111 is located on top of shoe sole 110E and joined to upper 120. Outsole 112 has a lower surface with tread 112a (see FIGS. 25 and 27), and is located at a lower portion of shoe sole 110B. Shock absorber 1G is interposed at a prescribed position between midsole 111 and outsole 112.

Midsole 111 preferably has an appropriate strength and also excellently absorbs shock, and from this viewpoint, midsole 111 can for example be a foam material made of resin or rubber, and particularly suitably a foam material made of a thermoplastic resin such as ethylene-vinyl acetate copolymer (EVA), a thermosetting resin such as polyurethane (PU), butadiene rubber, or the like.

Outsole 112 preferably provides excellent wear resistance and excellent grip, and from this viewpoint, outsole 112 can be made of rubber, for example. A tread pattern may be provided on the lower surface of outsole 112, or tread 112a, from the viewpoint of providing enhanced grip.

As shown in FIGS. 25 and 26, in a fore-aft direction representing a longitudinal direction in a plan view (a lateral direction in FIG. 25 and a vertical direction in FIG. 26), shoe sole 110B is divided into a front foot portion R1 supporting the toes and ball of a foot, a middle foot portion R2 supporting the arch of the foot, and a rear foot portion R3 supporting the heel of the foot. Further, as shown in FIGS. 26 and 27, in the direction of the width of the foot, which is a direction intersecting with the longitudinal direction in the plan view, shoe sole 110B is divided into a portion on a medial foot side representing a medial side of the foot in anatomical position (that is, a side closer to the median) (i.e., a portion on side S1 in the figure) and a portion on a lateral foot side representing a lateral side of the foot in anatomical position (that is, a side farther from the median) (i.e., a portion on side S2 in the figure).

As shown in FIG. 26, a portion of front foot portion R1 of shoe sole 110B on the medial foot side (or side S1) includes a portion Q1 to support the ball of the great toe of the foot. A portion of front foot portion R1 of shoe sole 110B on the lateral foot side (or side S2) includes a portion Q2 to support the ball of the little toe of the foot. A portion of rear foot portion R3 of shoe sole 110B across the medial foot side (or side S1) and the lateral foot side (or side S2) includes a portion Q3 to support the calcaneus bone of the foot.

Herein, shoe 100B according to the present embodiment has midsole 111 with a notch having a prescribed shape, and shock absorber 1G is accommodated in the notch and thus sandwiched and thus fixed between midsole 111 and outsole 112 in the direction of the thickness of shoe sole 110B.

More specifically, as shown in FIGS. 25 to 27, midsole 111 is provided with a notch generally in the form of the letter U in a plan view across middle foot portion R2 and rear foot portion R3 along a peripheral edge of shoe sole 110B, and shock absorber 1G formed generally in the form of the letter U in a plan view is disposed to fill the notch. More specifically, shock absorber 1G is generally disposed along an edge of middle foot portion R2 on the medial foot side, an edge of rear foot portion R3 on the medial foot side, a rear edge of rear foot portion R3, an edge of rear foot portion R3 on the lateral foot side, and an edge of middle foot portion R2 on the lateral foot side. In FIG. 26, in order to facilitate understanding, a region in which shock absorber 1G is disposed, as seen in a plan view of shoe sole 110B, is shown in a light color. That is, shock absorber 1G has a shock absorbing region not only along an edge portion of shoe sole 110B, which has been described above, but also in a region inner than that edge portion.

While shock absorber 1G is not limited to any particular material, as has been described in the eighth embodiment, it can be formed for example of a resin material or a rubber material, and particularly suitably composed of a thermoplastic resin such as ethylene-vinyl acetate copolymer (EVA), a thermosetting resin such as polyurethane (PU), butadiene rubber or the like. It can also be a polymer composition such as an olefin-based polymer, an amide-based polymer, an ester-based polymer, a urethane-based polymer, a styrene-based polymer, an acrylic polymer or the like.

While wall 10 constituting three-dimensional structure S of shock absorber 1G is not particularly limited in thickness, it preferably has a thickness of 0.1 mm or more and 10 mm or less, more preferably 1 mm or more and 5 mm or less.

As shown in FIGS. 25 and 27, shock absorber 1G is disposed such that the axial direction, or its heightwise direction (the Z direction indicated in the figures) is orthogonal to tread 112a of shoe sole 110B. With this configuration, a load exerted to shoe sole 110B from the sole of a foot and the ground when landing will be absorbed as shock absorber 1G deforms with large deformability, and a load exerted from shoe sole 110B to the sole of the foot is reduced and a high shock absorbing function can thus be obtained.

Note that in the present embodiment, shock absorber 1G is disposed in shoe sole 110B to surround portion Q3 that supports the calcaneus of a foot, and thus allows that portion to obtain a particularly high shock absorbing function.

Further, as shown in FIG. 27, shock absorber 1G is interposed between midsole 111 and outsole 112 such that layer LY1 configured by arranging a plurality of unit structures UA (see FIG. 14) is disposed at an upper portion of shoe sole 110B and layer LY2 configured by arranging a plurality of unit structures UB (see FIG. 14) is disposed at a lower portion of shoe sole 110B.

Herein, layer LY1 configured by arranging the plurality of unit structures UA has relatively small compressive stiffness and layer LY2 configured by arranging the plurality of unit structures UB has relatively large compressive stiffness. Therefore, layer LY1 will be a relatively soft portion and layer LY2 will be a relatively hard portion.

By adopting such a configuration, layer LY2 that is a relatively hard portion and provided in shoe sole 110B allows a foot to be supported stably at middle foot portion R2 and rear foot portion R3, in particular, when landing, and layer LY1 that is a relatively soft portion and located at a position above layer LY2 allows the shoe to significantly satisfactorily fit the foot.

Shoe sole 110B and shoe 100B comprising shoe sole 110B according to the present embodiment can thus be lightweight and have an excellent shock absorbing function.

While shock absorber 1G may have a plurality of mutually independent members combined together and mutually bonded together or the like to be generally formed generally in the form of the letter U in a plan view as has been described above, more preferably, it has its entirety configured as a one-piece member to be formed generally in the form of the letter U in a plan view as has been described above. When the latter configuration is adopted, in particular, it is important how shock absorber 1G including a plurality of cuboidal unit structures U is laid out for a non-cuboidal notch while eliminating an unnecessary imbalance of a shock absorbing function in each portion.

Hereinafter, with reference to FIGS. 28A to 28E, a specific designing method will be described which allows a shock absorber comprising a plurality of unit structures U each occupying a cubic unit space to be laid out in a non-cuboidal region while eliminating an unnecessary imbalance of a shock absorbing function in each portion simply by changing some or all of the plurality of unit structures U slightly, rather than significantly, in shape.

Initially, as shown in FIG. 28A, a region in which the shock absorber is disposed is divided into area A1 in which unit structures U can be disposed as they are as they are increased/decreased in number in at least one of the widthwise, depthwise and heightwise directions while they are adjusted in size, and area A2 in which it is difficult to do so. Specifically, in the present embodiment, of a region in which shock absorber 1G is disposed, an area extending linearly along a peripheral edge of shoe sole 110B on the medial and lateral foot sides corresponds to area A1, and an area extending in a curve along a peripheral edge of shoe sole 110B on the side of the rear end corresponds to area A2.

Figure 28E:
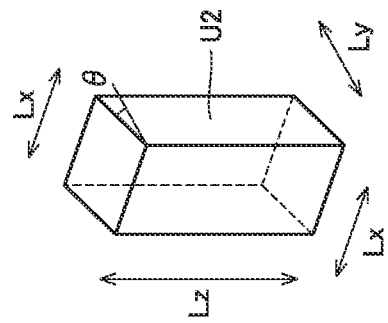
Figure 28D:
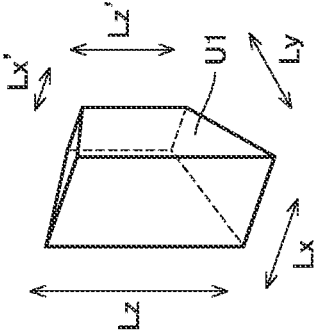
Figure 28C:
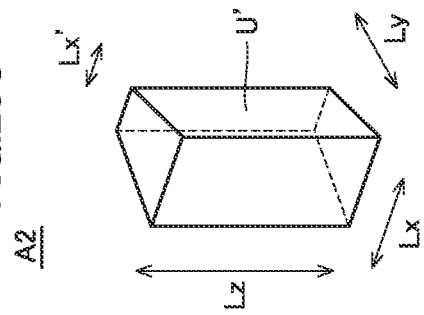
Figure 28B:
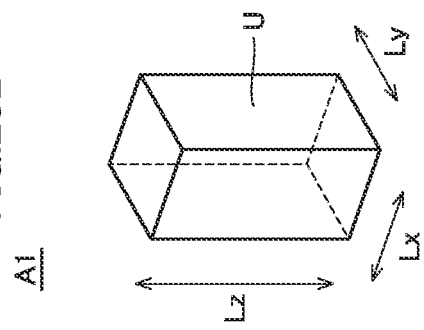

Herein, in area A1, a plurality of unit structures U each occupying a unit space in the form of a cube having three sides adjusted to have lengths Lx, Ly, and Lz, respectively, as shown in FIG. 28B, are disposed to be adjacent to one another, for the sake of illustration. Thus, area A1 has a plurality of unit structures U adjusted in size laid therein without a gap therebetween.

In area A2, a plurality of unit structures U' are disposed to be adjacent to one another, each unit structure U' being configured to occupy a unit space changed in shape to have three pairs of opposite surfaces with a specific one pair having its surfaces non-parallel to each other, as shown in FIG. 28C, for the sake of illustration. Herein, unit structure U' is for example what has been changed in shape to occupy a unit space adjusted so that for example those four sides of the unit space which extend in the widthwise direction have a pair of adjacent sides with a length Lx' slightly shorter than length Lx of the other sides. Such a slight change in shape does not significantly change the unit structure's shock absorbing function.

Unit structures U' thus shaped can be individually adjusted in size and orientation and disposed side by side to be laid substantially without a gap along area A2 that extends in a curve as described above. Thus simply by such a slight change in shape, area A2 also comes to exhibit a shock absorbing function equivalent to that of area A1 described above.

Thus such a designing method can be adopted to allow a shock absorber comprising a plurality of unit structures U each occupying a cubic unit space to be laid out in a non-cuboidal region while eliminating an unnecessary imbalance of a shock absorbing function in each portion simply by changing some or all of the plurality of unit structures U slightly, rather than significantly, in shape.

Therefore, when this designing method is employed to design a shock absorber, and based thereon, three dimensional additive manufacturing apparatus is employed to manufacture the shock absorber, the shock absorber can be easily obtained as a one-piece member with a variable external shape.

In the designing method described above, when a shock absorber is laid in a more complicated curved area, a plurality of unit structures U1 may be disposed to be adjacent to one another, unit structure U1 being configured to occupy a unit space changed in shape to have three pairs of opposite surfaces with two specific pairs thereof each having its surfaces non-parallel to each other, as shown in FIG. 28D.

Herein, unit structure U1 is for example what has been changed in shape to occupy a unit space adjusted for example so that those four sides of the unit space which extend in the widthwise direction have a pair of adjacent sides with length Lx' slightly shorter than length Lx of the other sides and, together therewith, furthermore, for example so that those four sides of the unit space which extend in the heightwise direction have a pair of adjacent sides with a length Lz' slightly shorter than length Lz of the other sides. Such a slight change in shape does not significantly change the unit structure's shock absorbing function.

Unit structures U1 thus shaped can be individually adjusted in size and orientation and disposed side by side to be laid substantially without a gap along the complicated curved area. Thus simply by such a slight change in shape, the area also comes to exhibit a shock absorbing function equivalent to that of area A1 described above.

Further, in the designing method described above, when a shock absorber is laid in a linearly extending area, then, in place of unit structure U as shown in FIG. 28B, a plurality of unit structures U2 each as shown in FIG. 28E may be disposed to be adjacent to one another. Herein, unit structure U2 is for example what has been changed in shape to occupy a unit space adjusted to have three pairs of opposite surfaces parallel to each other, with a specific one pair having its surfaces each in the form of a parallelogram.

Note that unit structure U2 as shown for example has a pair of surfaces that is located in the heightwise direction inclined in the widthwise direction by an angle θ to be in the form of a parallelogram. Such a slight change in shape does not significantly change the unit structure's shock absorbing function. Thus, unit structures U2 can also be laid to allow a shock absorber to be laid out without a gap while eliminating an unnecessary imbalance of the shock absorbing function for each portion.

Eleventh Embodiment

Figure 29:
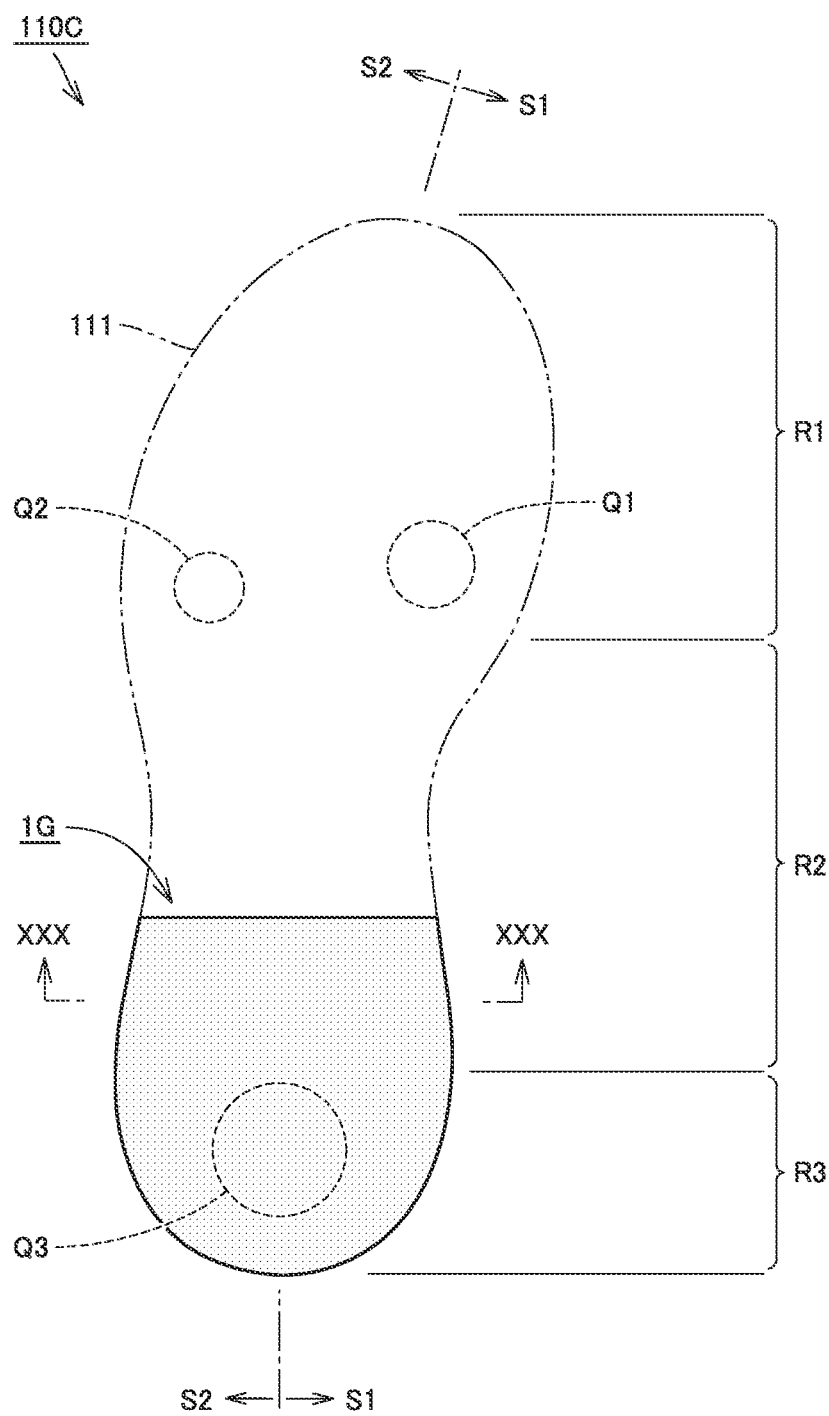
FIG. 29 is a schematic plan view of a configuration of a shoe sole according to an eleventh embodiment.
Figure 30:
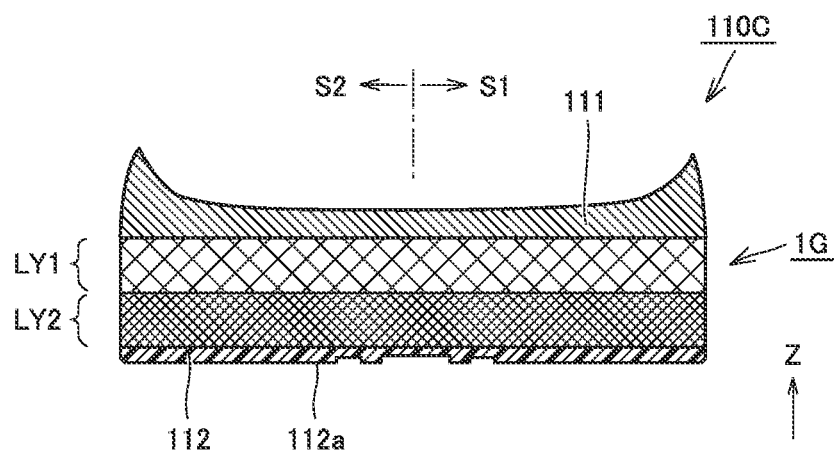
FIG. 30 is a cross section of the shoe sole shown in FIG. 29.

FIG. 29 is a schematic plan view of a configuration of a shoe sole according to an eleventh embodiment. FIG. 30 is a cross section of the shoe sole taken along a line XXX-XXX indicated in FIG. 29. A shoe sole 110C according to the present embodiment will be described below with reference to FIGS. 29 and 30. Shoe sole 110C according to the present embodiment is comprised by shoe 100B according to the tenth embodiment instead of shoe sole 110B described above.

As shown in FIGS. 29 and 30, shoe sole 110C is similar in configuration to shoe sole 110B according to the tenth embodiment in that it comprises midsole 111, outsole 112, and shock absorber 1G, except that shock absorber 1G has a different shape. More specifically, midsole 111 has a notch formed at a position corresponding to a portion of middle foot portion R2 closer to rear foot portion R3 and the entirety of rear foot portion R3, and shock absorber 1G having an external shape generally in the form of the letter D in a plan view is disposed to fill the notch. In FIG. 29, in order to facilitate understanding, a region in which shock absorber 1G is disposed, as seen in a plan view of shoe sole 110C, is shown in a light color. That is, shock absorber 1G has a shock absorbing region not only along an edge portion of shoe sole 110C but also in a region inner than the edge portion.

Herein, shock absorber 1G comprised by shoe sole 110C is interposed between midsole 111 and outsole 112 such that layer LY1 configured by arranging a plurality of unit structures UA is disposed at an upper portion of shoe sole 110C and layer LY2 configured by arranging a plurality of unit structures UB is disposed at a lower portion of shoe sole 110C.

Accordingly, this configuration, as well as the tenth embodiment, can provide a lightweight and excellently shock absorbing shoe sole and a shoe comprising the shoe sole, and allows a foot to be supported stably at rear foot portion R3, in particular, when landing.

(Third to Seventh Variations)

Figure 31:
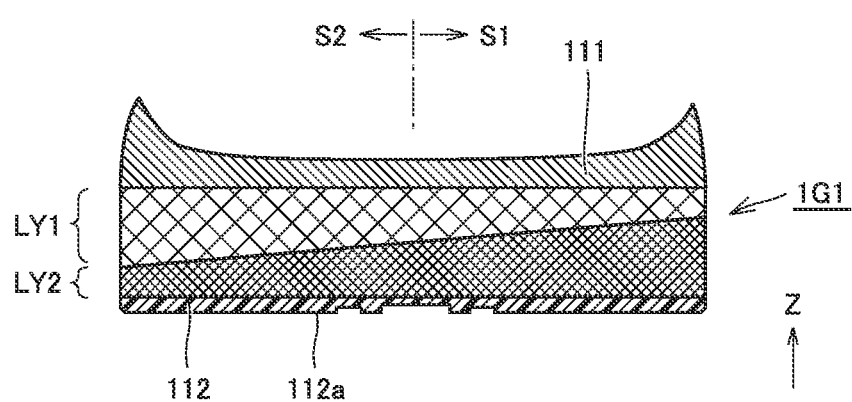
FIG. 31 is a cross section of a shoe sole according to a third variation.
Figure 32:
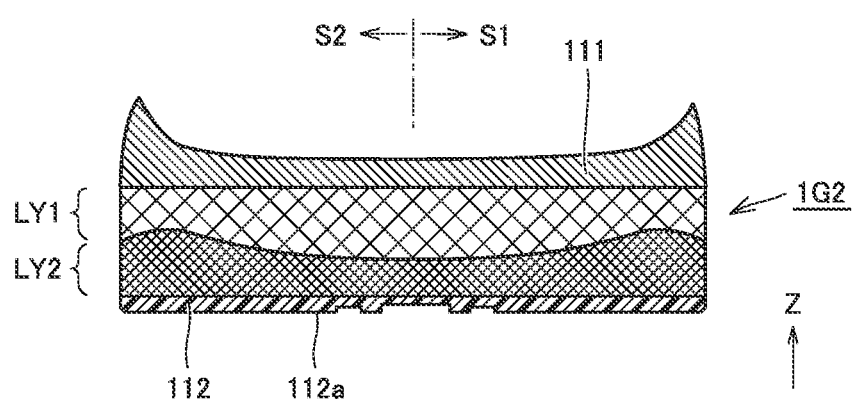
FIG. 32 is a cross section of a shoe sole according to a fourth variation.
Figure 33:
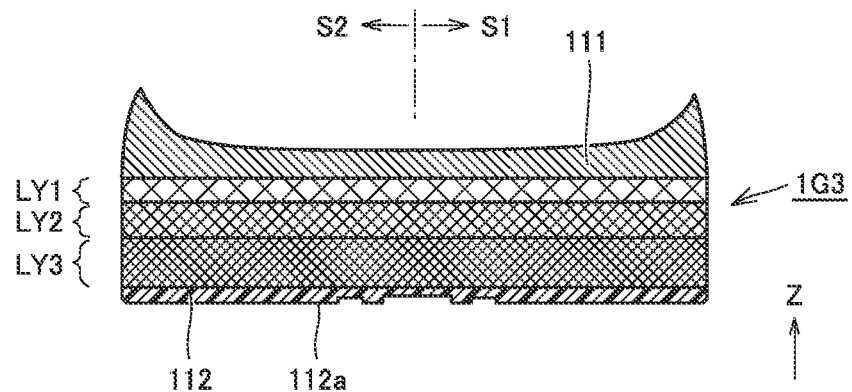
FIG. 33 is a cross section of a shoe sole according to a fifth variation.
Figure 34:
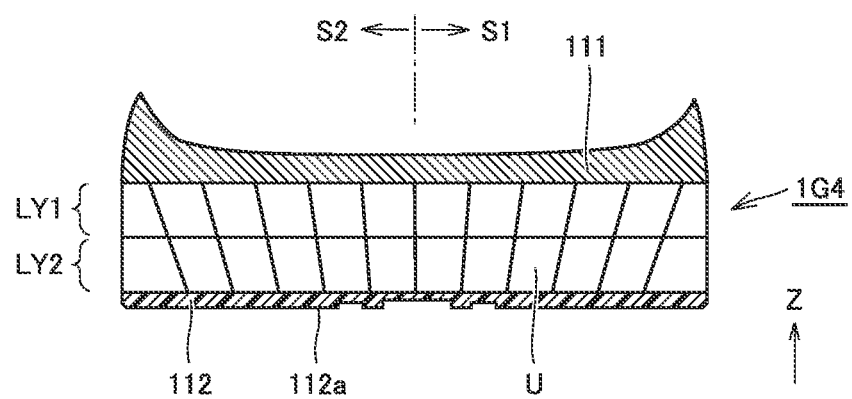
FIG. 34 is a schematic cross section of a configuration of a shoe sole according to a sixth variation.
Figure 35:
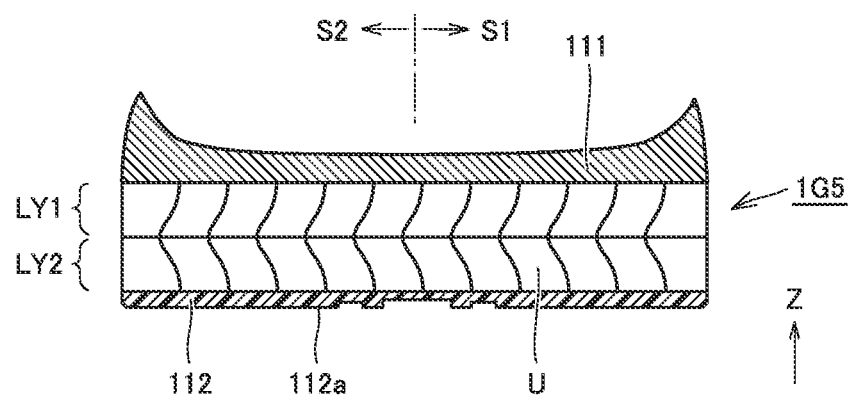
FIG. 35 is a schematic cross section of a configuration of a shoe sole according to a seventh variation.

FIGS. 31 to 33 are cross sections of shoe soles according to third to fifth variations, respectively. FIGS. 34 and 35 are schematic cross sections in configuration of shoe soles according to sixth and seventh variations, respectively. Note that FIGS. 34 and 35 schematically represent by a line a boundary of a plurality of unit structures U (or unit spaces, each as described above, in a strict sense) disposed in a shock absorber. Hereinafter, with reference to FIGS. 31 to 35, the shoe soles according to the third to seventh variations and shock absorbers 1G1 to 1G5 according to the third to seventh 1480 variations comprised thereby will be described below.

As shown in FIGS. 31 and 32, shock absorbers 1G1 to 1G5 comprised by the shoe soles according to the third and fourth variations, as well as shock absorber 1G comprised by shoe sole 110C according to the eleventh embodiment, have layer LY1 configured by arranging a plurality of unit structures UA and layer LY2 configured by arranging a plurality of unit structures UB. In contrast, shock absorbers 1G1 and 1G2 included in a shoe sole according to the third variation are different from shock absorber 1G included in shoe sole 110C according to the eleventh embodiment in that layers LY1 and LY2 are different in thicknesses for each portion.

That is, shock absorber 1G1 included in a shoe sole according to the third variation is configured to have layer LY1 increased in thickness gradually from the medial foot side (or side S1) toward the lateral foot side (or side S2) and layer LY2 decreased in thickness gradually from the medial foot side toward the lateral foot side.

Such a configuration allows a foot to be supported more stably at a portion on the lateral foot side, in particular, when landing, and can suppress rolling of a heel inwards more than necessary when landing, i.e., overpronation. The shoe sole and shoe comprising the shoe sole according to the present variation can thus be suitable for overpronators.

In contrast, shock absorber 1G2 comprised by a shoe sole according to the fourth variation is configured such that a center portion on the medial and lateral sides has layer LY1 with a large thickness and layer LY2 with a small thickness.

This configuration allows the shock absorber to have larger deformation at the center when landing so that the user will feel his/her heel held more firmly, in particular. The shoe sole and shoe comprising the shoe sole according to the present variation can satisfactorily fit a foot and also stably support a heel.

As shown in FIG. 33, a shock absorber 1G3 comprised by a shoe sole according to the fifth variation is different from shock absorber 1G comprised by shoe sole 110C according to the eleventh embodiment in that three types of unit structures each having an external shape differently dimensioned are disposed in the heightwise direction (that is, the Z direction).

Herein, a heightwise external dimension of a unit structure disposed in an uppermost layer LY1 is smaller than that of a unit structure disposed in a middle layer LY2, and the heightwise external dimension of the unit structure disposed in middle layer LY2 is smaller than that of a unit structure disposed in a lowermost layer LY3.

As a result, uppermost layer LY1 will have relatively smaller compressive 1515 stiffness, lowermost layer LY3 will have relatively larger compressive stiffness, and middle layer LY2 will have compressive stiffness between those of layers LY1 and LY2. Therefore, layer LY1 will be a relatively soft portion, layer LY3 will be a relatively hard portion, and layer LY3 will have hardness therebetween.

Such a configuration, as well as the eleventh embodiment, can provide a lightweight and excellently shock absorbing shoe sole and a shoe comprising the shoe sole, and allows a foot to be supported stably at rear foot portion R3, in particular, when landing.

As shown in FIGS. 34 and 35, shock absorbers 1G4 and 1G5 comprised by the shoe soles according to the sixth and seventh variations are different from shock absorber 1G comprised by shoe sole 110C according to the eleventh embodiment in that a plurality of types of unit structures each having an external shape differently dimensioned are disposed in a direction orthogonal to the heightwise direction (that is, the Z direction).

Herein, shock absorber 1G4 comprised by a shoe sole according to the sixth variation is configured such that a plurality of unit structures U (or unit spaces, each as described above, in a strict sense) have a boundary inclined and thus have their respective external shapes differently dimensioned. In contrast, shock absorber 1G5 comprised by a shoe sole according to the seventh variation is configured such that a plurality of unit structures U (or unit spaces, each as described above, in a strict sense) have a boundary curved and thus have their respective external shapes with differently dimensions (such that a unit structure located at opposite ends in the figure and that located at the center portion in the figure have their respective external shapes with different dimensions, in particular).

Such a configuration, as well as the eleventh embodiment, can provide a lightweight and excellently shock absorbing shoe sole and a shoe comprising the shoe sole, and allows a foot to be supported stably at rear foot portion R3, in particular, when landing. The configuration also allows a shock absorbing function to be variously adjusted for each portion.

Twelfth Embodiment

Figure 36:
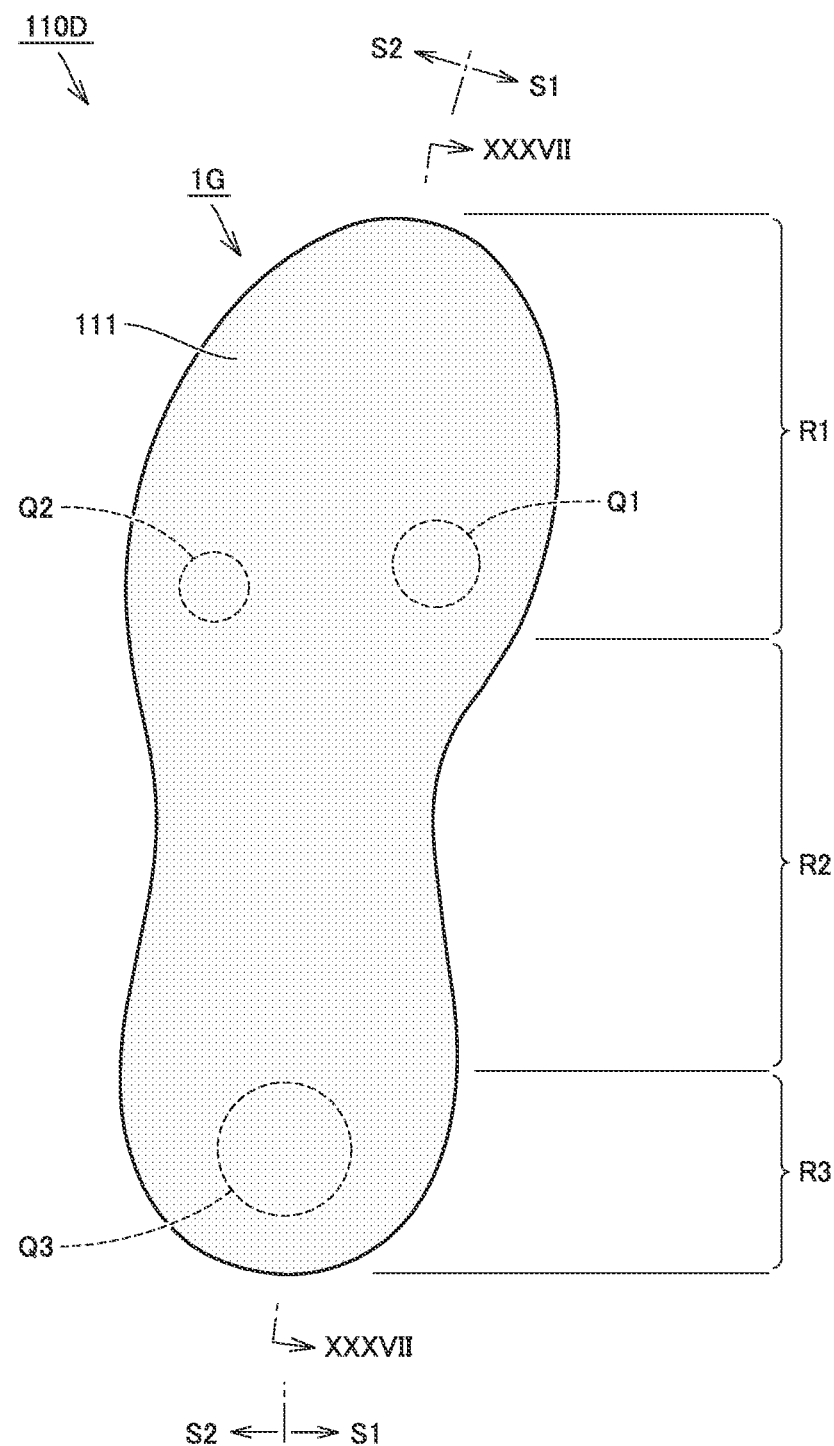
FIG. 36 is a schematic plan view of a configuration of a shoe sole according to a twelfth embodiment.
Figure 37:
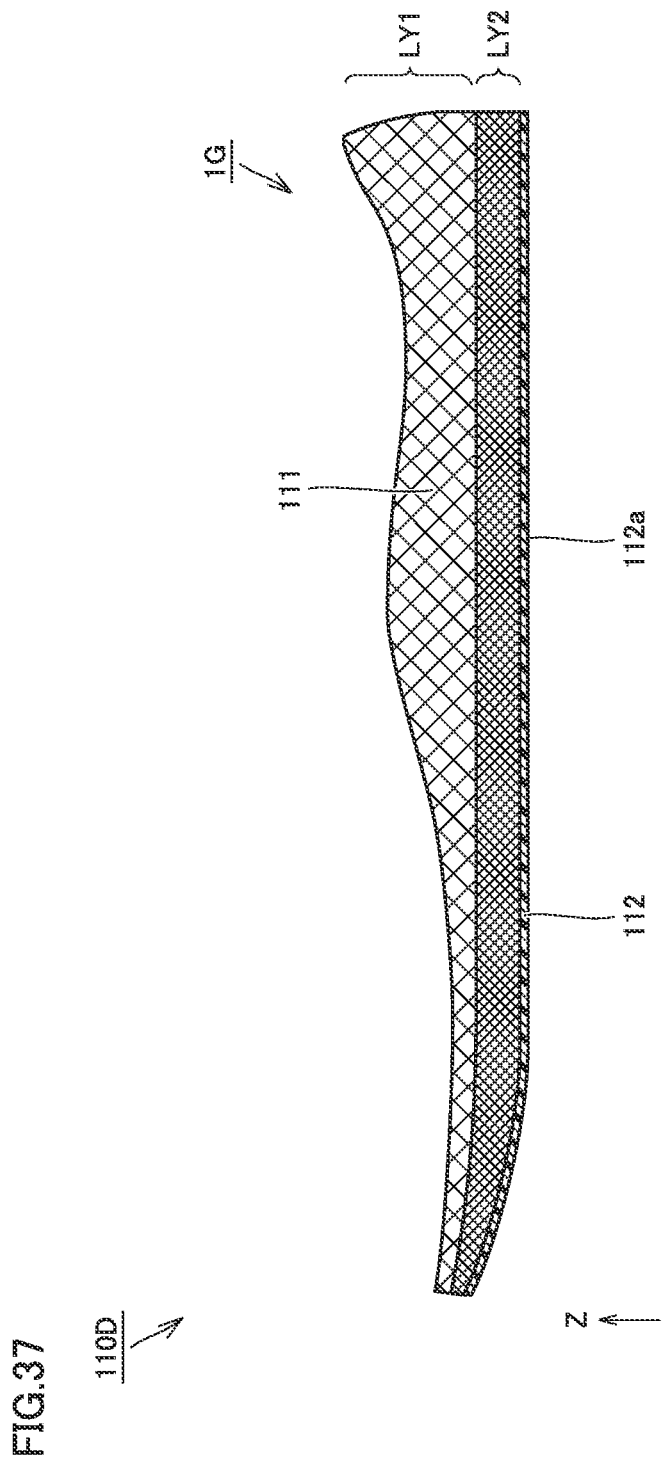
FIG. 37 is a cross section of the shoe sole shown in FIG. 36.

FIG. 36 is a schematic plan view of a configuration of a shoe sole according to a twelfth embodiment. FIG. 37 is a cross section of the shoe sole taken along a line XXXVII-XXXVII indicated in FIG. 36. Hereinafter, a shoe sole 110D according to the present embodiment will be described with reference to FIGS. 36 and 37. Shoe sole 110D according to the present embodiment is comprised by shoe 100B according to the tenth embodiment instead of shoe sole 110B described above.

As shown in FIGS. 36 and 37, shoe sole 110D is different from shoe sole 110B according to the tenth embodiment in how shock absorber 1G is shaped, and midsole 111 is entirely composed of shock absorber 1G. That is, shoe sole 110D according to the present embodiment is not provided with a midsole which is a member discrete from shock absorber 1G and instead has shock absorber 1G per se to configure midsole 111. Accordingly, midsole 111 is configured to cover an upper portion of outsole 112, and has its upper portion joined to upper 120 (see FIG. 24). In FIG. 36, in order to facilitate understanding, a region in which shock absorber 1G is disposed, as seen in a plan view of shoe sole 110D, is shown in a light color. That is, shock absorber 1G has a shock absorbing region not only along an edge portion of shoe sole 110D but also in a region inner than that edge portion.

Herein, shock absorber 1G comprised by shoe sole 110D is provided on outsole 112 such that layer LY1 configured by arranging a plurality of unit structures UA is disposed at an upper portion of shoe sole 110C and layer LY2 configured by arranging a plurality of unit structures UB is disposed at a lower portion of shoe sole 110C, as has been discussed above.

Therefore, such a configuration, as well as the tenth embodiment, can provide a lightweight and excellently shock absorbing shoe sole and a shoe comprising the shoe sole, and allows a foot to be stably supported entirely (that is, in a region of all of front foot portion R1, middle foot portion R2 and rear foot portion R3), in particular, when landing.

(Eighth and Ninth Variations)

Figure 38:
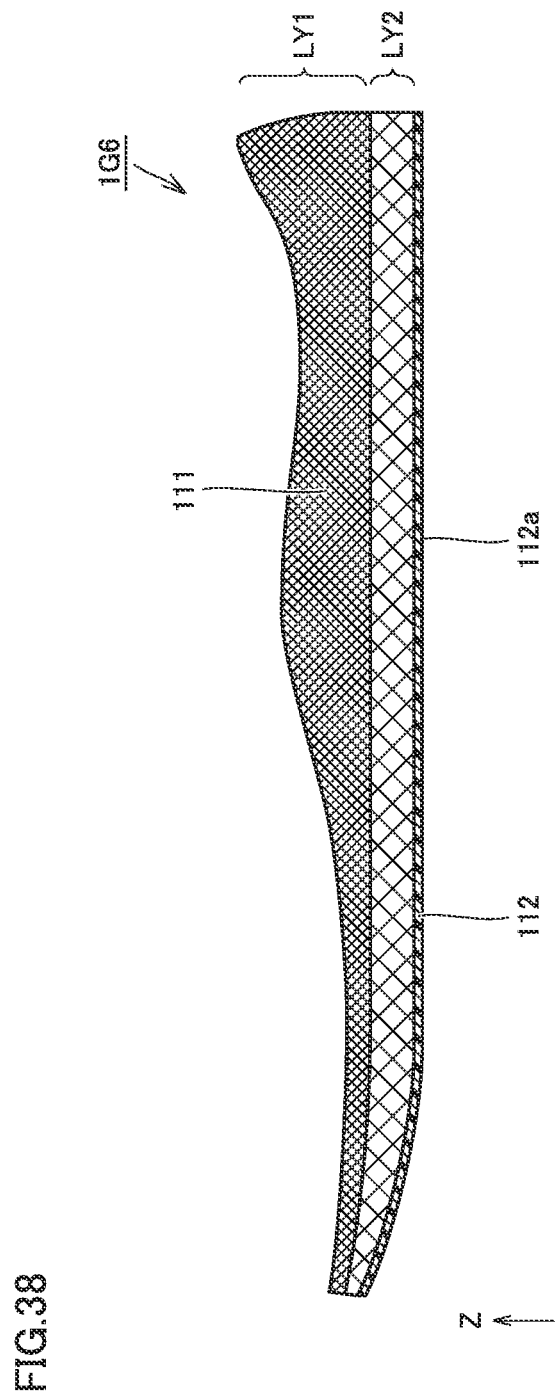
FIG. 38 is a cross section of a shoe sole according to an eighth variation.
Figure 39:
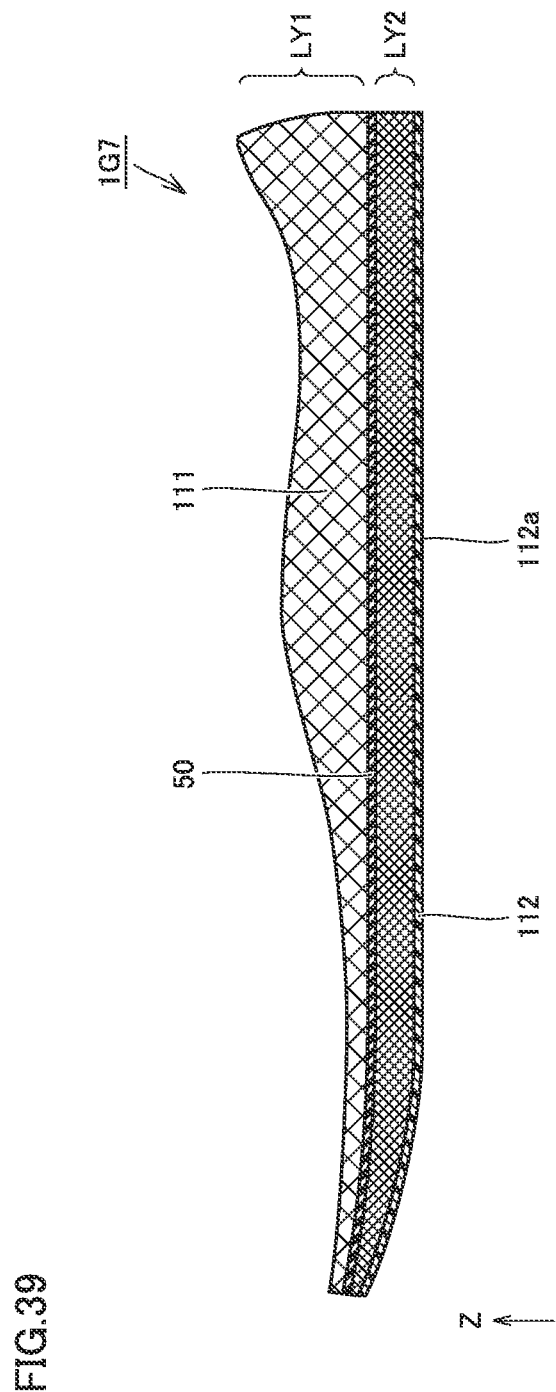
FIG. 39 is a cross section of a shoe sole according to a ninth variation.

FIGS. 38 and 39 are cross sections of shoe soles according to eighth and ninth variations, respectively. Hereinafter, the shoe soles according to the eighth and ninth variations and shock absorbers 1G6 and 1G7 comprised thereby according to the eighth and ninth variations will be described with reference to FIGS. 38 and 39.

As shown in FIGS. 38 and 39, shock absorbers 1G6 and 1G7 comprised by the shoe soles according to the eighth and ninth variations, as well as shock absorber 1G comprised by a shoe sole according to the twelfth embodiment, per se configure midsole 111, although shock absorbers 1G6 and 1G7 have an internal configuration different than shock absorber 1G comprised by the shoe sole according to the twelfth embodiment.

That is, in shock absorber 1G6 comprised by the shoe sole according to eighth variation, layer LY1 to be disposed at an upper portion of the shoe sole is configured by arranging a plurality of unit structures UB (see FIG. 14) and layer LY2 to be disposed at a lower portion of the shoe sole is configured by arranging a plurality of unit structures UA (see FIG. 14) Thus, layer LY1 disposed at the upper portion of the shoe sole is configured to have relatively large compressive stiffness and layer LY2 disposed at the lower portion of the shoe sole is configured to have relatively small compressive stiffness. Therefore, layer LY1 will be a relatively hard portion and layer LY2 will be a relatively soft portion.

This configuration helps to maintain the shoe sole's warped shape when running, and will thus alleviate a work of an ankle joint when kicking out to run and can thus provide an energy-saving type shoe sole and shoe comprising the same.

In contrast, although shock absorber 1G7 comprised by a shoe sole according to the ninth variation, as well as shock absorber 1G comprised by a shoe sole according to the twelfth embodiment, has layer LY1 configured by arranging a plurality of unit structures UA and layer LY2 configured by arranging a plurality of unit structures UB, it additionally has a plate-shaped partition wall 50 between layers LY1 and LY2.

Although plate-shaped partition wall 50 is a portion which does not correspond to wall 10 (see FIG. 14) that defines unit structures UA and UB included in shock absorber 1G7, it is integral with unit structures UA and UB. As a result, plate-shaped partition wall 50 buried in shock absorber 1G7 will separate those of unit structures which have their respective external shapes differently dimensioned.

Thus, when such a configuration is adopted, shock absorber 1G7 is internally provided with partition wall 50 and the shoe sole is generally enhanced in flexural rigidity and torsional rigidity and can be a shoe sole suitable for a competition requiring high-speed running and turning and provide a shoe comprising the shoe sole.

Thirteenth Embodiment

Figure 40:
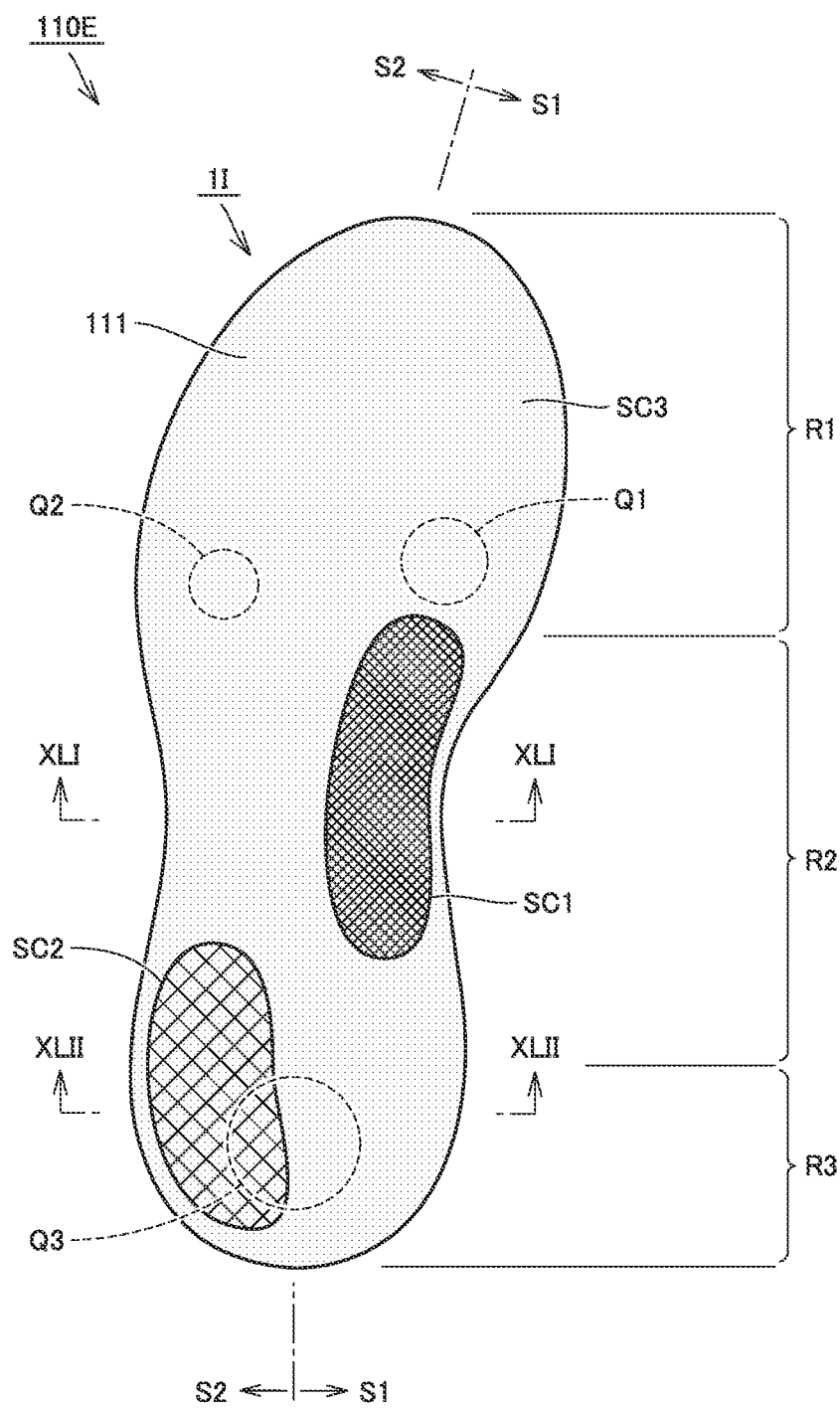
FIG. 40 is a schematic plan view of a configuration of a shoe sole according to a thirteenth embodiment.
Figure 41:
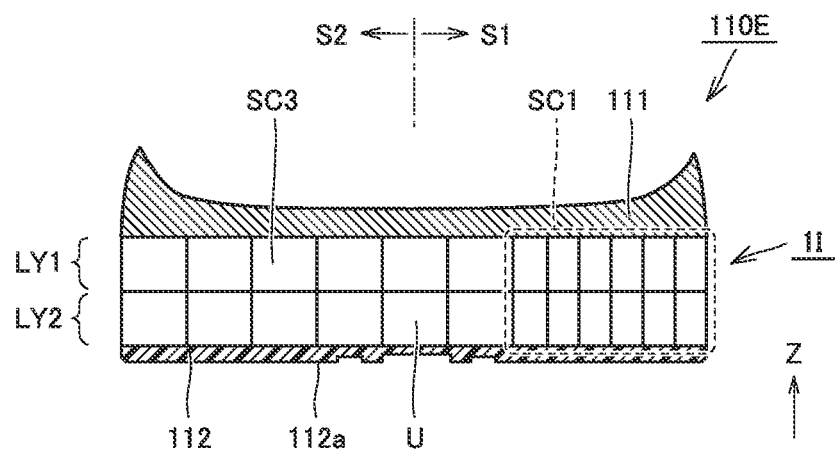
FIG. 41 is a schematic cross section of a configuration of the shoe sole shown in FIG. 40.
Figure 42:
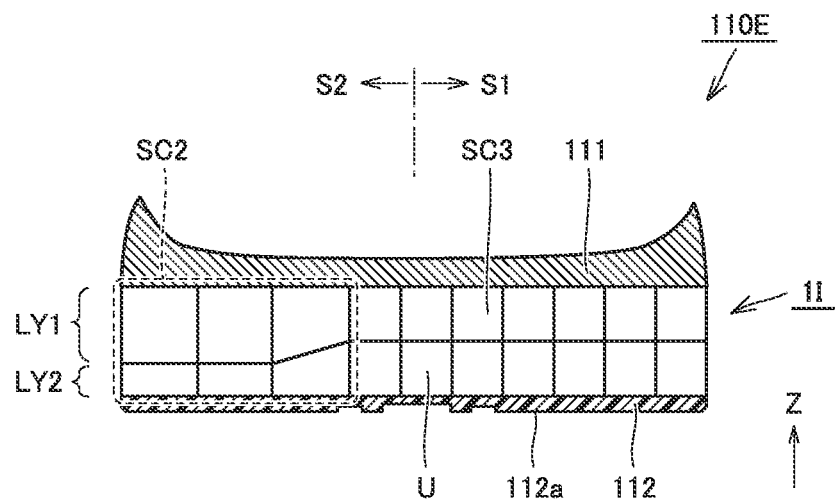
FIG. 42 is a schematic cross section of a configuration of the shoe sole shown in FIG. 40.

FIG. 40 is a schematic plan view of a configuration of a shoe sole according to a thirteenth embodiment. FIGS. 41 and 42 are cross sections of the shoe sole taken along lines XLI-XLI and XLII-XLII, respectively, indicated in FIG. 40. Note that FIGS. 41 and 42 schematically represent by a line a boundary of a plurality of unit structures U (or unit spaces, each as described above, in a strict sense) disposed in a shock absorber. Hereinafter, a shoe sole 110E according to the present embodiment will be described with reference to FIGS. 40 to 42. Shoe sole 110E according to the present embodiment is comprised by shoe 100B according to the tenth embodiment instead of shoe sole 110B described above.

As shown in FIGS. 40 to 42, shoe sole 110E comprises a shock absorber 1I having a configuration different from that of shock absorber 1G comprised by shoe sole 110B according to the tenth embodiment. More specifically, shock absorber 1I is disposed between midsole 111 and outsole 112 to be positioned throughout the entire area of shoe sole 110E in a plan view (that is, all of front foot portion R1, middle foot portion R2, and rear foot portion R3). In FIG. 40, in order to facilitate understanding, a region in which shock absorber 1I is disposed, as seen in a plan view of shoe sole 110E, is shown in a light color.

Herein, in a plan view, shock absorber 1I comprised by shoe sole 110E has in its entire area a shock absorbing region composed of three-dimensional structure S as described above, and, as shown in FIGS. 41 and 42, three-dimensional structure S includes layer LY1 at an upper portion and layer LY2 at a lower portion. Layer LY1 at the upper portion and layer LY2 at the lower portion each have unit structures U aligned in a direction intersecting with the heightwise direction (or the Z direction shown in the figure).

Shock absorber 1I is generally divided into three sections SC1 to SC3 based on a difference in configuration in a plan view. More specifically, section SC1 corresponds a portion of middle foot portion R2 on the medial foot side, section SC2 corresponds to a portion of rear foot portion R3 on the lateral foot side and a rear portion of middle foot portion R2 on the lateral foot side, and section SC3 corresponds to a portion excluding sections SC1 and SC2.

As shown in FIG. 41, section SC1 is configured to be a harder portion than section SC2, and specifically, a dimension of an external shape of unit structure U included in section SC1 is different from that of an external shape of unit structure U included in section SC2. More specifically, in a direction intersecting with an axial direction (that is, the Z direction shown in the figure) in which shock absorber 1I exhibits a shock absorbing function as the shock absorber receives a load, the dimension of the external shape of unit structure U included in section SC1 is smaller than the dimension of the external shape of unit structure U included in section SC2.

As shown in FIG. 42, section SC3 is configured to be a softer portion than section SC2, and specifically, a dimension of an external shape of unit structure U included in section SC3 is different from that of an external shape of unit structure U included in section SC2. More specifically, in the direction in which shock absorber 1I exhibits a shock absorbing function as the shock absorber receives a load, or the axial direction (the Z direction shown in the figure), a dimension of the external shape of unit structure U included in section SC3 is configured to be larger than that of the external shape of unit structure U included in section SC2, whereas in a direction intersecting with the axial direction, a dimension of the external shape of unit structure U included in section SC3 is configured to be larger than that of the external shape of unit structure U included in section SC2.

Such a configuration allows shock absorber 1I to have compressive stiffness variable for each section and enhanced relatively in the order of section SC2, section SC3, and section SC1.

Accordingly, around portion Q3 supporting the calcaneus of a foot, shoe sole 110E has relatively larger compressive stiffness at a portion of middle foot portion R2 on the medial foot side and has relatively smaller compressive stiffness at a rear portion of middle foot portion R2 on the lateral foot side and a portion of rear foot portion R3 on the lateral foot side.

This configuration can suppress rolling of a heel inwards more than necessary when landing, i.e., so-called overpronation. That is, when an overpronator wears shoe 100B comprising shoe sole 110E according to the present embodiment, the overpronator can have his/her foot sole stably supported at the rear portion of middle foot portion R2 on the medial foot side, and accordingly, pressure acting on midsole 111 can be dispersed and midsole 111 can be prevented from having excessive deformation, and as a result, overpronation can be suppressed.

Further, this configuration, as described above, allows a foot sole to be stably supported at the rear portion of middle foot portion R2 on the medial foot side, and accordingly, can disperse pressure acting on midsole 111 and prevent midsole 111 from having excessive deformation, so that when a person with pes planovalgus wears shoe 100B comprising shoe sole 110E according to the present embodiment, he/she can avoid a load concentrating at a portion of his/her feet on the medial foot side when landing.

On the other hand, the above configuration can significantly alleviate shock exerted to the foot sole when landing as shock absorber 1I deforms more significantly at the rear portion of middle foot portion R2 on the lateral foot side and the portion of rear foot portion R3 on the lateral foot side.

Therefore, shoe sole 110E and shoe 100B comprising the shoe sole according to the present embodiment can be excellent in stability when landing and also satisfactorily fit to a foot and be lightweight, and are particularly suitable for overpronators and people with pes planovalgus.

Fourteenth Embodiment

Figure 43:
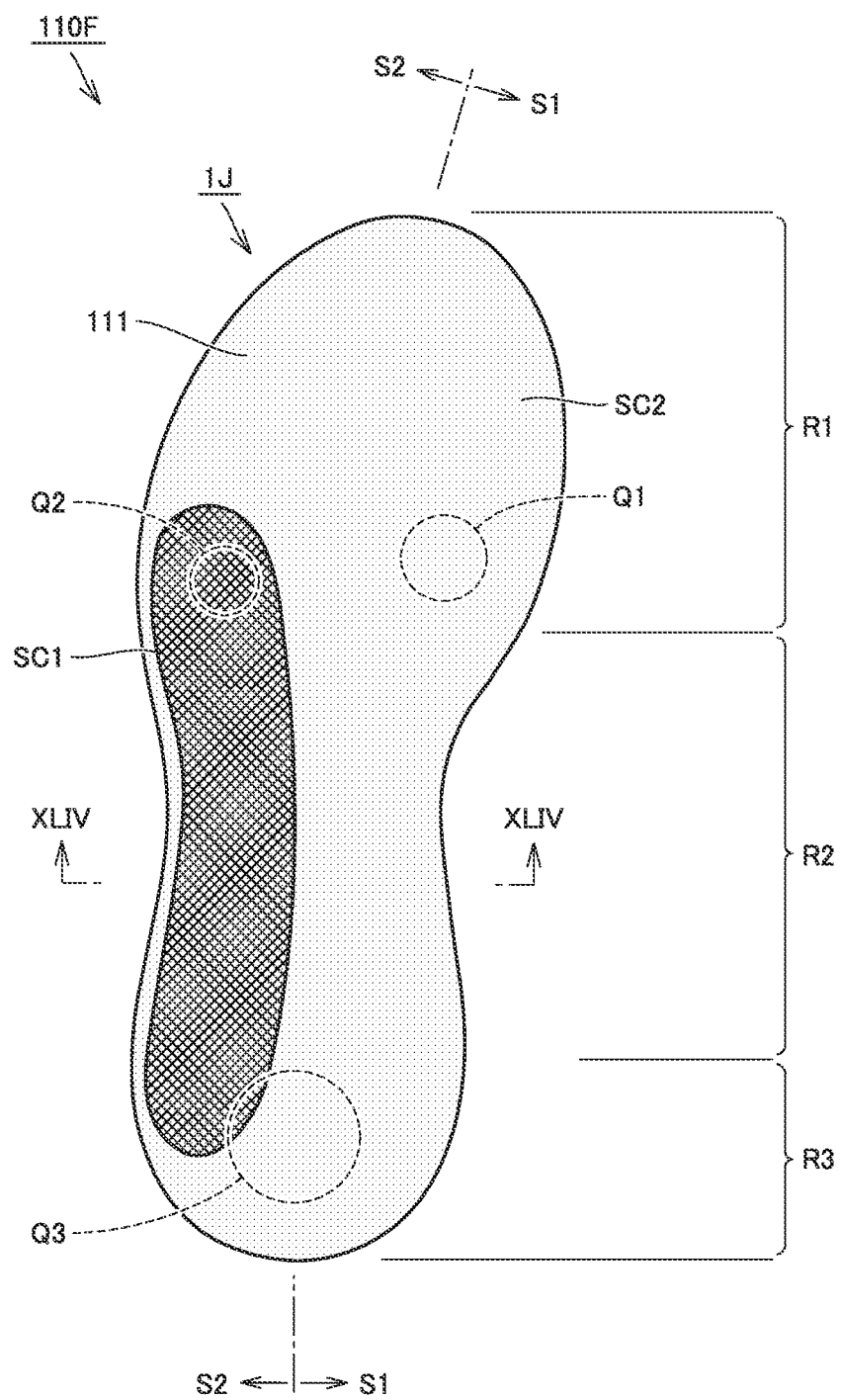
FIG. 43 is a schematic plan view of a configuration of a shoe sole according to a fourteenth embodiment.
Figure 44:
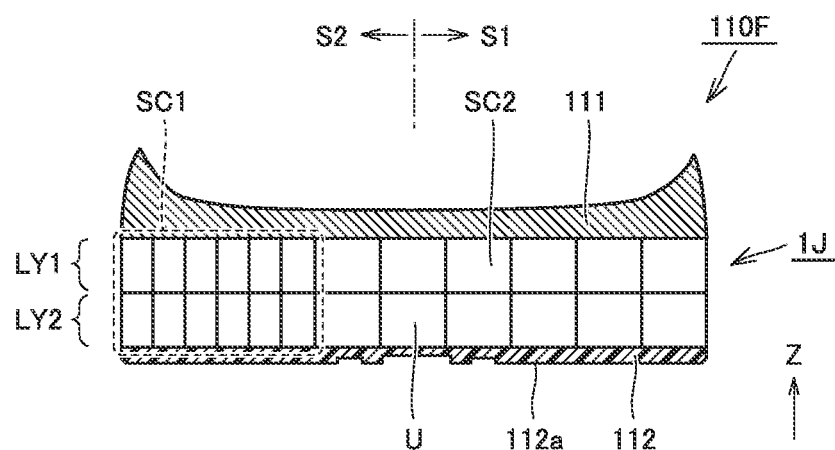
FIG. 44 is a schematic cross section of a configuration of the shoe sole shown in FIG. 43.

FIG. 43 is a schematic plan view of a configuration of a shoe sole according to a fourteenth embodiment. FIG. 44 is a cross section of the shoe sole taken along a line XLIV-XLIV shown in FIG. 43. Note that FIG. 44 schematically represents by a line a boundary of a plurality of unit structures U (or unit spaces, each as described above, in a strict sense) disposed in a shock absorber. Hereinafter, a shoe sole 110F according to the present embodiment will be described with reference to FIGS. 43 and 44. Shoe sole 110F according to the present embodiment is comprised by shoe 100B according to the tenth embodiment instead of shoe sole 110B described above.

As shown in FIGS. 43 and 44, shoe sole 110F comprises a shock absorber 1J having a configuration different from that of shock absorber 1G comprised by shoe sole 110B according to the tenth embodiment. More specifically, shock absorber 1J is disposed between midsole 111 and outsole 112 to be positioned throughout the entire area of shoe sole 110F in a plan view (that is, all of front foot portion R1, middle foot portion R2, and rear foot portion R3). In FIG. 43, in order to facilitate understanding, a region in which shock absorber 1J is disposed, as seen in a plan view of shoe sole 110F, is shown in a light color.

Herein, in a plan view, shock absorber 1J comprised by shoe sole 110F has in its entire area a shock absorbing region composed of three-dimensional structure S as described above, and, as shown in FIG. 43, three-dimensional structure S includes layer LY1 at an upper portion and layer LY2 at a lower portion. Layer LY1 at the upper portion and layer LY2 at the lower portion each have unit structures U aligned in a direction intersecting with the heightwise direction (or the Z direction shown in the figure).

Shock absorber 1J is generally divided into two sections SC1 and SC2 based on a difference in configuration in a plan view. More specifically, section SC1 corresponds a rear portion of front foot portion R1 on the lateral foot side, a portion of middle foot portion R2 on the lateral foot side, and a front portion of rear foot portion R3 on the lateral foot side, and section SC2 corresponds to a portion excluding section SC1.

As shown in FIG. 44, section SC1 is configured to be a harder portion than section SC2, and specifically, a dimension of an external shape of unit structure U included in section SC1 is different from that of an external shape of unit structure U included in section SC2. More specifically, in a direction intersecting with an axial direction (that is, the Z direction shown in the figure) in which shock absorber 1J exhibits a shock absorbing function as the shock absorber receives a load, the dimension of the external shape of unit structure U included in section SC1 is smaller than the dimension of the external shape of unit structure U included in section SC2.

Such a configuration allows shock absorber 1J to have compressive stiffness variable for each section and enhanced relatively in the order of section SC2 and section SC1.

Accordingly, around portion Q3 supporting the calcaneus of a foot and around portion Q2 supporting the ball of the little toe, shoe sole 110F has relatively larger compressive stiffness at the rear portion of front foot portion R1 on the lateral foot side, the portion of middle foot portion R2 on the lateral foot side, and the portion of rear foot portion R3 on the lateral foot side, and has relatively smaller compressive stiffness at a portion of front foot portion R1 on the medial foot side.

This configuration can suppress insufficient inward rolling of a heel when landing, i.e., so-called underpronation. That is, when an underpronator wears shoe 100B comprising shoe sole 110F according to the present embodiment, the underpronator can have his/her foot sole stably supported at a portion on the lateral foot side, and accordingly, pressure acting on midsole 111 can be dispersed and midsole 111 can be prevented from having excessive deformation, and as a result, underpronation can be suppressed.

Further, this configuration, as described above, allows a foot sole to be stably supported at the portion on the lateral foot side, and accordingly, can disperse pressure acting on midsole 111 and prevent midsole 111 from having excessive deformation, so that when a person with genu valgum wears shoe 100B comprising shoe sole 110F according to the present embodiment, he/she can avoid a load concentrating at a portion of his/her feet on the lateral foot side when landing.

On the other hand, the above configuration can significantly alleviate shock exerted to the foot soles when landing as shock absorber 1J deforms more significantly at a portion on the medial foot side.

Therefore, shoe sole 110F and shoe 100B comprising the shoe sole according to the present embodiment can be excellent in stability when landing and also satisfactorily fit to a foot and be lightweight, and are particularly suitable for underpronators and people with genu valgum.

Summary of Disclosure in Embodiments

The eighth to fourteenth embodiments and their variations disclose characteristic configurations, as summarized below:

A shock absorber according to an aspect of the present disclosure includes a three-dimensional structure composed of a unit structure repeatedly, regularly and continuously arranged in at least one direction, the unit structure being a three-dimensional shape formed by a wall having an external shape defined by a pair of parallel planes or curved surfaces. In the shock absorber according to the present invention, when such unit structures each occupy a hexahedral space representing a unit space, the three-dimensional structure includes, as the unit structure, unit structures each occupying a unit space having an external shape with a different dimension.

In the shock absorber according to an aspect of the present disclosure, those unit structures each occupying a unit space having an external shape with a different dimension may be disposed in an axial direction in which the shock absorber exhibits a shock absorbing function as the shock absorber receives a load.

In the shock absorber according to an aspect of the present disclosure, those unit structures each occupying a unit space having an external shape with a different dimension may be disposed in a direction intersecting with the axial direction in which the shock absorber exhibits a shock absorbing function as the shock absorber receives a load.

In the shock absorber according to an aspect of the present disclosure, a partition wall that does not correspond to the wall defining the unit structure may be provided between those unit structures each occupying a unit space having an external shape with a different dimension.

In the shock absorber according to an aspect of the present disclosure, when $L1$ represents a dimension of an external shape of the unit space in the axial direction in which the shock absorber exhibits a shock absorbing function as the shock absorber receives a load and $L2$ represents a larger one of dimensions of the external shape of the unit space in a biaxial direction orthogonal to the axial direction, then, at least one of those unit structures each occupying a unit space having an external shape with a different dimension may satisfy $1.1 \leq L1/L2 \leq 4.0$.

In the shock absorber according to an aspect of the present disclosure, when $L1$ represents a dimension of an external shape of the unit space in the axial direction in which the shock absorber exhibits a shock absorbing function as the shock absorber receives a load and $L2$ represents a larger one of dimensions of the external shape of the unit space in a biaxial direction orthogonal to the above axial direction, then, at least one of those unit structures each occupying a unit space having an external shape with a different dimension may satisfy $0.1 \leq L1/L2 \leq 0.9$.

In the shock absorber according to an aspect of the present disclosure, the three-dimensional structure may be configured by a triply periodic minimal surface with a thickness added thereto.

In the shock absorber according to an aspect of the present disclosure, the three-dimensional structure may have a Schwarz' P structure, a gyroid structure, or a Schwarz' D structure.

In the shock absorber according to an aspect of the present disclosure, the three-dimensional structure may be composed of a plurality of planes disposed to intersect with one another with a thickness added thereto so that the three-dimensional structure has a cavity therein.

In the shock absorber according to an aspect of the present disclosure, the three-dimensional structure may have an octet structure, a cubic structure, or a cubic octet structure.

The shock absorber according to an aspect of the present disclosure may be formed of either a resin material or a rubber material.

The shock absorber according to an aspect of the present disclosure may be composed of a polymer composition containing at least one selected from the group consisting of an olefin-based polymer, an amide-based polymer, an ester-based polymer, a urethane-based polymer, a styrene-based polymer, an acrylic polymer, and a methacrylic polymer.

A shoe sole according to an aspect of the present disclosure comprises the shock absorber according to an aspect of the present disclosure as described above.

In the shoe sole according to an aspect of the present disclosure, the shock absorber may be disposed such that an axial direction in which the shock absorber exhibits a shock absorbing function as the shock absorber receives a load is orthogonal to a tread.

A shoe according to an aspect of the present disclosure comprises the shoe sole according to an aspect of the present disclosure described above, and an upper provided above the shoe sole.

The configuration as above can provide a shock absorber which is lightweight and has an excellent shock absorbing function, and can be used in various applications, a shoe sole comprising the shock absorber, and a shoe comprising the shoe sole.

Other Embodiments

While in the eighth to fourteenth embodiments and their variations a three-dimensional structure serving as a shock absorbing region alone configures a shock absorber by way of example, a plate-shaped support may be separately provided at an end portion of the three-dimensional structure located in the axial direction in which the shock absorber exhibits a shock absorbing function as the shock absorber receives a load, for example. The support may be provided at only one of a pair of end portions located in the axial direction or may be provided at both of them. In that case, the support may be a member discrete from the three-dimensional structure and assembled to the three-dimensional structure with an adhesive or may be formed integrally with the three-dimensional structure.

Herein, in the shoe sole and shoe as described in the tenth to fourteenth embodiments and their variations, when the support is provided as described above, the support may be adhered or similarly fixed to a midsole, an outsole, an upper body or the like that is to be disposed to face the support. When such a support as described above is provided at a portion of the shock absorber closer to the tread, then the support may per se be provided with the function of the outsole and an outsole that is a separate member may be dispensed with.

Further, the three-dimensional structure serving as the shock absorbing region may locally be provided with a differently shaped portion that does not correspond to the wall defining the unit structure. The differently shaped portion allows compressive stiffness, deformability and the like to be variously adjusted for each portion of the shock absorber. The differently shaped portion may be provided at an end portion of the shock absorber or may be provided in a region inner than the end portion. For example, when the differently shaped portion is provided at the end portion of the shock absorber, the differently shaped portion can be provided in the form of a cover so as to close some or all of a plurality of openings located at the end of the shock absorber. This configuration allows the shock absorber to have the end portion with compressive stiffness, deformability and the like variable.

Therefore, when the unit structure's external dimensions are adjusted for each portion of the shock absorber and furthermore, the differently shaped portion is provided at a specific portion of the shock absorber, variously changing their combination allows the shock absorber to be fabricated with a high degree of freedom in design to have a variety of shock absorbing functions. In particular, when the shock absorber is comprised by a shoe sole the shock absorber can be easily manufactured to have a desired function by adjusting the unit structure's external dimension for each portion of the shock absorber, and introducing or dispensing with the above-described differently shaped portion in the form of a cover at an end portion of the shock absorber and variously changing the differently shaped portion in shape, thickness and the like if it is introduced.

Furthermore, while in the tenth to fourteenth embodiments and their variations described above, a shock absorber is disposed at a portion of or throughout the shoe sole in a plan view for the sake of illustration, where the shock absorber is provided is not limited to the layouts specifically indicated as examples in these embodiments and their variations. For example, depending on the type the competition in which the shoe is used, how it is used, and the like, the shock absorber may be applied to a portion of the shoe sole on either one of the medial or lateral side. The shock absorber may be provided between the midsole and the upper. When the shock absorber is provided on the entire surface of the shoe sole, then, in place of the midsole, its entirety may be replaced with the shock absorber.

Furthermore, while in the tenth to fourteenth embodiments and their variations, a shock absorber configured such that a plurality of layers each composed of unit structures laid in a matrix are stacked in an axial direction in which the shock absorber exhibits a shock absorbing function as the shock absorber receives a load, is applied to a shoe sole and a shoe comprising the shoe sole, a shock absorber composed of a single such layer, rather the layers stacked in the axial direction, is also applicable to a shoe sole and a shoe comprising the shoe sole. In that case, it is sufficient that the single layer partially includes unit structures having their respective external shapes differently dimensioned. As an example, the layer may have unit structures having their respective external shapes differently dimensioned between the shoe sole's medial foot side and lateral foot side, or may have unit structures having their respective external shapes differently dimensioned among the shoe sole's front foot side, middle foot side, and rear foot side.

Further, while in the sixth and seventh verifications and the thirteenth and fourteenth embodiments, in particular, a plurality of unit structures disposed in the shock absorber have a boundary all configured in a straight line (see FIGS. 34, 35, 41, 42, and 44, etc.) by way of example, the boundary is not necessarily a straight line, and is variable in accordance with how the shock absorber is used, its design (especially a design for a shoe when the shock absorber is applied to the shoe), and so forth, and it can for example be a curve.

In addition, the shock absorber may have a wall varied in thickness depending on where the shock absorber is disposed with respect to the shoe sole, or may have a surface structure varied depending on where the shock absorber is disposed with respect to the shoe sole. For example, a shock absorber having a surface structure of a Schwarz' P structure may be disposed at a portion of the shoe sole, and a shock absorber having a surface structure of a gyroid structure may be disposed at another portion of the shoe sole.

Furthermore, while in the tenth to fourteenth embodiments and their variations described above, the present invention is applied to a shoe comprising a tongue and a shoelace by way of example, the present invention may be applied to a shoe without these components (such as a shoe comprising a sock-shaped upper) and a shoe sole comprised by the shoe.

Further, while in the tenth to fourteenth embodiments and their variations described above, a shock absorber according to the present invention is applied to a shoe sole of a shoe by way of example, the shock absorber according to the present invention is applicable to other shock absorbing applications. For example, the shock absorber according to the present invention can be used in various applications such as packaging materials, floor materials for buildings (for example, houses), surface materials for paving paths, surface materials for sofas and chairs, tires, and the like.

The characteristic configurations disclosed in the eighth to fourteenth embodiments and their variations can be combined with one another in a range that does not depart from the gist of the present invention.

In addition, the characteristic configurations disclosed in the first to seventh embodiments and their variations and the characteristic configurations disclosed in the eighth to fourteenth embodiments and their variations can be combined together without departing from the gist of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A shoe sole comprising a shock absorber comprising a three-dimensional structure composed of a unit structure repeatedly, regularly and continuously arranged in three orthogonal axial directions, the unit structure being a three-dimensional shape formed by a wall having an external shape defined by a pair of parallel planes or curved surfaces, each unit structure having a cavity therein, an axial direction of the three orthogonal axial directions being orthogonal to a tread, the axial direction being a direction in which the shock absorber exhibits a shock absorbing function as the shock absorber receives a load, a cavity of any one unit structure communicating with any cavity of each of other unit structures adjacent to the one unit structure in the three orthogonal axial directions, in a direction in which the one unit structure is adjacent to each of the other unit structures, wherein such unit structures each occupy an approximate rectangular parallelopiped space representing a unit space and are defined by mutually orthogonal three sides having a first side extending in the axial direction and second and third sides each extending from one end of the first side in a direction orthogonal to the axial direction, and the first side has a length L1 and a longer one of the second and third sides has a length L2, the three-dimensional structure including the unit structure satisfying $1.1 \leq L1/L2 \leq 4.0$, the wall of the three-dimensional structure has a meandering portion which is a portion presenting a cross-sectional shape extending in a meandering manner when the three-dimensional structure is cut along at least a specific plane, the meandering portion has an integrally-formed reinforcement portion to reinforce a turning point of the meandering portion, and the integrally-formed reinforcement portion is an additional thickness portion of the wall consisting of the same material as the wall and provided at an internal corner portion of the turning point to make the turning point larger in thickness and in compressive stiffness than another portion of the wall.

2. The shoe sole according to claim 1, wherein such unit spaces aligned in the axial direction each have an equal $L1/L2$.

3. The shoe sole according to claim 1, wherein the three-dimensional structure is a triply periodic minimal surface with a thickness added thereto.

4. The shoe sole according to claim 3, wherein the three-dimensional structure has a Schwarz' P structure or a gyroid structure.

5. The shoe sole according to claim 1, wherein the three-dimensional structure is composed of a plurality of planes disposed to intersect with one another with a thickness added thereto so that the three-dimensional structure has a cavity therein.

6. A shoe comprising:

a shoe sole according to claim 1; and an upper provided above the shoe sole.

7. The shoe sole according to claim 1, wherein the additional thickness portion of the wall comprises a protrusion at the internal corner portion of the turning point or a fill portion at the internal corner portion extending across the internal corner portion.

* * * * *